(12) United States Patent
Shirai et al.

(10) Patent No.: US 8,379,843 B2
(45) Date of Patent: Feb. 19, 2013

(54) DATA CONVERTER, DATA CONVERSION METHOD, AND COMPUTER PROGRAM

(75) Inventors: Taizo Shirai, Kanagawa (JP); Kyoji Shibutani, Kanagawa (JP); Shiho Moriai, Kanagawa (JP); Toru Akishita, Tokyo (JP); Tetsu Iwata, Aichi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/812,903

(22) PCT Filed: Jan. 21, 2009

(86) PCT No.: PCT/JP2009/050855
§ 371 (c)(1),
(2), (4) Date: Jun. 22, 2011

(87) PCT Pub. No.: WO2009/093601
PCT Pub. Date: Jul. 30, 2009

(65) Prior Publication Data
US 2011/0243319 A1    Oct. 6, 2011

(30) Foreign Application Priority Data

Jan. 21, 2008 (JP) ................................. 2008-010548

(51) Int. Cl.
*H04L 9/00* (2006.01)

(52) U.S. Cl. ............................... 380/28; 380/29; 380/30
(58) Field of Classification Search ............... 380/28–30
See application file for complete search history.

(56) References Cited

U.S. PATENT DOCUMENTS

| | | | |
|---|---|---|---|
| 6,578,061 B1 * | 6/2003 | Aoki et al. ..................... 708/520 |
| 2005/0111659 A1 * | 5/2005 | Shirai et al. ..................... 380/37 |
| 2005/0226407 A1 * | 10/2005 | Kasuya et al. ................... 380/28 |
| 2008/0143561 A1 * | 6/2008 | Miyato et al. ................... 341/79 |

* cited by examiner

*Primary Examiner* — Philip Chea
*Assistant Examiner* — Ghazal Shehni
(74) *Attorney, Agent, or Firm* — Finnegan, Henderson, Farabow, Garrett & Dunner, LLP

(57) ABSTRACT

A data conversion algorithm achieving efficient data diffusion is achieved. For example, in a configuration where a various processes are executed on two data segments which are resultants of dividing a rectangular matrix of data containing arranged one-byte data blocks into two parts to perform data conversion, efficient data scrambling with less operation cost is achieved by executing a linear conversion process on one of the data segments, an exclusive OR operation between the two data segments, a shift process on one of the data segments, and a swap process between the two data segments. Moreover, cryptographic processing with a high security level is achieved by including nonlinear conversion or key application operation on the data segments.

25 Claims, 35 Drawing Sheets

| $a_1$ | $a_2$ | .. | $a_n$ | $a_{n+1}$ | $a_{n+2}$ | .. | $a_{2n}$ |
|---|---|---|---|---|---|---|---|
| $a_{2n+1}$ | $a_{2n+2}$ | .. | $a_{3n}$ | $a_{3n+1}$ | $a_{3n+2}$ | .. | $a_{4n}$ |
| .. | .. | .. | .. | .. | .. | .. | .. |
| $a_{2(m-1)n+1}$ | $a_{2(m-1)n+2}$ | .. | $a_{(2m-1)n}$ | $a_{(2m-1)n+1}$ | $a_{(2m-1)n+2}$ | .. | $a_{2mn}$ |

| $b_1$ | $b_2$ | .. | $b_n$ | $b_{n+1}$ | $b_{n+2}$ | .. | $b_{2n}$ |
|---|---|---|---|---|---|---|---|
| $b_{2n+1}$ | $b_{2n+2}$ | .. | $b_{3n}$ | $b_{3n+1}$ | $b_{3n+2}$ | .. | $b_{4n}$ |
| .. | .. | .. | .. | .. | .. | .. | .. |
| $b_{2(m-1)n+1}$ | $b_{2(m-1)n+2}$ | .. | $b_{(2m-1)n}$ | $b_{(2m-1)n+1}$ | $b_{(2m-1)n+2}$ | .. | $b_{2mn}$ |

(a)

|     |     |     |     |
|-----|-----|-----|-----|
| $a_4$ | $a_8$ | $a_{12}$ | $a_{16}$ |
| $a_3$ | $a_7$ | $a_{11}$ | $a_{15}$ |
| $a_2$ | $a_6$ | $a_{10}$ | $a_{14}$ |
| $a_1$ | $a_5$ | $a_9$  | $a_{13}$ |

(b)

|     |     |     |     |
|-----|-----|-----|-----|
| $a_8$ | $a_{16}$ | $a_{24}$ | $a_{32}$ |
| $a_7$ | $a_{15}$ | $a_{23}$ | $a_{31}$ |
| $a_6$ | $a_{14}$ | $a_{22}$ | $a_{30}$ |
| $a_5$ | $a_{13}$ | $a_{21}$ | $a_{29}$ |
| $a_4$ | $a_{12}$ | $a_{20}$ | $a_{28}$ |
| $a_3$ | $a_{11}$ | $a_{19}$ | $a_{27}$ |
| $a_2$ | $a_{10}$ | $a_{18}$ | $a_{26}$ |
| $a_1$ | $a_9$  | $a_{17}$ | $a_{25}$ |

FIG. 1

(1) W-SUB    $b_i = S(a_i)$   $i = 1 \cdots 32$
(2) W-SHIFT
(3) W-MAT   $^t(b_i\ b_{i+8}\ b_{i+16}\ b_{i+24}) = M\ ^t(a_i\ a_{i+8}\ a_{i+16}\ a_{i+24})$   $i = 1 \cdots 8$
(4) W-KADD   $b_i = a_i \oplus k_i$   $i = 1 \cdots 32$
FIG. 5

(1) H-SUB  $b_i = S(a_i)$ if $i = 1 \cdots 4, 9 \cdots 12, 17 \cdots 20, 25 \cdots 28$
$b_i = a_i$ else
(2) H-MAT  ${}^t(b_i\ b_{i+8}\ b_{i+16}\ b_{i+24}) = M\ {}^t(a_i\ a_{i+8}\ a_{i+16}\ a_{i+24})$ $i = 1 \cdots 4$
${}^t(b_i\ b_{i+8}\ b_{i+16}\ b_{i+24}) = {}^t(a_i\ a_{i+8}\ a_{i+16}\ a_{i+24})$ $i = 5 \cdots 8$
(3) H-KADD  $b_i = a_i \oplus k_i$ if $i = 1 \cdots 4, 9 \cdots 12, 17 \cdots 20, 25 \cdots 28$
$b_i = a_i$ else
FIG. 8

(A) H-SHIFT

| $a_1$ | $a_2$ | $a_3$ | $a_4$ | $a_5$ | $a_6$ | $a_7$ | $a_8$ |
|---|---|---|---|---|---|---|---|
| $a_9$ | $a_{10}$ | $a_{11}$ | $a_{12}$ | $a_{13}$ | $a_{14}$ | $a_{15}$ | $a_{16}$ |
| $a_{17}$ | $a_{18}$ | $a_{19}$ | $a_{20}$ | $a_{21}$ | $a_{22}$ | $a_{23}$ | $a_{24}$ |
| $a_{25}$ | $a_{26}$ | $a_{27}$ | $a_{28}$ | $a_{29}$ | $a_{30}$ | $a_{31}$ | $a_{32}$ |

⇒

| $a_1$ | $a_2$ | $a_3$ | $a_4$ | $a_5$ | $a_6$ | $a_7$ | $a_8$ |
|---|---|---|---|---|---|---|---|
| $a_{12}$ | $a_9$ | $a_{10}$ | $a_{11}$ | $a_{13}$ | $a_{14}$ | $a_{15}$ | $a_{16}$ |
| $a_{19}$ | $a_{20}$ | $a_{17}$ | $a_{18}$ | $a_{21}$ | $a_{22}$ | $a_{23}$ | $a_{24}$ |
| $a_{26}$ | $a_{27}$ | $a_{28}$ | $a_{25}$ | $a_{29}$ | $a_{30}$ | $a_{31}$ | $a_{32}$ |

(B) MAT-XOR $${}^t(b_i\ b_{i+8}\ b_{i+16}\ b_{i+24}) = {}^t(a_i\ a_{i+8}\ a_{i+16}\ a_{i+24}) \quad i = 1 \cdots 4$$
$${}^t(b_{i+4}\ b_{i+12}\ b_{i+20}\ b_{i+28}) = [M\ {}^t(a_i\ a_{i+8}\ a_{i+16}\ a_{i+24})] \oplus {}^t(a_{i+4}\ a_{i+12}\ a_{i+20}\ a_{i+28}) \quad i = 1 \cdots 4$$

| $a_1$ | $a_2$ | $a_3$ | $a_4$ | $a_5$ | $a_6$ | $a_7$ | $a_8$ |
|---|---|---|---|---|---|---|---|
| $a_9$ | $a_{10}$ | $a_{11}$ | $a_{12}$ | $a_{13}$ | $a_{14}$ | $a_{15}$ | $a_{16}$ |
| $a_{17}$ | $a_{18}$ | $a_{19}$ | $a_{20}$ | $a_{21}$ | $a_{22}$ | $a_{23}$ | $a_{24}$ |
| $a_{25}$ | $a_{26}$ | $a_{27}$ | $a_{28}$ | $a_{29}$ | $a_{30}$ | $a_{31}$ | $a_{32}$ |

⇒

| $b_1$ | $b_2$ | $b_3$ | $b_4$ | $b_5$ | $b_6$ | $b_7$ | $b_8$ |
|---|---|---|---|---|---|---|---|
| $b_9$ | $b_{10}$ | $b_{11}$ | $b_{12}$ | $b_{13}$ | $b_{14}$ | $b_{15}$ | $b_{16}$ |
| $b_{17}$ | $b_8$ | $b_{19}$ | $b_{20}$ | $b_{21}$ | $b_{22}$ | $b_{23}$ | $b_{24}$ |
| $b_{25}$ | $b_6$ | $b_{27}$ | $b_{28}$ | $b_{29}$ | $b_{30}$ | $b_{31}$ | $b_{32}$ |

(C) SWAP

| $a_1$ | $a_2$ | $a_3$ | $a_4$ | $a_5$ | $a_6$ | $a_7$ | $a_8$ |
|---|---|---|---|---|---|---|---|
| $a_9$ | $a_{10}$ | $a_{11}$ | $a_{12}$ | $a_{13}$ | $a_{14}$ | $a_{15}$ | $a_{16}$ |
| $a_{17}$ | $a_{18}$ | $a_{19}$ | $a_{20}$ | $a_{21}$ | $a_{22}$ | $a_{23}$ | $a_{24}$ |
| $a_{25}$ | $a_{26}$ | $a_{27}$ | $a_{28}$ | $a_{29}$ | $a_{30}$ | $a_{31}$ | $a_{32}$ |

⇒

| $a_5$ | $a_6$ | $a_7$ | $a_8$ | $a_1$ | $a_2$ | $a_3$ | $a_4$ |
|---|---|---|---|---|---|---|---|
| $a_{13}$ | $a_{14}$ | $a_{15}$ | $a_{16}$ | $a_9$ | $a_{10}$ | $a_{11}$ | $a_{12}$ |
| $a_{21}$ | $a_{22}$ | $a_{23}$ | $a_{24}$ | $a_{17}$ | $a_{18}$ | $a_{19}$ | $a_{20}$ |
| $a_{29}$ | $a_{30}$ | $a_{31}$ | $a_{32}$ | $a_{25}$ | $a_{26}$ | $a_{27}$ | $a_{28}$ |

FIG. 13

H-SUB
$$\begin{cases} b_i = S(a_i) & \text{if } 1 \leq i \bmod 2n \leq n \\ b_i = a_i & \text{else} \end{cases}$$

MAT-XOR
$$\begin{cases} \text{for } i = 1..n \\ {}^t(b_i\ b_{i+2n} \cdots b_{i+2(m-1)n}) = {}^t(a_i\ a_{i+2n} \cdots a_{i+2(m-1)n}) \\ {}^t(b_{i+n}\ b_{i+3n} \cdots b_{i+(2m-1)n}) = [M\ {}^t(a_i\ a_{i+2n} \cdots a_{i+2(m-1)n}) ] \oplus {}^t(a_{i+n}\ a_{i+3n} \cdots a_{i+(2m-1)n}) \end{cases}$$

$$\begin{cases} \text{if } i = 1..n \\ \text{else} \end{cases}$$

H-MAT
$$\begin{cases} {}^t(b_i\ b_{i+2n} \cdots b_{i+2(m-1)n}) = M\ {}^t(a_i\ a_{i+2n} \cdots a_{i+2(m-1)n}) \\ {}^t(b_{i+n}\ b_{i+3n} \cdots b_{i+(2m-1)n}) = {}^t(a_i\ a_{i+2n} \cdots a_{i+2(m-1)n}) \end{cases}$$

H-KADD
$$\begin{cases} b_i = a_i \oplus k_i & \text{if } 1 \leq i \bmod 2n \leq n \\ b_i = a_i & \text{else} \end{cases}$$

XOR
$$\begin{cases} \text{for } i = 1..n \\ {}^t(b_i\ b_{i+2n} \cdots b_{i+2(m-1)n}) = {}^t(a_i\ a_{i+2n} \cdots a_{i+2(m-1)n}) \\ {}^t(b_{i+n}\ b_{i+3n} \cdots b_{i+(2m-1)n}) = {}^t(a_i\ a_{i+2n} \cdots a_{i+2(m-1)n}) \oplus {}^t(a_{i+n}\ a_{i+3n} \cdots a_{i+(2m-1)n}) \end{cases}$$

XOR2も同様

SUB-MAT-XOR
$$\begin{cases} \text{for } i = 1..n \\ {}^t(b_i\ b_{i+2n} \cdots b_{i+2(m-1)n}) = {}^t(a_i\ a_{i+2n} \cdots a_{i+2(m-1)n}) \\ {}^t(b_{i+n}\ b_{i+3n} \cdots b_{i+(2m-1)n}) = [M\ {}^t(a_i\ a_{i+2n} \cdots a_{i+2(m-1)n}) ] \oplus {}^t(a_{i+n}\ a_{i+3n} \cdots a_{i+(2m-1)n}) \end{cases}$$

FIG. 29

DATA CONVERTER, DATA CONVERSION METHOD, AND COMPUTER PROGRAM

TECHNICAL FIELD

The present invention relates to a data converter, a data conversion method and a computer program. More specifically, the invention relates to a data converter, a data conversion method and a computer program achieving efficient data diffusion or cryptographic processing.

BACKGROUND ART

In a block cipher which encrypts input data by executing a data conversion process on the input data on a one-block-at-a-time basis, a hash function or the like, high data scrambling capability for input data is desired. For example, a process in which input data is divided into data blocks of a fixed size such as bytes, and various operations such as linear conversion and nonlinear conversion are repeatedly executed to scramble the data while byte data blocks affect one another is performed.

For example, the AES (Advanced Encryption Standard) algorithm known as an U.S. encryption standard is an algorithm for scrambling data by dividing input data into byte data blocks, arranging the byte data blocks in a square or rectangular matrix, and repeating various processes such as processing on a one-row-at-a-time basis or processing on a one-column-at-a-time basis, more specifically, a nonlinear conversion process and a linear conversion process.

A specific example will be described referring to FIG. 1. In the case where data to be subjected to a conversion process is 8×16=128-bit data, as illustrated in FIG. 1(a), a square matrix is configured of byte data blocks $a_1, a_2, a_3, \ldots, a_{16}$ as one-byte data blocks containing 8 bits, and data conversion is performed by repeating various operation processes on data blocks such as:

an operation on a one-row-at-a-time basis, for example, an operation process on each row such as $(a_1, a_2, a_3, a_4)$, or an operation on a one-column-at-a-time basis, for example, an operation process on each column such as $(a_1, a_5, a_9, a_{13})$, more specifically various processes such as a nonlinear conversion process, a linear conversion process, a shift process and an exclusive OR operation with a key.

As illustrated in FIG. 1(a), it is known that when a process on a one-row-at-a-time basis or on a one-column-at-a-time basis is executed on a square matrix in which byte data blocks are arranged, efficient scrambling is achievable. However, a square matrix containing one-byte data blocks is allowed to be configured only in the case where input data to be subjected to a conversion process is data of a specific number of bits such as data of 8×16=128 bits illustrated in FIG. 1(a). More specifically, the square matrix is configured only in the following case:

the case of the number of bits=8×(n)² bits (where n is a natural number), in byte terms, the case of the number of bytes=(n)² bytes (where n is a natural number).

128 bits are equal to a bit number=8×(4)² bits, and as illustrated in FIG. 1(a), 128 bits are allowed to configure a square matrix containing 4×4=16 one-byte data blocks.

However, in the case where data to be subjected to conversion is, for example, 256 bits, 256=8×32 is established, that is, 256 is not represented as 256=8×(n)² bits, so it is impossible to configure a square matrix contacting byte data blocks.

In such a case, as illustrated in FIG. 1(b), 32 byte data blocks $a_1, a_2, a_3, \ldots, a_n$ containing 8 bits are arranged in a rectangular matrix with an aspect ratio of 1:2, and scrambling is executed by repeating a process on a one-block-at-a-time basis or a process on a one-column-at-a-time basis on the rectangular matrix. However, there is such an issue that even if scrambling is performed on the rectangular matrix illustrated in FIG. 1(b) in the same steps as those in the case of the square matrix, in spite of an increase in time and effort for operations, scrambling capability is not improved.

Referring to FIG. 2 and later drawings, scrambling process examples in the cases of a square matrix (a square state) containing byte data blocks and a rectangular matrix (a rectangular state) containing byte data blocks will be described below.

(A) Processing Example on Square Matrix (Square State)

Referring to FIG. 2 and later drawings, a scrambling process in a data conversion process on data of 128 bits will be described below. The data of 128 bits are divided into one-byte (8-bit) data blocks. Herein, 16 one-byte data blocks are indicated by $a_1$ to $a_{16}$, respectively.

As illustrated by a square matrix of data (a square state) 11 in FIG. 2, 16 one-byte data blocks [$a_1$ to $a_{16}$] are stored in a 4×4 matrix. Hereinafter, data stored in the square matrix is called as square state.

In the AES block cipher algorithm, a plurality of operations on the square state are defined, and encryption is achieved by repeatedly applying the defined operations. The operations defined in the AES include the following four kinds illustrated in FIG. 2.

(1) Nonlinear Conversion Process (SUB)

An operation of updating a value by subjecting each one-byte data block to nonlinear conversion S(x) on a one-byte-at-a-time basis, where as illustrated in FIG. 2(1), a relationship between a one-byte output $b_i$ after the conversion process and a one-byte input $a_i$ is:

$$b_i = S(a_i)$$

$$i = 1, 2, \ldots, 16$$

For example, in the AES cipher, the operation corresponds to nonlinear conversion using an S-box.

(2) Shift Process (SHIFT)

A process of subjecting each row to a rotation shift operation. Shift amounts vary from one row to another, and in the case of the AES, as illustrated in FIG. 2(2), one-byte data blocks in a first row are not rotationally shifted, and one-byte data blocks in a second row, one-byte data blocks in a third row and one-byte data blocks in a fourth row are rotationally shifted toward the right by one one-byte data block, two one-byte data blocks, and three one-byte data blocks, respectively.

(3) Linear Conversion Process (MAT)

An operation of updating a value by an operation on a 4×4 matrix [M] assuming that four one-byte data blocks in each column are considered as a vector.

A relationship between a one-byte output $b_i$ after the conversion process and a one-byte input $a_i$ is:

$$^t(b_i, b_{i+4}, b_{i+8}, b_{i+12}) = M\, ^t(a_i, a_{i+4}, a_{i+8}, a_{i+12})$$

$$i = 1, 2, 3, 4$$

In addition, $^t(\ )$ indicates a transposed matrix formed by interchanging rows and columns in a matrix. That is, the above-described expression means as follows.

$$\begin{pmatrix} b_i \\ b_{i+4} \\ b_{i+8} \\ b_{i+12} \end{pmatrix} = M \begin{pmatrix} a_i \\ a_{i+4} \\ a_{i+8} \\ a_{i+12} \end{pmatrix}$$

[Mathematical Expression 1]

(4) Key Application Operation Process (KADD)

An operation of performing an exclusive OR operation between each one-byte data block and a round key $[k_i]$ outputted from a key schedule section.

A relationship between a one-byte output b, after the conversion process and a one-byte input $a_i$ is:

$$b_i = a_i (XOR) k_i$$

i=1, 2, . . . , 16

In addition, in the above-described expression, (XOR) indicates an exclusive OR operation.

A combination of the above-described operations (1) to (4) which are executed in a predetermined sequence configures one round operation. The round operation is repeatedly executed on input data to produce output data, for example, encrypted data, and then output the data. As illustrated in FIG. 3, the round operation is configured of, for example, a combination of data conversion processes which are executed in order of (1) the nonlinear conversion process (SUB)→(2) the shift process (SHIFT)→(3) the linear conversion process (MAT)→(4) the key application operation process (KADD), and the round operation is repeatedly executed a plurality of times to convert input data into output data, that is, encrypted data.

FIG. 4 is an illustration for describing a data scrambling example in the case where first to third rounds (R1 to R3) of the round operation configured of data conversion processes, which are executed in order of (1) the nonlinear conversion process (SUB)→(2) the shift process (SHIFT)→(3) the linear conversion process (MAT)→(4) the key application operation process (KADD), are executed on a square state.

FIG. 4 indicates which one-byte data blocks included in the square state a one-byte data block 31 at the top left corner of a square state 21 in an initial state affects by (1) the nonlinear conversion process (SUB), (2) the shift process (SHIFT), (3) the linear conversion process (MAT) and (4) the key application operation process (KADD) in each round operation. That is, FIG. 4 illustrates how an influence of constituent bits of the one-byte data block 31 in the square state is diffused to other one-byte data blocks.

Refer to the one-byte data block 31 (marked with black) at the top left of the square state 21 in an initial state of input data. The one-byte data block 31 does not affect operation results of other one-byte data blocks in the square state until the nonlinear conversion process (SUB) and the shift process (SHIFT) in the first round (R1).

However, when the linear conversion process (MAT) in the first round is completed, the one-byte data block 31 affects four one-byte data blocks included in a leftmost column of the square state. It is said that this state is a state where the influence of constituent bits of the one-byte data block 31 at the top left is diffused to four one-byte data blocks included in the leftmost column of the square state.

After that, the influence is not diffused any further until the key application operation (KADD) and the nonlinear conversion process (SUB) in the second round, but four one-byte data blocks vertically aligned are laterally diffused by the next shift process (SHIFT), thereby one one-byte data block affected by the one-byte data block 31 is included in each column.

Then, the influence is diffused to all 16 one-byte data blocks configuring the square state by the linear conversion process (MAT) immediately after the shift process.

In this case, by the processes of two rounds of the round operation, one one-byte data block affects all one-byte data blocks configuring the square state. In addition, in FIG. 4, the influence of the one-byte data block 31 at the top left is described as an example, but any one-byte data block at an arbitrary position of the square state affects other one-byte data blocks in the same manner, and an influence of a one-byte data block affects all other one-byte data blocks in two rounds, that is, the influence of a one-byte data block is diffused to all other one-byte data in two rounds. A high-speed extensive diffusion process proves high data scrambling capability, and is used as an element of encrypted data concealment or efficiency evaluation.

In an example illustrated in FIG. 4, 1 it takes two rounds for one one-byte data block to affect all one-byte data blocks configuring the square state. Operation cost of affecting the whole square'state is estimated. It takes two rounds to affect the whole square state, so two nonlinear conversion processes (SUB), two shift processes (SHIFT), two linear conversion processes (MAT) and two key application operation processes (KADD) are necessary.

As an indicator, it is considered that a hardware gate count necessary for an operation represents essential complexity. In this case, a shift process (SHIFT) operation is achievable only by connection of a circuit, so it is not necessary to pass through a gate, so the operation cost for the shift process (SHIFT) is considered 0.

Therefore, in the square state illustrated in FIG. 4, it may be estimated that operation cost necessary for two rounds of the round operation until one one-byte data block affects all one-byte data blocks configuring the square state is as follows:

2SUB+2MAT+2KADD

In addition, to execute these operation processes, a logical circuit, a processing program or the like is used, and a necessary arithmetic circuit or processing speed depends on the configuration of the logical circuit, the processing program or the like. Therefore, it is difficult to evaluate absolute efficiency, but the number of gates in a logical circuit necessary for the above-described operations may be used as an evaluation indicator.

As a logical circuit implementation example, the number of gates necessary for each operation corresponds to the following number of gates:

SUB operation=approximately 3,200 to 4,800 gates

MAT operation=approximately 800 to 1,200 gates

KADD operation=approximately 320 gates

Therefore, in the example illustrated in FIG. 4, it may be determined that the operation cost necessary for two rounds of the round operation until the one one-byte data block affects all one-byte data blocks configuring the square state is the following calculation cost:

2SUB+2MAT+2KADD=9,000 to 13,000 gates=9K gates to 13K gates

Lower calculation cost allows downsizing of a necessary circuit size for a device executing cryptographic processing, hash processing or the like, and high-speed processing.

(B) A Processing Example on a Rectangular Matrix (a Rectangular State)

Next, referring to FIG. 5 and later drawings, a scrambling process in a data conversion process on data of 256 bits will be described below. Hereinafter, a scrambling example in conversion processes in an algorithm [Rijndael] having a similar design principle to the AES will be described.

The data of 256 bits is divided into one-byte (8-bit) data blocks. Herein, 32 one-byte data blocks are indicated by $a_1$ to $a_{32}$, respectively. As illustrated by a rectangular matrix of data (a rectangular state) 51 in FIG. 5, 32 one-byte data blocks [$a_1$ to $a_{32}$] are stored in a 4×8 matrix. Hereinafter, data stored in the rectangular matrix is called rectangular state.

In the algorithm [Rijndael], operations extended to apply the nonlinear conversion process (SUB), the shift process (SHIFT), the linear conversion process (MAT) and the key application operation process (KADD), which are used in the square state and previously described referring to FIGS. 2 to 4, to the rectangular state are defined as below.

The operations defined in the [Rijndael] algorithm include the following four kinds illustrated in FIG. 5.

(1) Nonlinear Conversion Process (W-SUB)

An operation of updating a value by subjecting each one-byte data block to nonlinear conversion $S(x)$ on a one-byte-at-a-time basis, where as illustrated in FIG. 5(1), a relationship between a one-byte output $b_i$ after the conversion process and a one-byte input $a_i$ is:

$$b_i = S(a_i)$$

$$i=1, 2, \ldots, 32$$

(2) Shift Process (W-SHIFT)

A process of subjecting each row to a rotation shift operation. Shift amounts vary from one row to another, and in the case of the Rijndael, as illustrated in FIG. 5(2), one-byte data blocks in a first row are not rotationally shifted, and one-byte data blocks in a second row, one-byte data blocks in a third row and one-byte data blocks in a fourth row are rotationally shifted toward the right by one one-byte data block, three one-byte data blocks, and four one-byte data blocks, respectively.

(3) Linear Conversion Process (W-MAT)

An operation of updating a value by an operation on a 4×4 matrix [M] assuming that four one-byte data blocks in each column are considered as a vector.

A relationship between a one-byte output $b_i$ after the conversion process and a one-byte input $a_i$ is:

$${}^t(b_i, b_{i+8}, b_{i+16}, b_{i+}{}_{\geq}) = M^t(a_i, a_{i+8}, a_{i+16}, a_{i+24})$$

$$i=1, 2, 3, \ldots, 8$$

In addition, $^t(\ )$ indicates a transposed matrix formed by interchanging rows and columns in a matrix.

(4) Key Application Operation Process (W-KADD)

An operation of performing an exclusive OR operation between each one-byte data block and a round key [$k_i$] outputted from a key schedule section.

A relationship between a one-byte output $b_i$ after the conversion process and a one-byte input $a_i$ is:

$$b_i = a_i (XOR) k_i$$

$$i=1, 2, \ldots, 32$$

In addition, in the above-described expression, (XOR) indicates an exclusive OR operation.

A combination of the above-described operations (1) to (4) which are executed in a predetermined sequence configures one round operation. The round operation is repeatedly executed on input data to produce output data, for example, encrypted data, and then output the data. As illustrated in FIG. 6, the round operation is configured of, for example, a combination of data conversion processes which are executed in order of (1) the nonlinear conversion process (W-SUB)→(2) the shift process (W-SHIFT)→(3) the linear conversion process (W-MAT)→(4) the key application operation process (W-KADD), and the round operation is repeatedly executed a plurality of times to convert input data into output data, that is, encrypted data.

FIG. 7 is an illustration for describing a data scrambling example in the case where first to third rounds (R1 to R3) of the round operation configured of data conversion processes, which are executed in order of (1) the nonlinear conversion process (W-SUB)→(2) the shift process (W-SHIFT)→(3) the linear conversion process (W-MAT)→(4) the key application operation process (W-KADD), are executed on a rectangular state.

Refer to the one-byte data block 71 (marked with black) at the top left of a rectangular state 61 in an initial state of input data. As in the case of the above-described square state, it is apparent that after two rounds, the one-byte data block 71 affects 16 one-byte data blocks. Moreover, it is apparent that an affected range is expanded by the shift process (W-SHIFT) in the third round, and the one-byte data block 71 affects all 32 one-byte data blocks by the linear conversion process (W-MAT) in the third round immediately after the shift process (W-SHIFT).

In this case, by the processes of three rounds of the round operation, one one-byte data block affects all one-byte data blocks configuring the rectangular state. In addition, in FIG. 7, the influence of the one-byte data block 71 at the top left is described as an example, but any one-byte data block at an arbitrary position of the rectangular state affects other one-byte data blocks in the same manner, and an influence of a one-byte data block affects all other one-byte data blocks in three rounds, that is, the influence of a one-byte data block is diffused to all other one-byte data in three rounds.

Next, as in the case of the previous example of the square state (refer to FIG. 4), operation cost in terms of the number of gates is calculated. In the example illustrated in FIG. 7, as operation cost necessary for three rounds of the round operation until one one-byte data block affects all one-byte data blocks configuring the rectangular state, three times of W-SUB, W-SHIFT, W-MAT and W-KADD operations are necessary. In addition, as described above, the shift process (W-SHIFT) may be considered 0; therefore it can be estimated that the operation cost in this case is as follows:

3(W-SUB)+3(W-MAT)+3(W-KADD).

The operation costs of W-SUB, W-MAT and W-KADD are twice as high as the operation costs of SUB, MAT and KADD, respectively. Therefore, in the rectangular state, when the operation cost necessary for three rounds of the round operation until the one one-byte data block affects all one-byte data blocks configuring the rectangular state is 26K gates to 38K gates by calculation based on the numbers of gates described in a previous paragraph [0025].

As described above, in the case where as described referring to FIGS. 2 to 4, data as one-byte data blocks are arranged in a square matrix to perform a round operation, scrambling is achievable with relatively low calculation cost, but in a process using a rectangular matrix as described in FIGS. 5 to 7 designed to correspond to an input/output of 256 bits which are not allowed to be arranged in a square matrix, an issue of an increase in calculation cost arises.

DISCLOSURE OF THE INVENTION

The present invention is made to solve the above-described issue, and it is an object of the invention to provide a data converter, a data conversion method and a computer program reducing operation cost and achieving efficient diffusion in cryptographic processing, hash processing, data diffusion processing or the like which executes data scrambling in a rectangular matrix.

A first aspect of the invention provides a data converter including:

a data conversion section performing a data conversion process which repeats a round operation, the data conversion section being configured to execute, in the round operation, a linear conversion process on one of two data segments which are resultants of dividing a rectangular matrix of data into two parts, the rectangular matrix of data being configured by arranging data blocks of equal size, an exclusive OR operation between the two data segments, a shift process on one of the data segments, and a swap process between the two data segments.

Further, in an embodiment of the data converter of the invention, the data blocks of equal size are one-byte data blocks, and the data conversion section is configured to perform, in the round operation, a process on the two data segments which are resultants of dividing a rectangular matrix of data into two parts, the rectangular matrix of data being configured by arranging the one-byte data blocks.

Further, in an embodiment of the data converter of the invention, the data conversion section is configured to further execute, in the round operation, a nonlinear conversion process on one of the data segments; and a key application operation process on one of the data segments.

Further, in an embodiment of the data converter of the invention, the key application operation is an exclusive OR operation between data which configures one of the data segments and encryption key data.

Further, in an embodiment of the data converter of the invention, the data conversion section employs a result of the exclusive OR operation as updated data of one of the data segments.

Further, in an embodiment of the data converter of the invention, on execution of the shift process, the data conversion section executes a shift process so that: in such a case that a relationship of $m \leq n$ is satisfied for a data segment with m rows and n columns to be subjected to the shift process included in a rectangular matrix with m rows and 2n columns of data, respective data blocks belonging to one column before the shift process are shifted so as to belong to respective different columns after the shift process; and in such a case that a relationship of $m > n$ is satisfied, data blocks belonging to one column before the shift process, a number of the data blocks lying from $(m/n)-1$ to $(m/n)+1$ both inclusive, are shifted so as to belong to an arbitrary column after the shift process.

Further, in an embodiment of the data converter of the invention, the data conversion section executes the shift process on both of the two data segments.

Further, in an embodiment of the data converter of the invention, in the round operation, the data conversion section executes a nonlinear conversion and a shift process on one data segment A of the data segments to update the data segment A, and further executes a linear conversion process on the updated data segment A and executes the exclusive OR operation between a result of the linear conversion process and other data segment B, thereby to employ a result of the exclusive OR operation as updated data of the data segment B, and further executes the swap process between the data segment A and the data segment B, and then executes an exclusive OR operation between the data segment A and key data.

Further, in an embodiment of the data converter of the invention, in the round operation, the data conversion section executes a nonlinear conversion process, a shift process and a linear conversion process on one data segment A of the data segments to update the data segment A, and further executes the exclusive OR operation between the updated data segment A and other data segment B, thereby to employ a result of the exclusive OR operation as updated data of the data segment B, and further executes the swap process between the data segment A and the data segment B, and then executes an exclusive OR operation between the data segment A and key data.

Further, in an embodiment of the data converter of the invention, in the round operation, the data conversion section executes a nonlinear conversion process and a linear conversion process on one data segment A of the data segments and executes an exclusive OR operation between a result thereof and other data segment B, thereby to employ a result of the exclusive OR operation as updated data of the data segment B, and further executes the swap process between the data segment A and the data segment B, and executes a shift process on the data segment A, and then executes an exclusive OR operation between the data segment A and key data.

Further, in an embodiment of the data converter of the invention, in the round operation, the data conversion section executes a nonlinear conversion process, a shift process and a linear conversion process on one data segment A of the data segments, and further executes the exclusive OR operation between a result thereof and other data segment B, thereby to employ a result of the exclusive OR operation as updated data of the data segment A, and further executes the swap process between the data segment A and the data segment B, and then executes an exclusive OR operation between the data segment A and key data.

Further, in an embodiment of the data converter of the invention, the data conversion section is configured to select and use one of a plurality of different matrices for every round, in the linear conversion process in the round operation.

Further, in an embodiment of the data converter of the invention, the data conversion section is configured to select and use one of a plurality of different matrices by means of a process using a DSM (Diffusion Switching Mechanism).

A second aspect of the invention provides a data conversion method executed by a data converter, including:

a data conversion step of performing, in a data conversion section, data conversion by repeating a round operation, the data conversion step executing, in the round operation, a linear conversion process on one of two data segments which are resultants of dividing a rectangular matrix of data into two parts, the rectangular matrix of data being configured by arranging data blocks of equal size;

an exclusive OR operation between the two data segments;

a shift process on one of the data segments; and a swap process between the two data segments.

Further in an embodiment of the data conversion method of the invention, the data blocks of equal size are one-byte data blocks, and the data conversion section is configured to perform, in the round operation, a process on the two data segments which are resultants of dividing a rectangular matrix of data into two parts, the rectangular matrix of data being configured by arranging the one-byte data blocks.

Further, in an embodiment of the data conversion method of the invention, the data conversion step is configured to further execute, in the round operation: a nonlinear conversion process on one of the data segments; and a key application operation process on one of the data segments.

Further, in an embodiment of the data conversion method of the invention, the key application operation is an exclusive OR operation between data which configures one of the data segments and encryption key data.

Further, in an embodiment of the data conversion method of the invention, the data conversion step employs a result of the exclusive OR operation as updated data of one of the data segments.

Further in an embodiment of the data conversion method of the invention, on execution of the shift process, the data conversion step executes a shift process so that: in such a case that a relationship of m≦n is satisfied for a data segment with m rows and n columns to be subjected to the shift process included in a rectangular matrix with m rows and 2n columns of data, respective data blocks belonging to one column before the shift process are shifted so as to belong to respective, different columns after the shift process; and in such a case that a relationship of m>n is satisfied, data blocks belonging to one column before the shift process, a number of the data blocks lying from (m/n)−1 to (m/n)+1 both inclusive, are shifted so as to belong to an arbitrary column after the shift process.

Further, in an embodiment of the data conversion method of the invention, the data conversion step executes the shift process on both of the two data segments.

Further, in an embodiment of the data conversion method of the invention, in the round operation, the data conversion step executes a nonlinear conversion and a shift process on one data segment A of the data segments to update the data segment A, and further executes a linear conversion process on the updated data segment A and executes the exclusive OR operation between a result of the linear conversion process and other data segment B, thereby to employ a result of the exclusive OR operation as updated data of the data segment B, and further executes the swap process between the data segment A and the data segment B, and then executes an exclusive OR operation between the data segment A and key data.

Further, in an embodiment of the data conversion method of the invention, in the round operation, the data conversion step executes a nonlinear conversion process, a shift process and a linear conversion process on one data segment A of the data segments to update the data segment, and further executes the exclusive OR operation between the updated data segment A and other data segment B, thereby to employ a result of the exclusive OR operation as updated data of the data segment B, and further executes the swap process between the data segment A and the data segment B, and then executes an exclusive OR operation between the data segment A and key data.

Further, in an embodiment of the data conversion method of the invention, in the round operation, the data conversion step executes a nonlinear conversion process and a linear conversion process on one data segment A of the data segments and executes an exclusive OR operation between a result thereof and other data segment B, thereby to employ a result of the exclusive OR operation as updated data of the data segment B, and further executes the swap process between the data segment A and the data segment B, and executes a shift process on the data segment A, and then executes an exclusive OR operation between the data segment A and key data.

Further, in an embodiment of the data conversion method of the invention, in the round operation, the data conversion step executes a nonlinear conversion process, a shift process and a linear conversion process on one data segment A of the data segments, and further executes the exclusive OR operation between a result thereof and other data segment B, thereby to employ a result of the exclusive OR operation as updated data of the data segment A, and further executes the swap process between the data segment A and the data segment B, and then executes an exclusive OR operation between the data segment A and key data.

Further, in an embodiment of the data conversion method of the invention, in the data conversion step is configured to select and use one of a plurality of different matrices for every round, in the linear conversion process in the round operation.

Further, in an embodiment of the data conversion method of the invention, the data conversion step is configured to select and use one of a plurality of different matrices by means of a process using a DSM (Diffusion Switching Mechanism).

A third aspect of the invention provides a computer program executing a data conversion process in a data converter, the computer program including:

a data conversion step of performing, in a data conversion section, data conversion by repeating a round operation, the data conversion step being a step executing, in the round operation, a linear conversion process on one of two data segments which are resultants of dividing a rectangular matrix of data into two parts, the rectangular matrix of data being configured by arranging data blocks of equal size;

an exclusive OR operation between the two data segments;

a shift process on one of the data segments; and a swap process between the two data segments.

In addition, the program of the present invention is, for example, a program allowed to be provided to a general-purpose system capable of executing various program codes by a storage medium or a communication medium in a computer-readable format. The program is provided in a computer-readable format, thereby processing according to the program is implemented on a computer system.

Further objects, features, or advantages of the present invention will become apparent from the following description of exemplary embodiments of the present invention or more detailed descriptions based on the accompanying drawings. In addition, in this description, "system" refers to a logical set configuration of a plurality of devices regardless of whether the individual constituent devices are contained in one enclosure.

According to an exemplary embodiment of the invention, for example, in a configuration where a various processes are executed on two data segments which are resultants of dividing a rectangular matrix of data containing arranged one-byte data blocks into two parts to perform data conversion, efficient data scrambling with less operation cost is achieved by executing a linear conversion process on one of the data segments, an exclusive OR operation between the two data segments, a shift process on one of the data segments, and a swap process between two data segments. Moreover, cryptographic processing with a high security level is achieved by including nonlinear conversion or key application operation on the data segments.

BRIEF DESCRIPTION OF THE DRAWINGS

FIG. 1 is an illustration describing a configuration where input data is divided into one-byte data blocks, and the one-byte data blocks are arranged in a square or rectangular matrix and are subjected to data scrambling in which a process on a one-row-at-a-time basis or a process on a one-column-at-a-time basis is repeated.

FIG. 5 is an illustration describing an operation example on a rectangular matrix of data (a rectangular state).

FIG. 8 is an illustration describing a processing example on a half data segment of a rectangular state.

FIG. 13 is an illustration describing an example of data processing executed in the round operation in the first exemplary embodiment of the invention.

FIG. 29 is an illustration describing a data conversion process on a general form in which data containing 2 nm one-byte data blocks in total is a rectangular state with 2n columns and m rows containing 2 nm one-byte data blocks $a_1$ to $a_{2mn}$.

BEST MODE(S) FOR CARRYING OUT THE INVENTION

Figure 2:
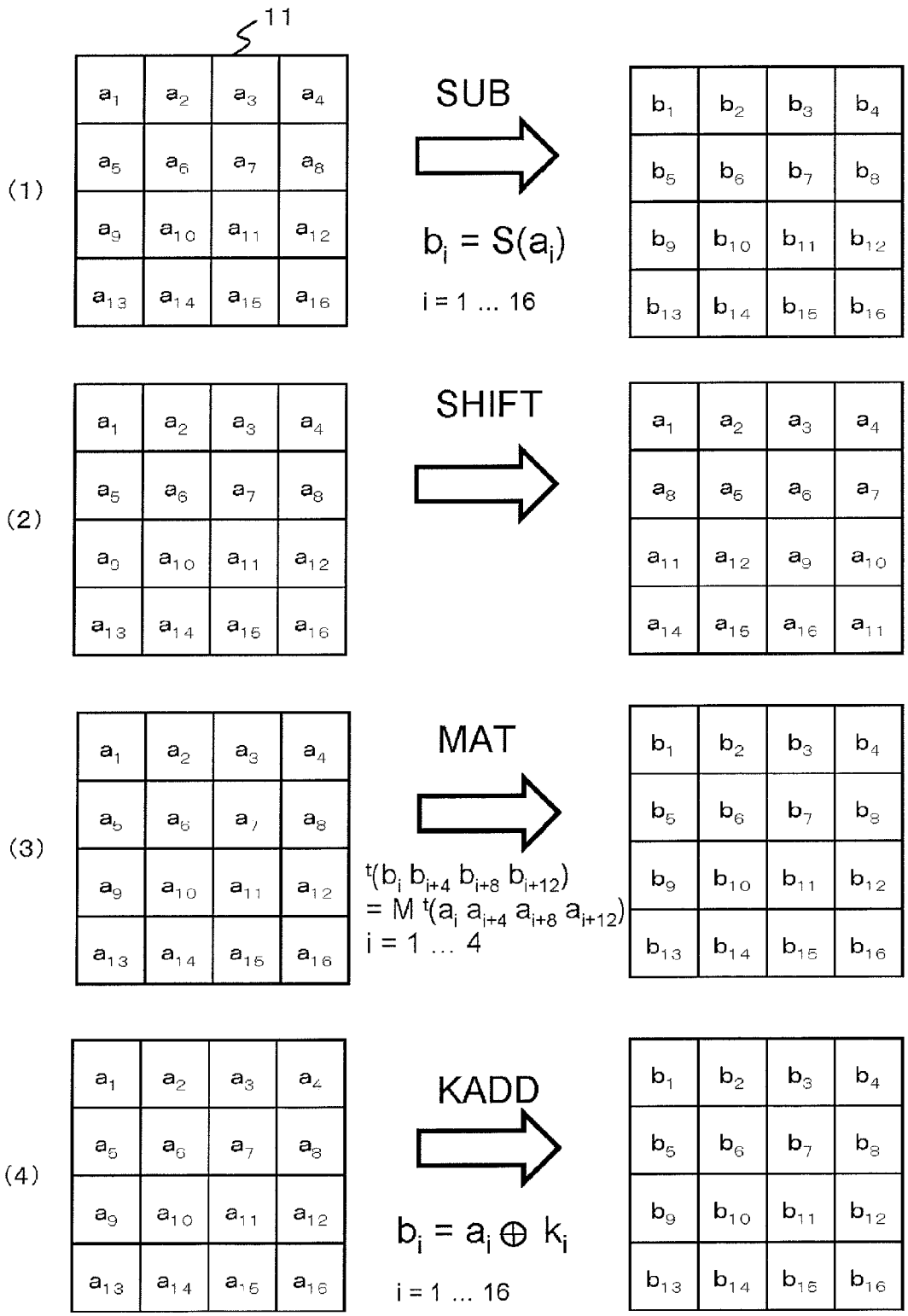
FIG. 2 is an illustration describing an operation example on a square state in an AES block cipher algorithm.
Figure 3:
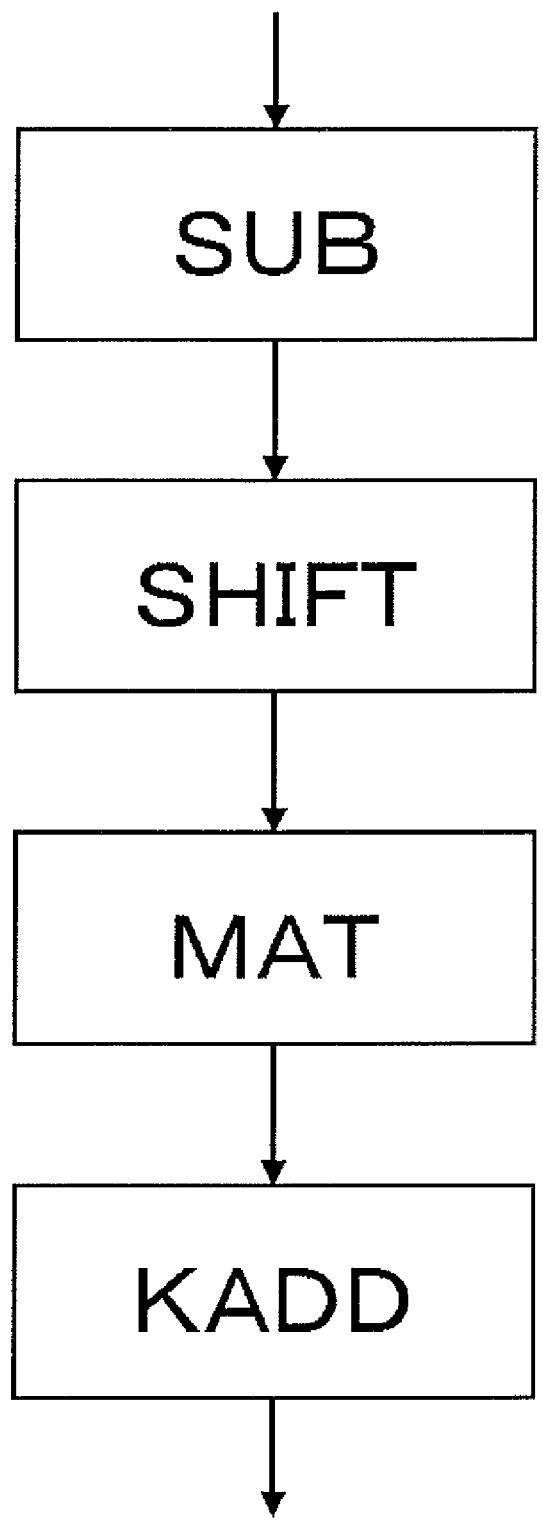
FIG. 3 is an illustration describing a round operation in the AES block cipher algorithm.
Figure 4:
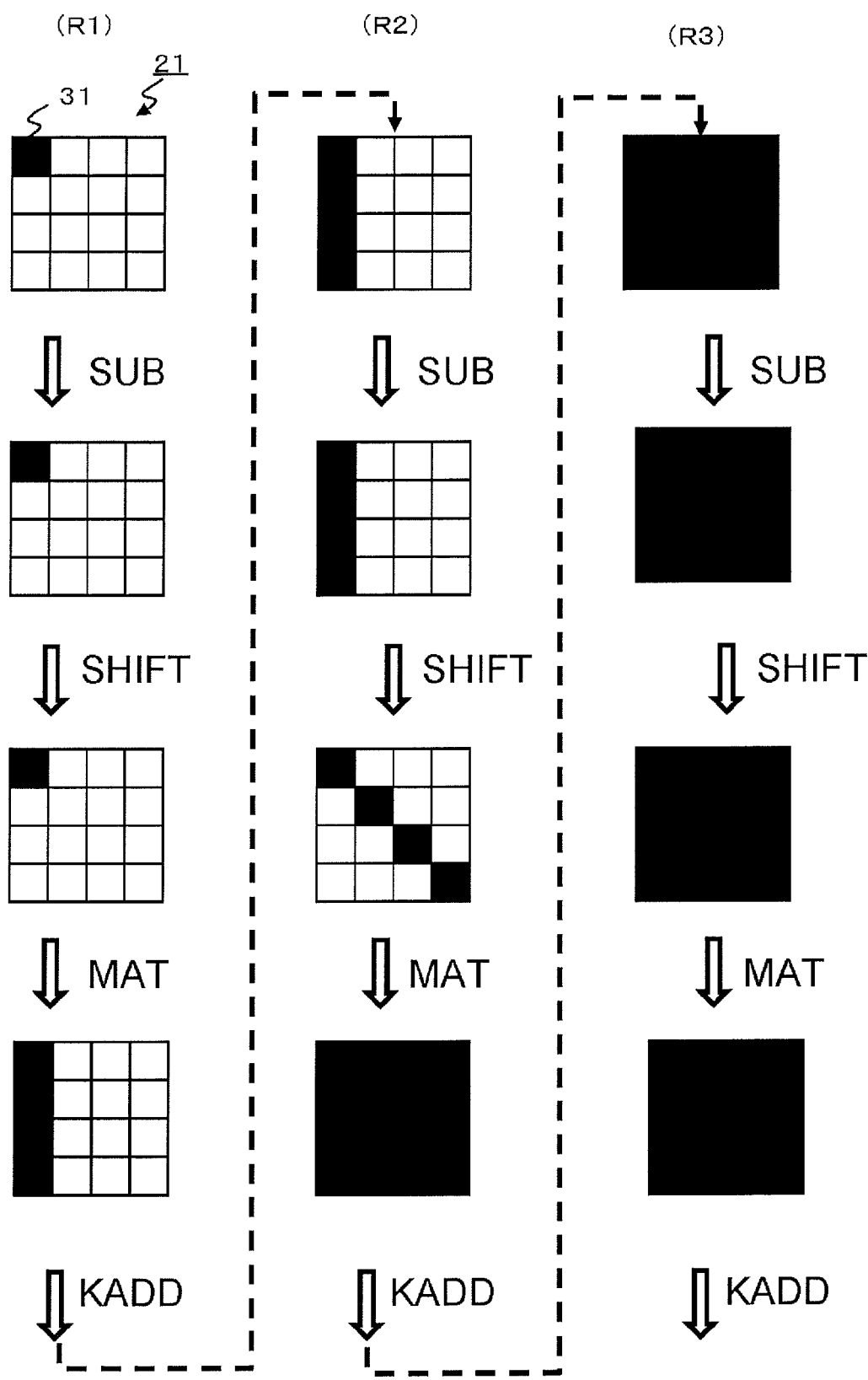
FIG. 4 is an illustration describing a data diffusion example by the round operation on the square state.

A data converter, a data conversion method and a computer program of the present invention will be described in detail below referring to the accompanying drawings.

In the case where, for example, an input/output configures a matrix containing data of 256 bits or the like, that is, one-byte data blocks of 8 bits, the present invention proposes a configuration efficiently executing a data scrambling process on data of a number of bits which does not configure a square matrix, that is, more specifically, data of a number of bits (or a number of bytes) not satisfying the following case:

the case of the number of bits=$8 \times (n)^2$ (where n is a natural number), in byte terms, the case of the number of bytes=$(n)^2$ (where n is a natural number).

As previously described referring to FIGS. 1 to 7, data of a number of bits not configuring a square matrix configure a rectangular matrix illustrated in FIG. 1(b), and a process is performed on the data. The invention proposes a technique of reducing operation cost and achieving sufficient scrambling capability in a process using such a rectangular state.

For example, one specific example is configured to perform operations such as nonlinear conversion, linear conversion and key addition only on one of two data segments which are resultants of dividing a rectangular matrix of data containing arranged data blocks of equal size, for example, one-byte data blocks into two parts, and then perform an exclusive OR (XOR) operation, a swap (SWAP) operation or the like with low operation cost. In such a configuration, sufficient scrambling capability is achieved at a low throughput. When a configuration proposed in the invention is applied, an operational load is reduced to obtain sufficient diffusion performance, and cryptographic processing, hash processing, scrambling processing or the like is allowed to be performed at high speed with a small circuit site.

As described above, a round operation including a combination of a plurality of operations is repeatedly executed in an algorithm such as AES or Rijndael. The round operation includes a nonlinear conversion process (SUB, W-SUB), a shift process (SHIFT, W-SHIFT), a linear conversion process (MAT, W-MAT) and a key application operation process (KADD, W-KADD).

Among these processes, the nonlinear conversion process (SUB, W-SUB) and the linear conversion process (MAT, W-MAT) are relatively heavy processes, that is, processes with high operation cost. Therefore, it is considered that when the processes with high operation cost are allowed to be reduced, the total operation cost is allowed to be reduced.

The above-described Rijndael algorithm is an algorithm performing the nonlinear conversion process (W-SUB), the linear conversion process (W-MAT) or the like on all data of the rectangular state, but one exemplary embodiment of the invention is configured to perform the nonlinear conversion process, the linear conversion process or the key application operation on not all data of the rectangular state but on only one of two data segments which are resultants of dividing the rectangular state into two pans, and diffuse an influence of the one data segment to the remaining data by an operation with relatively low processing cost such as the shift process or a swap operation, thereby sufficient difficulbity is achieved.

In addition, in the description, a process on all data of the rectangular matrix of data (a rectangular state) configured of one-byte data blocks and a process on one of two data segments which are resultants of dividing the rectangular matrix of data (the rectangular state) into two parts will be distinctively described by the following notations. A process on all data of the rectangular state is indicated with a notation [W-] such as, for example, a nonlinear conversion process (W-SUB) or a linear conversion process (W-MAT), and a process on a half data segment is indicated with a notation [H-] such as a nonlinear conversion process (H-SUB) or a linear conversion process (H-MAT).

FIG. 8 illustrates processes on two data segments which are resultants of dividing a rectangular state configured of 4×8=32 one-byte data blocks (256 bits) into two parts, that is, the following processing examples:

(1) Nonlinear conversion process (H-SUB)
(2) Linear conversion process (H-MAT)
(3) Key application operation (H-KADD)

In addition, FIG. 8 illustrates an example in which the above-described operations are applied to only a left-half data segment of the rectangular state. An equivalent operation reduction effect is exerted in both cases where operations are subjected to the left-half data segment and where operations are subjected to a right-half data segment.

Each operation illustrated in FIG. 8 is as described in detail below.

(1) Nonlinear Conversion Process (H-SUB)

An operation of updating a value by subjecting each one-byte data block of the left-half data segment of the rectangular state to nonlinear conversion S(x) on a one-byte-at-a-time basis, where as illustrated in FIG. 8(1), a relationship between a one-byte output $b_i$ after the conversion process and a one-byte input $a_i$ is:

$$b_i = S(a_i), \text{ if } i=1 \text{ to } 4, 9 \text{ to } 12, 17 \text{ to } 20, 25 \text{ to } 28$$

$$b_i = a_i, \text{ else}$$

As described above, the right-half data segment is not changed.

(2) Linear Conversion Process (H-MAT)

An operation of updating a value by an operation on a 4×4 matrix [M] on each one-byte data block of the left-half data segment of the rectangular state assuming that four one-byte data blocks in each column are considered as a vector.

A relationship between a one-byte output $b_i$ after the conversion process and a one-byte input $a_i$ is:

$${}^t(b_i, b_{i+8}, b_{i+16}, b_{i+24}) = M^t(a_i, a_{i+8}, a_{i+16}, a_{i+24})$$

where i=1, 2, 3, 4, $${}^t(b_i, b_{i+8}, b_{i+16}, b_{i+24}) = {}^t(a_i, a_{i+8}, a_{i+16}, a_{i+24})$$

i=5, 6, 7, 8

As described above, linear conversion using the matrix [M] is executed on each one-byte data block of the left-half data segment of the rectangular state, and the right-half data segment is not changed.

In addition, $^t(\,)$ indicates a transposed matrix formed by interchanging rows and columns in a matrix.

(3) Key Application Operation Process (H-KADD)

An operation of performing an exclusive OR operation between each one-byte data block of the left-half data segment of the rectangular state and a round key $[k_i]$ outputted from a key schedule section.

A relationship between a one-byte output $b_i$ after the conversion process and a one-byte input $a_i$ is:

$$b_i = a_i(XOR)k_i, \text{ if } i=1 \text{ to } 4, 9 \text{ to } 12, 17 \text{ to } 20, 25 \text{ to } 28,$$

$$b_i = a_i, \text{ else}$$

As described above, the right-half data segment is not changed.

In addition, in the above-described expression, (XOR) indicates an exclusive OR operation.

Thus, the nonlinear conversion process (H-SUB), the linear conversion process (H-MAT), and the key application operation (H-KADD) are executed on each one-byte data block of the left-half data of the rectangular state, and a combination of operations with relatively low processing cost such as shift and swap are executed on other data to achieve sufficient diffusibility, thereby a replace function with high performance is achieved. In addition, in a general cryptographic algorithm, the key application operation process (H-KADD) is generally defined according to the processing size of the nonlinear conversion process (H-SUB).

As an objective, for example, in the case where data conversion or cryptographic processing, in which a round operation is repeatedly executed on 4×8=32 one-byte data blocks (256 bits) as illustrated in FIG. 8, is configured to execute one nonlinear conversion process (H-SUB) and one linear conversion process (H-MAT) which are operations on one-byte data blocks of a half data segment of the rectangular state in each round, it is desirable that the data conversion or the cryptographic processing is allowed to be configured so that all 32 one-byte data blocks are affected in five rounds of the round operation.

Figure 6:
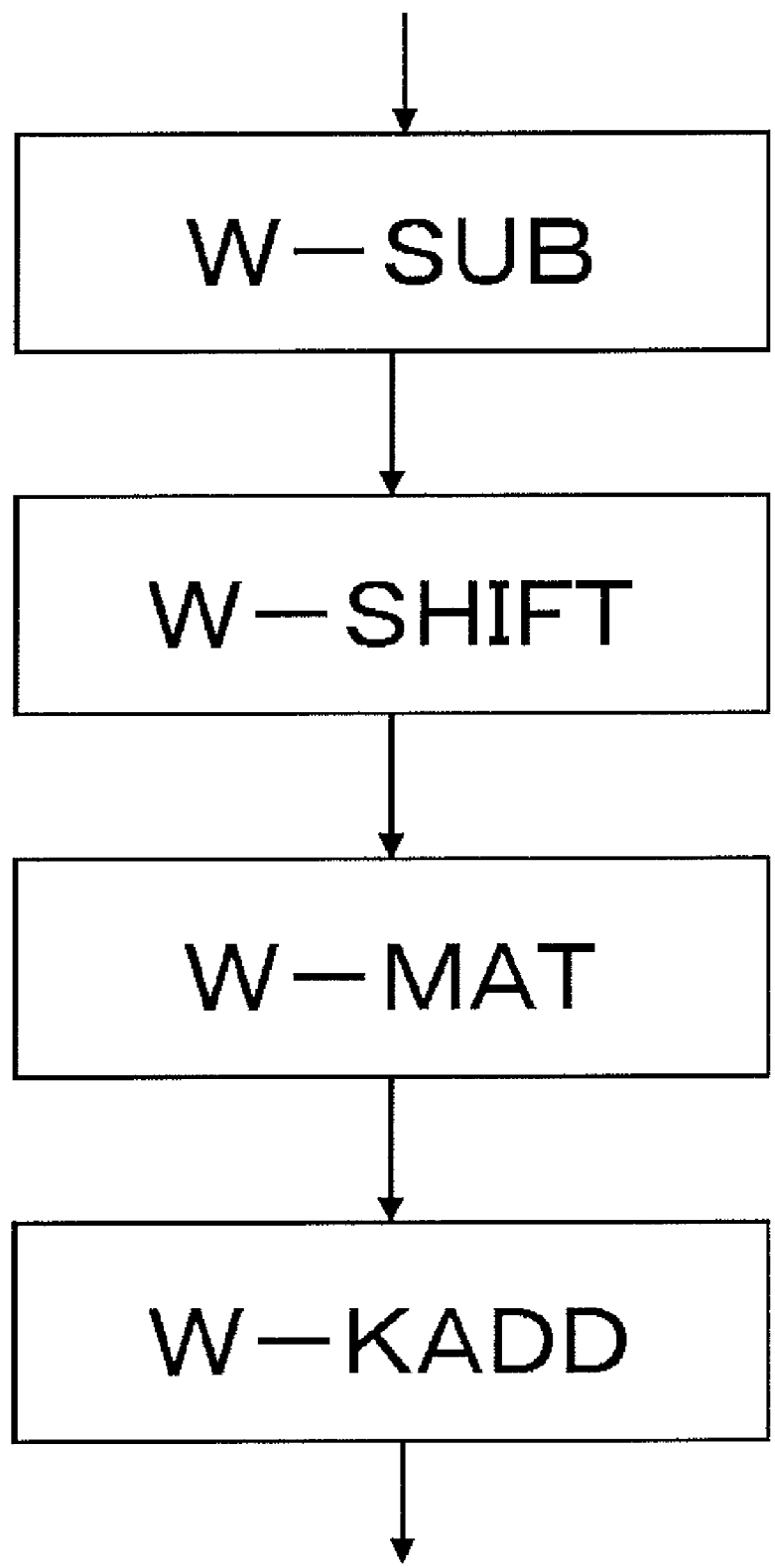
FIG. 6 is an illustration describing a round operation example on the rectangular matrix of data (the rectangular state).
Figure 7:
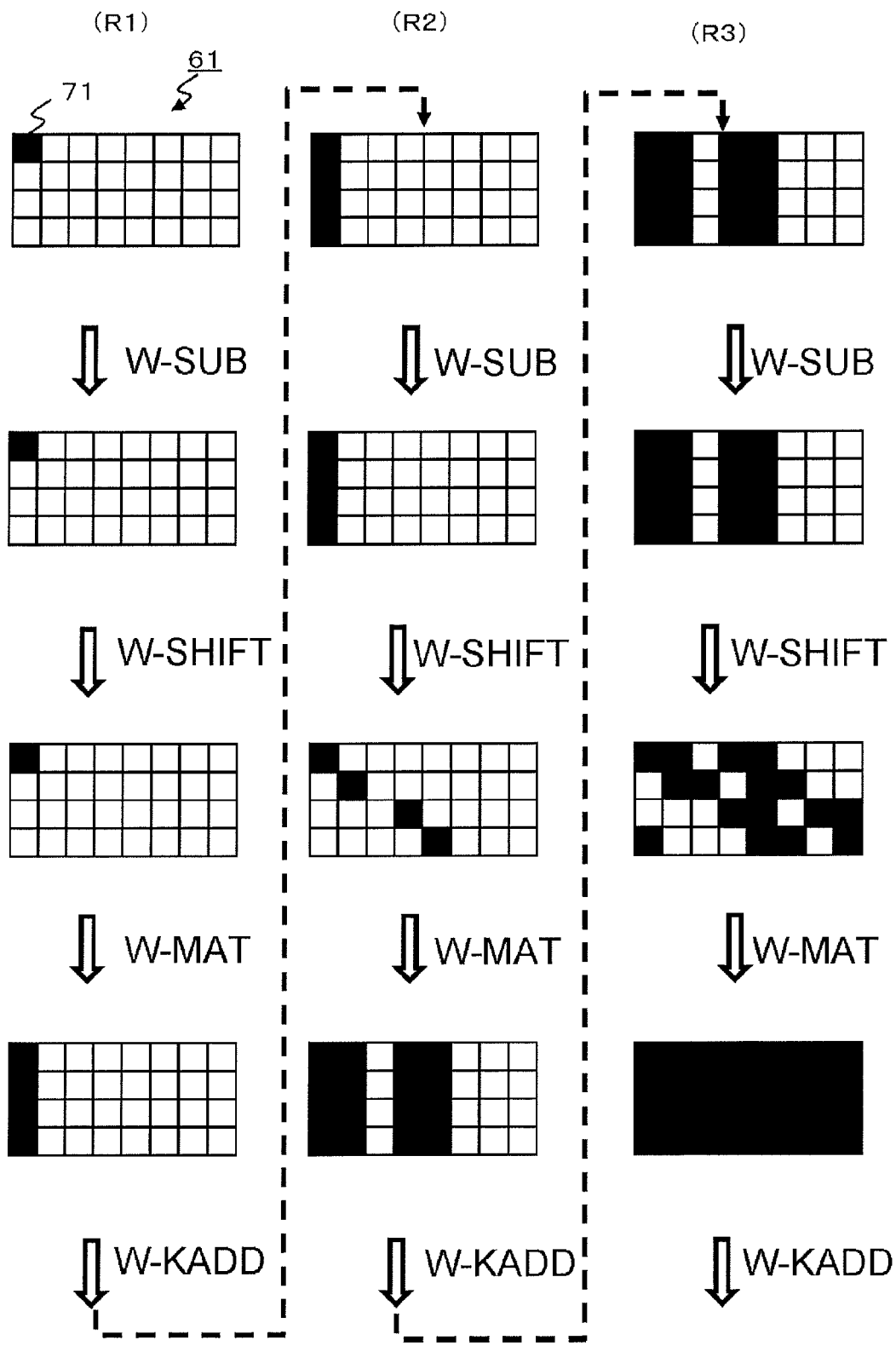
FIG. 7 is an illustration describing a data diffusion example by a round operation on the rectangular state.

It is because in a configuration in which the nonlinear conversion process (W-SUB) or the linear conversion process (W-MAT) is executed on the whole rectangular state previously described referring to FIGS. 5 to 7, one one-byte data block is allowed to affect all one-byte data blocks of the rectangular state in three rounds of the round operation, so even if one one-byte data block is allowed to affect all one-byte data blocks in 6 rounds, which is twice as many as three rounds, of the round operation using the nonlinear conversion process (H-SUB) or the linear conversion process (H-MAT) which is assumed to have half the cost of the configuration, efficient superiority is eliminated. Therefore, a configuration in which one one-byte data block is allowed to affect all one-byte data blocks of the rectangular state in five rounds is desired.

First, data diffusion configured to perform one round of a round operation including a combination of the following processes on two data segments which are resultants of dividing the above-described rectangular state into two parts, and a shift process (W-SHIFT) on all data of the rectangular state will be considered:

(1) Nonlinear conversion process (H-SUB)
(2) Linear conversion process (H-MAT)
(3) Key application operation (H-KADD)

Figure 9:
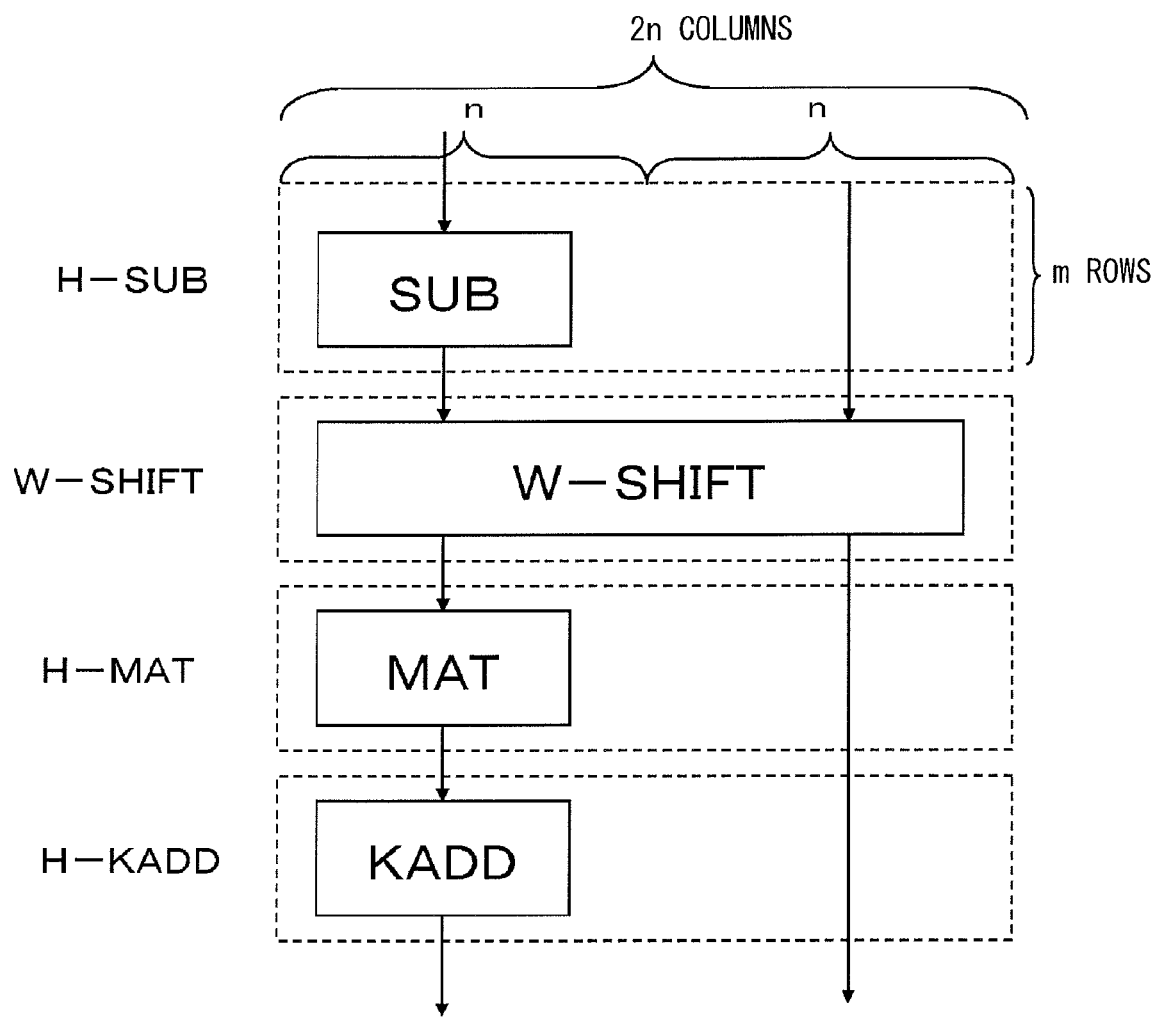
FIG. 9 is an illustration describing a round operation processing example on a rectangular state.

That is, as illustrated in FIG. 9, a round operation configured of the following processes (1) to (4) as one round of operations is executed on a rectangular state (with 2n columns×m rows) configured of a number nm of one-byte data blocks (where 2n≠m):

(1) Nonlinear conversion process (H-SUB) on a half data segment of the rectangular state
(2) Shift process (W-SHIFT) on all data of the rectangular state
(3) Linear conversion process (H-MAT) on a half data segment of the rectangular state
(4) Key application operation (H-KADD) on a half data segment of the rectangular state.

In addition, the shift process (W-SHIFT) is the same process as the shift process (W-SHIFT) in the above-described [Rijndael] algorithm, and is a process of subjecting each row to a rotation shift operation, and is a process in which as illustrated in FIG. 5(2), one-byte data blocks in a first row are not rotationally shifted, and one-byte data blocks in a second row, one-byte data blocks in a third row and one-byte data blocks in a fourth row are rotationally shifted toward the right by one one-byte data block, three one-byte data blocks, and four one-byte data blocks, respectively.

Figure 10:
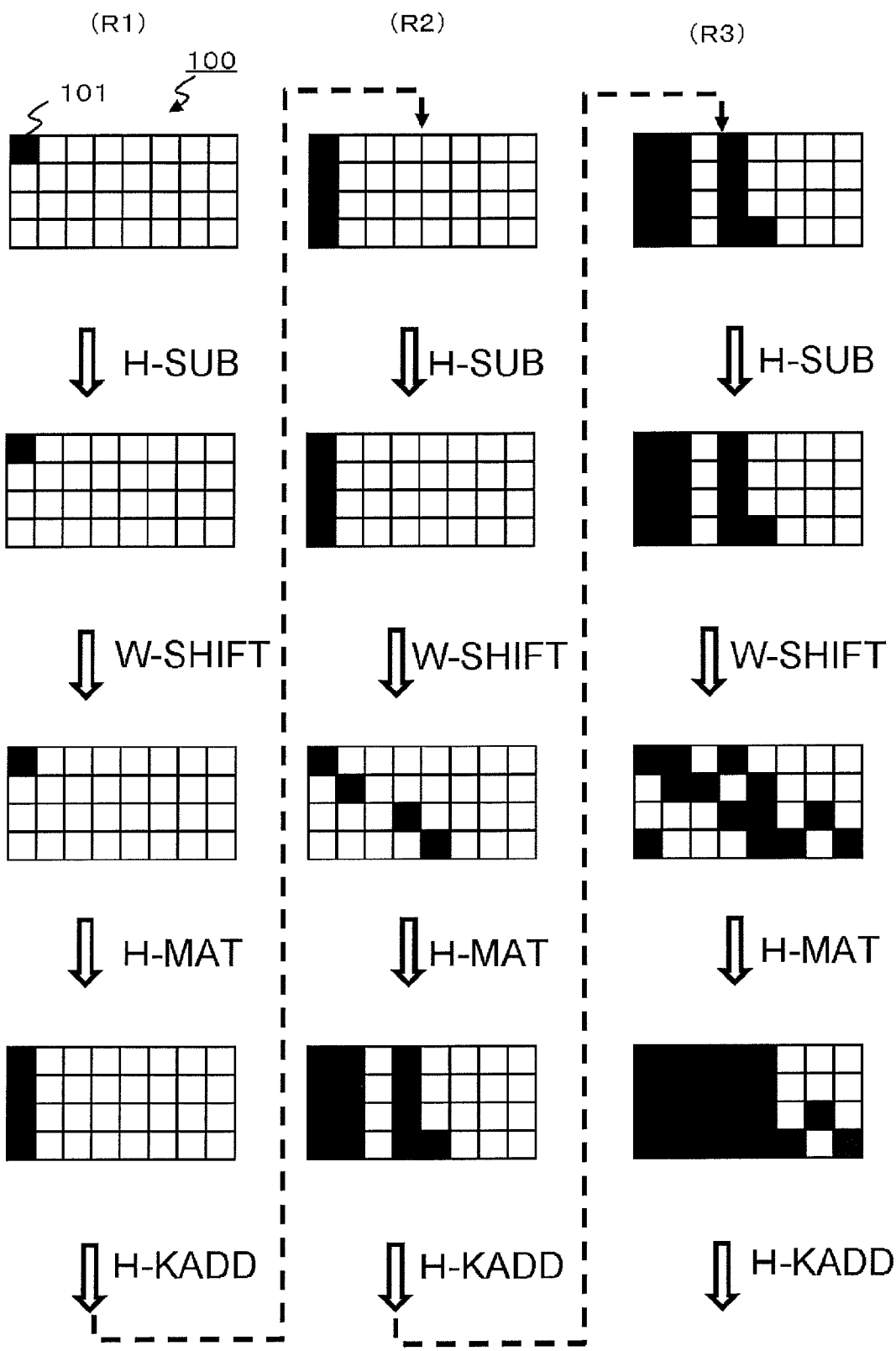
FIG. 10 is an illustration describing a data diffusion example by round operation processing on a rectangular state.

A data diffusion example in the case where such a round operation is executed will be described referring to FIG. 10. Refer to a one-byte data block 101 (marked with black) at the top left of a rectangular state 100 in an initial state of input data. It is understood from the drawing that after execution of two rounds of the round operation, an influence of constituent bits of the one-byte data block 101 at the top left of the rectangular state 100 affects, that is, is diffused to ¾ of one-byte data blocks in a left-half data segment and one one-byte data block in a right-half data segment, and after 3 rounds, the influence affects all of one-byte data blocks in the left-half data segment and 7 one-byte data blocks in the right-half data segment.

However, the one-byte data block 101 at the top left of the rectangular state 100 in the initial state of the input data does not affect all one-byte data blocks of the rectangular state 100 in three rounds.

Figure 11:
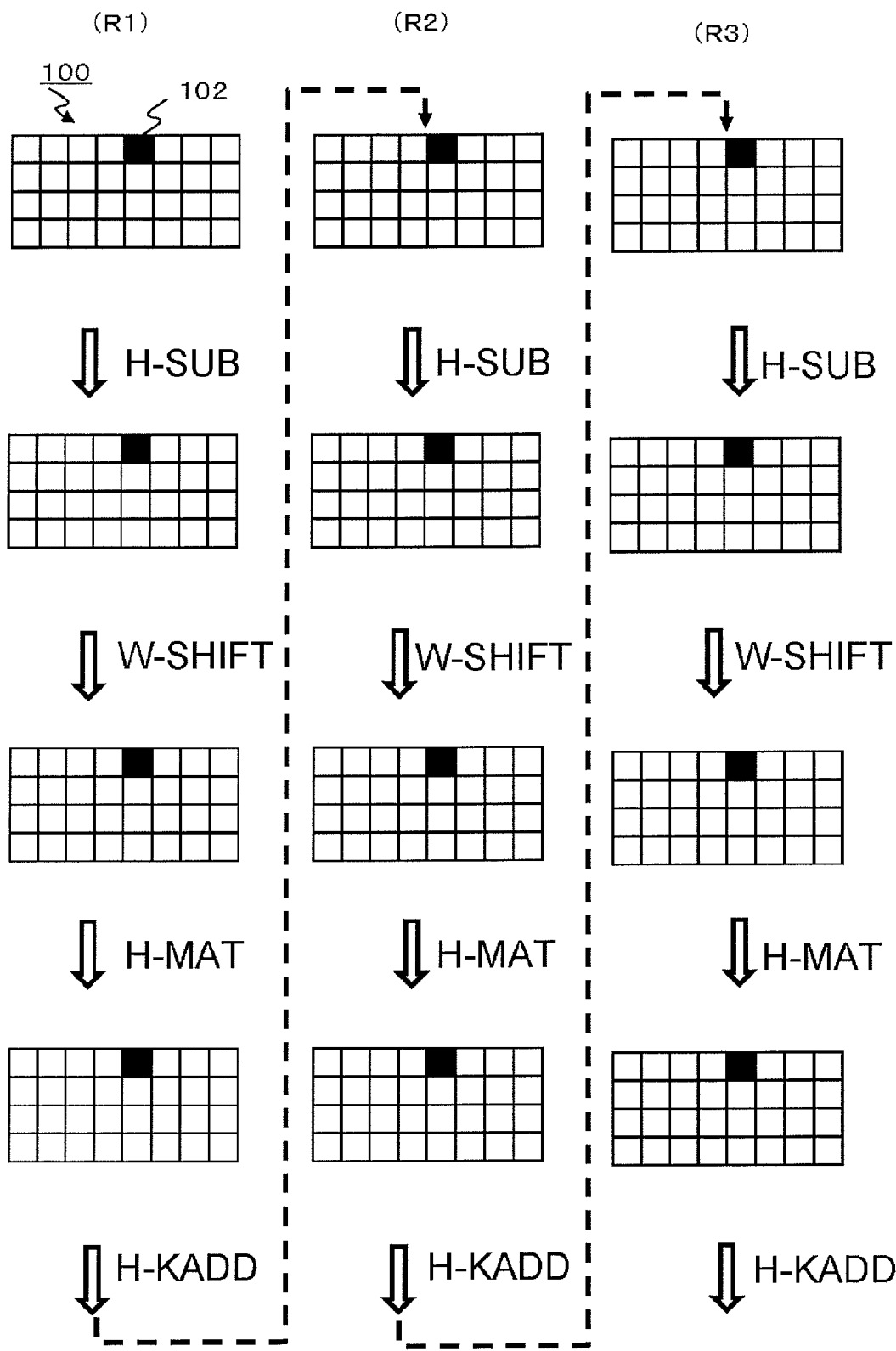
FIG. 11 is an illustration describing a data diffusion example by round operation processing on a rectangular state.

Next, an influence of a one-byte data block at the top left of the right-half data segment of the rectangular state 100 in the same process, that is, the fifth one-byte data block from the left in the uppermost row is illustrated in FIG. 11.

Refer to the fifth one-byte data block 102 (marked with black) from the left in the uppermost row of the rectangular state 100 in the initial state of input data. It is understood from the drawing that the one-byte data block 102 does not at all affect other data until after execution of three rounds of the round operation. It is because a process executed on the right-half data segment is only the shift process (W-SHIFT), but one-byte data blocks in the uppermost row are not shifted, so they are not moved.

Moreover, as long as data are located in the right-half data segment, the data are not selected as objects to be subjected to the nonlinear conversion process (H-SUB), the linear conversion process (H-MAT) and the key application operation (H-KADD), so an affected range is not expanded. Therefore, even if round processing is repeated endlessly, other bytes are not affected. This is an undesirable property as a function used in cryptographic processing.

Thus, as illustrated in FIG. 9, in a configuration in which a round operation configured of the following operations (1) to (4) as one round of operations is executed, sufficient diffusion is not executed, so the configuration is not preferably applied to cryptographic processing, hash processing, data diffusion processing or the like.

(1) Nonlinear conversion process (H-SUB) on a half data segment of the rectangular state
(2) Shift process (W-SHIFT) on all data of the rectangular state
(3) Linear conversion process (H-MAT) on a half data segment of the rectangular state
(4) Key application operation (H-KADD) on a half data segment of the rectangular state Hereinafter, in view of such an issue, an algorithm according to the invention having sufficient diffusibility performance with a small number of rounds will be described below.

Exemplary Embodiment 1

Figure 12:
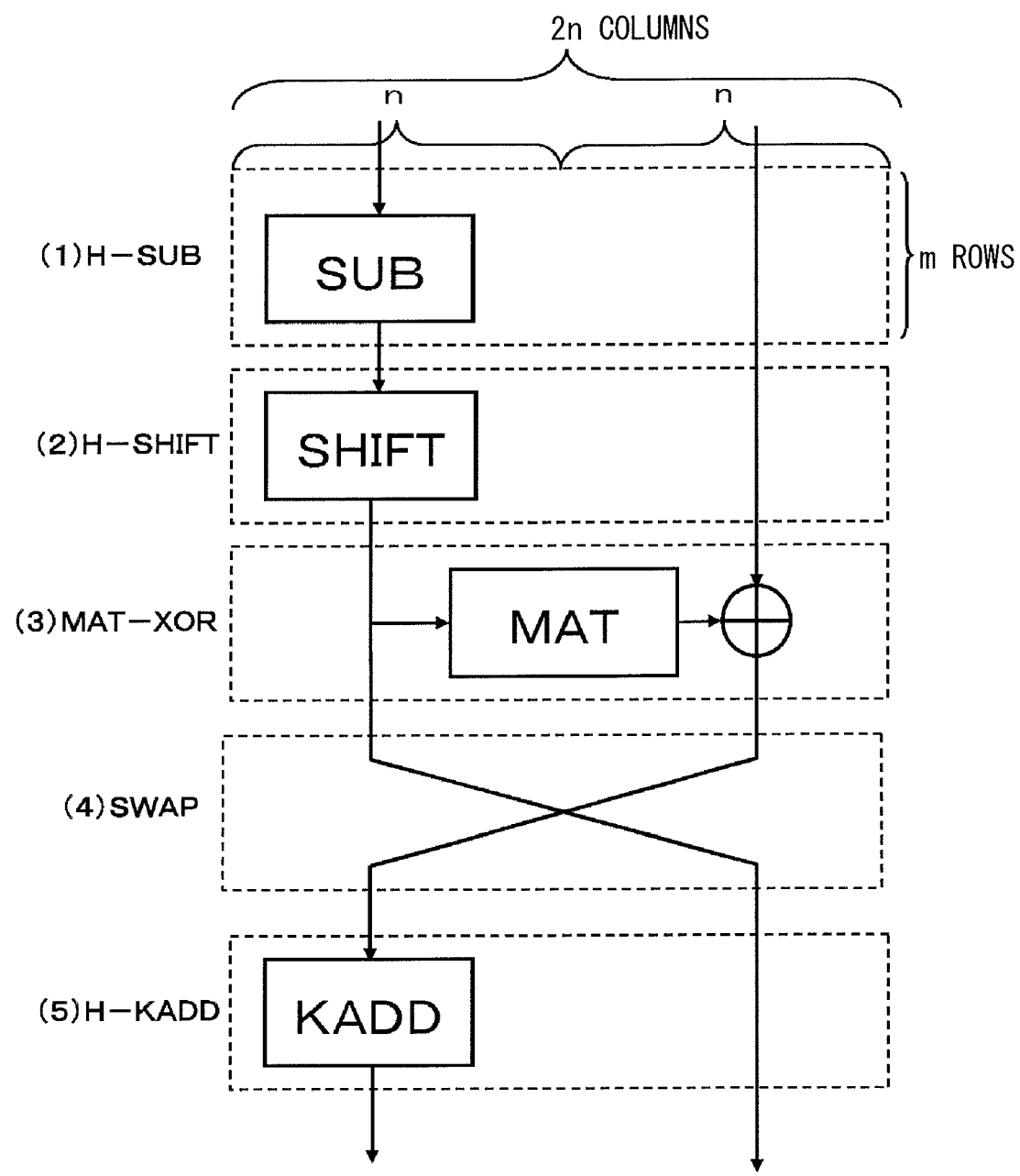
FIG. 12 is an illustration describing a configuration example of a round operation in a first exemplary embodiment of the invention.

A configuration of a round operation in a first exemplary embodiment of the invention will be illustrated in FIG. 12. A processing sequence of the round operation in Exemplary Embodiment 1 is as below.

(1) Nonlinear conversion process (H-SUB) on a half data segment of a rectangular state
(2) Shift process (H-SHIFT) on a half data segment of the rectangular state
(3) Process (MAT-XOR) of performing a linear conversion process on a half data segment of the rectangular state and then performing an exclusive OR operation (XOR) between the half data segment and the other half data segment
(4) Swap process (SWAP) of interchanging two half data segments of the rectangular state
(5) Process (H-KADD) of performing an exclusive OR operation between a half data segment of the rectangular state and a round key [$k_i$]

These processes (1) to (5) configure a round operation.

When round operation processing of Exemplary Embodiment 1 is summarized, a data conversion section of a data converter executes the following round operation. The nonlinear conversion process and the shift process are executed on one data segment A of two data segments which are resultants of dividing the rectangular state into two parts so as to update the data segment A, and further, the linear conversion process is executed on the updated data segment A, and an exclusive OR operation is executed between the updated data segment A and the other data segment B, then a result of the exclusive OR operation is employed as updated data of the data segment B, and after the swap process between the data segments A and B, an exclusive OR operation process is executed between the data segment A and key data. Such round processing is executed.

In addition, in the exemplary embodiment, a configuration in which a left-half data segment of the rectangular state is selected and main operation processes such as the nonlinear conversion process (H-SUB) are executed on the left-half data segment is described, but a configuration in which main operations are executed on a right-half data segment may be used. In other words, in processes which will be described below, even if the processes are performed on the right-half data segment instead of the left-half data segment, the same effects are obtained.

Each process will be described in detail below.

(1) Nonlinear Conversion Process (H-SUB) on a Half Data Segment of the Rectangular State The process is the same process as the process previously described referring to FIG. 8, and is an operation of updating a value by subjecting each one-byte data block of a left-half data segment of the rectangular state to nonlinear conversion S(x) on a one-byte-at-a-time basis.

As illustrated in FIG. 8(1), a relationship between a one-byte output $b_i$ after the conversion process and a one-byte input $a_i$ is:

$b_i = S(a_i)$, if $i=1$ to 4, 9 to 12, 17 to 20, 25 to 28

$b_i = a_i$, else

As described above, the right-half data segment is not changed.

(2) Shift Process (H-SHIFT) on a Half Data Segment of the Rectangular State

The shift process (H-SHIFT) will be described referring to FIG. 13(A). One-byte data blocks in each row of only the left-half data segment of the rectangular state are shifted by a shift amount (0 to (n−1)) varying from one row to another. For example, as in the case of the shift process on a square state previously described referring to FIG. 2, one-byte data blocks in a first row are not rotationally shifted, and one-byte data blocks in a second row, one-byte data blocks in a third row and one-byte data blocks in a fourth row are rotationally shifted toward the right by one one-byte data block, two one-byte data blocks, and three one-byte data blocks, respectively.

Process (MAT-XOR) of performing a linear conversion process on a half data segment of the rectangular state and then performing an exclusive OR operation (XOR) between the half data segment and the other half data segment The linear conversion and the exclusive OR operation (MAT-XOR) will be described referring to FIG. 13(B).

A 4×4 matrix operation is performed by using a preset linear conversion matrix [M] assuming data in each column of the left-half data segment of the rectangular state is considered as a vector, and, an exclusive OR operation (XOR) is performed between a result of the 4×4 matrix operation and data in a corresponding column of a right-half data segment, and a result of the exclusive OR operation (XOR) is employed as updated data of the right-half data segment. The left-half data segment is not updated.

A relationship between a one-byte output $b_i$ after the conversion process and a one-byte input $a_i$ is:

(3-1) Left-Half Data Segment $^t(b_i, b_{i+8}, b_{i+16}, b_{i+24}) = {}^t(a_i, a_{i+8}, a_{i+16}, a_{i+24})$ i=1, 2, 3, 4

(3-2) Right-Half Data Segment $^t(b_{i+4}, b_{i+12}, b_{i+20}, b_{i+28}) = [M^t(a_i, a_{i+8}, a_{i+16}, a_{i+24})]$
$(XOR)^t(a_{i+4}, a_{i+12}, a_{i+20}, a_{i+28})$ i=1, 2, 3, 4

In addition, $^t(\ )$ indicates a transposed matrix formed by interchanging rows and columns in a matrix.

That is, a 4×4 matrix operation is performed by using data in the first column from the left of the left-half data segment and the preset linear conversion matrix [M], and a result of executing an exclusive OR operation (XOR) between a result of the 4×4 matrix operation and data in the first column from the left of the right-half data segment (in the fifth column from the left in the rectangular state) is employed as updated data of the data in the first column from the left of the right-half data segment (in the fifth column from the left in the rectangular state). Hereinafter, in the same manner, the 4×4 matrix operation is performed by using data in the second column from the left of the left-half data segment and the preset linear conversion matrix [M], and a result of executing an exclusive OR operation (XOR) between a result of the 4×4 matrix operation and data in the second column from the left of the right-half data segment (in the sixth column from the left in the rectangular state) is employed as updated data of the data in the second column from the left of the right-half data segment (in the sixth column from the left of the rectangular state). The same process is hereinafter performed.

(4) Swap Process (SWAP) of Interchanging Two Half Data Segments of the Rectangular State The swap process (SWAP) will be described referring to FIG. 13(C). As illustrated in the drawing, the process is a process of interchanging the left-half data segment and the right-half data segment of the rectangular state.

(5) Process (H-KADD) of Performing an Exclusive OR Operation Between a Half Data Segment of the Rectangular State and a Round Key $[k_i]$ The process is the same process as the process previously described referring to FIG. 8(3). An exclusive OR operation is performed between each one-byte data block and a round key $[k_i]$ outputted from a key schedule section.

A relationship between a one-byte output $b_i$ after the conversion process and a one-byte input $a_i$ is:

$b_i = a_i(XOR)k_i$, if $i=1$ to 4, 9 to 12, 17 to 20, 25 to 28

$b_i = a_i$, else

As described above, the right-half data segment is not changed.

In addition in the above-described expression, (XOR) indicates an exclusive OR operation.

As illustrated in FIG. 12, the round operation in the first exemplary embodiment of the invention is configured of the following processes (1) to (5):

(1) Nonlinear conversion process (H-SUB) on a half data segment of the rectangular state (2) Shift process (H-SHIFT) on a half data segment of the rectangular state (3) Process (MAT-XOR) of performing a linear conversion process on a half data segment of the rectangular state and then performing an exclusive OR operation (XOR) between the half data segment and the other half data segment (4) Swap process (SWAP) of interchanging two half data segments of the rectangular state (5) Process (H-KADD) of performing an exclusive OR operation between a half data segment of the rectangular state and a round key $[k_i]$ In other words, these processes in order of [H-SUB]→[H-SHIFT]→[MAT-XOR]→[SWAP]→[H-KADD] are executed as processes configuring one round operation.

Encryption of input data, hash processing or diffusion processing is performed by repeatedly executing the round operation. In the data diffusion example in Exemplary Embodiment 1 will be described referring to FIG. 14.

Figure 14:
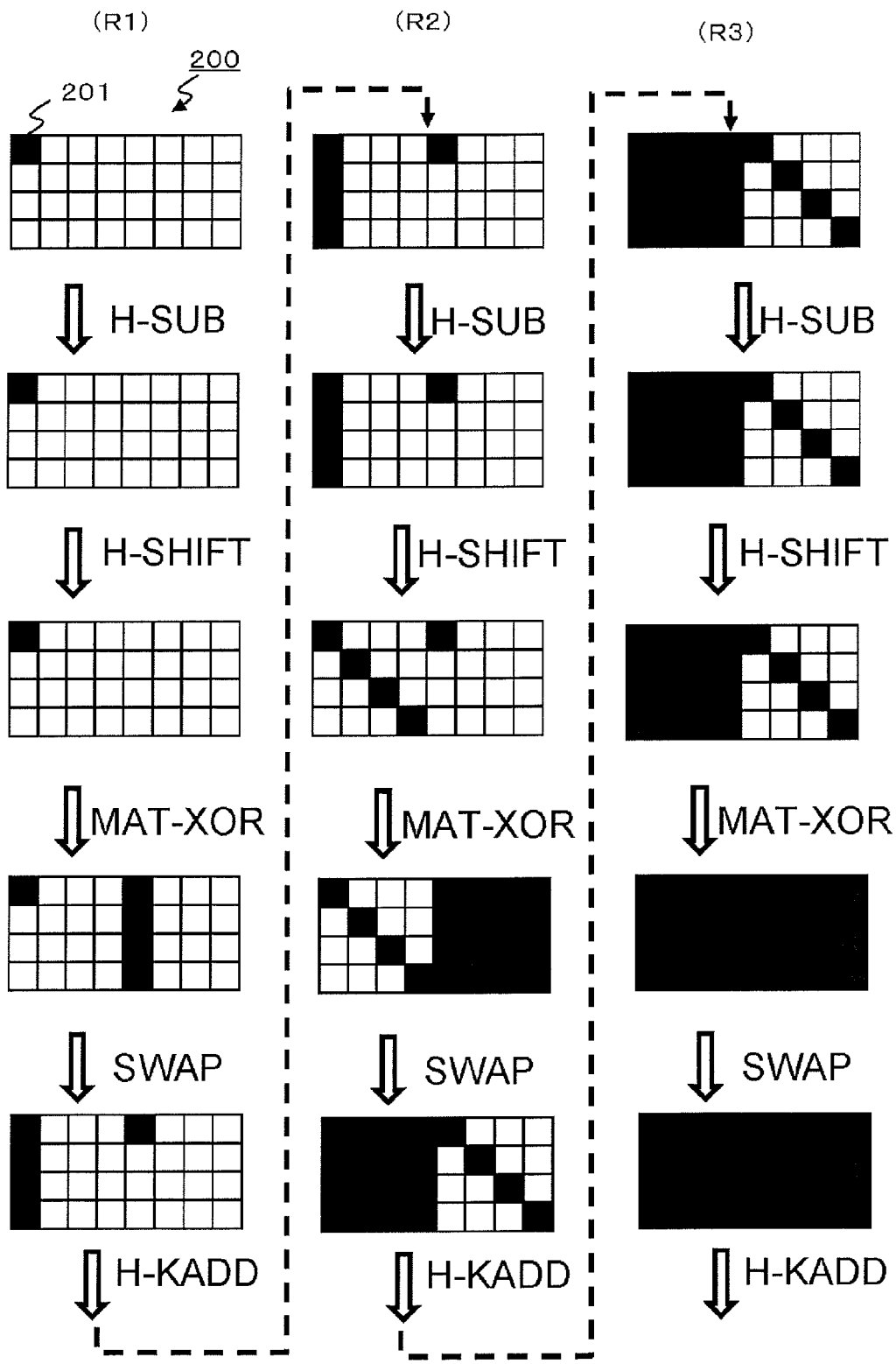
FIG. 14 is an illustration describing a data diffusion example by round operation processing in the first exemplary embodiment of the invention.

In FIG. 14, refer to a one-byte data block 201 (marked with black) at the top left of a rectangular state 200 in an initial state of input data. In each process configuring the round operation, a one-byte data block changed by constituent bits of the one-byte data 201 is indicated with black.

It is understood from the drawing that after execution of two rounds of the round operation, an influence of the one-byte data block 201 affects total 20 one-byte data blocks including all one-byte data blocks of a left-half data segment and 4 one-byte data blocks of a right-half data segment, and on completion of three rounds, the influence affects all 32 one-byte data blocks of the rectangular state 200. In addition, the drawing illustrates diffusion of the influence of the one-byte data block 201 at the top left of the rectangular state 200, but any one-byte data block included in the left-half data segment has the same property of diffusing its influence.

Figure 15:
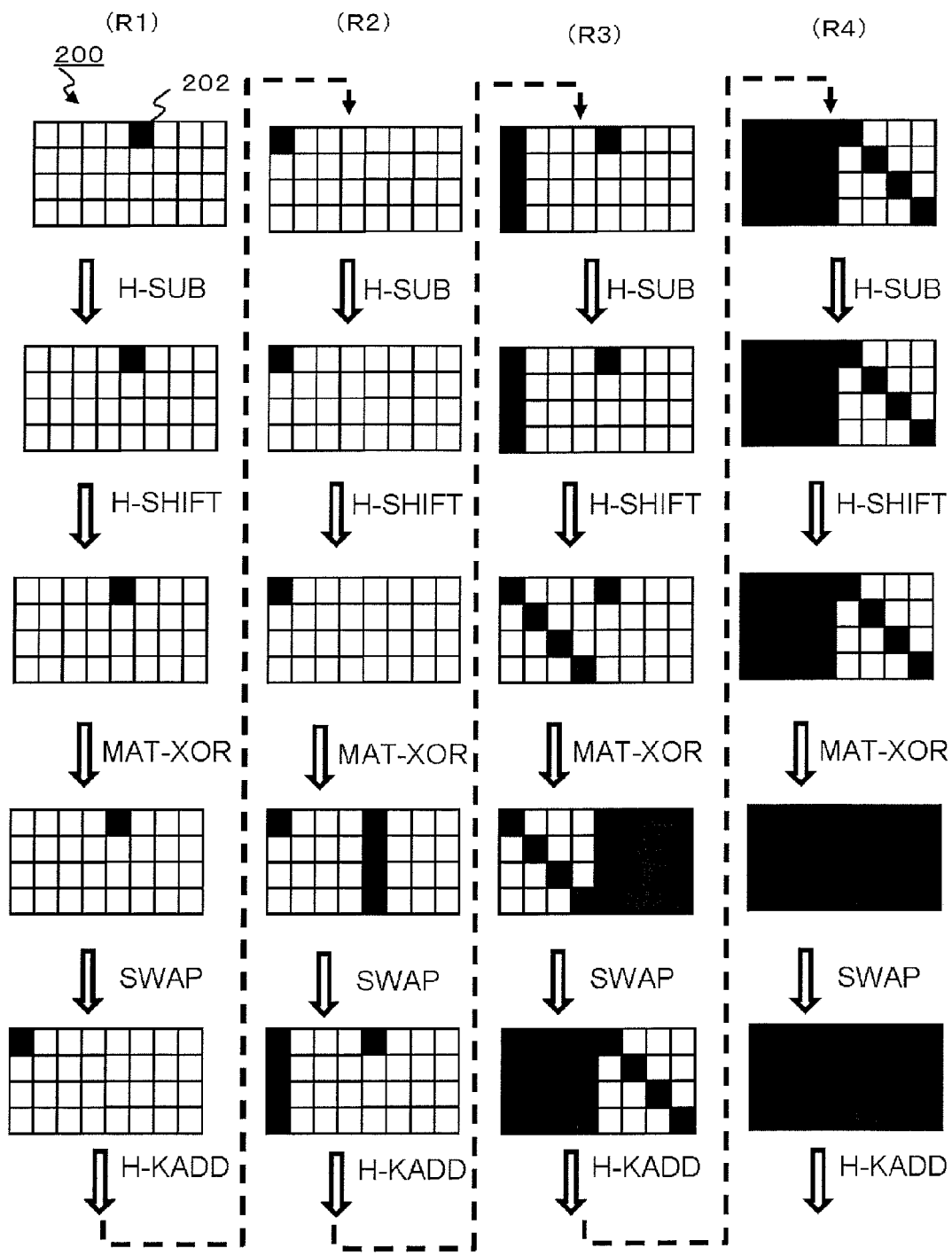
FIG. 15 is an illustration describing a data diffusion example by round operation processing in the first exemplary embodiment of the invention.

Next, referring to FIG. 15, an influence of a one-byte data block 202 at the top left of the right-half data segment of the rectangular state 200, that is, the fifth one-byte data block from the left in the uppermost row in the same process will be described below.

In the algorithm, a swap [SWAP] operation is inevitably executed once in processing in a first round, so data in the right-half data segment is moved to the left-half data segment. Once the data is moved to the left-half data segment, the same processes as the processes on the one-byte data block 201 at the top left of the rectangular state described referring to FIG. 14 are performed. Therefore, all data are then affected after 3 rounds. Therefore, an influence of the one-byte data block 202 affects all one-byte data blocks of the rectangular state in 4 rounds in total. Any one-byte data block included in the right-half data segment has the same property.

Thus, in the exemplary embodiment, the following processes (1) to (5), that is, these processes in order of [H-SUB]→[H-SHIFT]→[MAT-XOR]→[SWAP]→[H-KADD] are executed as processes configuring one round operation to achieve efficient scrambling capability:

(1) Nonlinear conversion process (H-SUB) on a half data segment of the rectangular state (2) Shift process (H-SHIFT) on a half data segment of the rectangular state (3) Process (MAT-XOR) of performing a linear conversion process on a half data segment of the rectangular state and then performing an exclusive OR operation (XOR) between the half data segment and the other half data segment (4) Swap process (SWAP) of interchanging two half data segments of the rectangular state (5) Process (H-KADD) of performing an exclusive OR operation between a half data segment of the rectangular state and a round key $[k_i]$ Operation cost in the exemplary embodiment will be considered below. Operation cost necessary for one one-byte data block configuring the rectangular state to affect all one-byte data blocks configuring the rectangular state is estimated. As described referring to FIGS. 14 and 15, 4 rounds at maximum are necessary for one one-byte data block configuring the rectangular state to affect all one-byte data blocks configuring the rectangular state.

Therefore, until one one-byte data block configuring the rectangular state affects all one-byte data blocks configuring the rectangular state, four times at maximum of the nonlinear conversion process (H-SUB), the shift process (H-SHIFT), the linear conversion and exclusive OR operation process (MAT-XOR), the swap process (SWAP), and the key application operation process (H-KADD) are necessary.

As described above, to execute the operation processes, a logical circuit, a processing program or the like is used, and a necessary arithmetic circuit or processing steed depends on the configuration of the logical circuit, the processing program or the like. Therefore, it is difficult to evaluate absolute efficiency, but the number of gates in a logical circuit necessary for the above-described operations may be used as an evaluation indicator.

For example, as described above, as a logical circuit implementation example used for a 128-bit square state, the number of gates necessary for each operation corresponds to the following number of gates:

SUB operation=approximately 3,200 to 4,800 gates
MAT operation=approximately 800 to 1,200 gates
KADD operation=approximately 320 gates The operation cost for processes on a 256-bit rectangular state may be calculated as follows.

(1) The operation cost for the nonlinear conversion process (H-SUB) on a half data segment of the rectangular state is equivalent to that for the nonlinear conversion process (SUB) on the above-described 128-bit square state (2) The operation cost for the shift process (H-SHIFT) on a half data segment of the rectangular state is 0, because it is not necessary to pass through a gate (3) The operation cost for the process (MAT-XOR) of performing a linear conversion process on a half data segment of the rectangular state and then performing an exclusive OR operation (XOR) between the half data segment and the other half data segment is equivalent to that for a process including the linear conversion process (MAT) and the key application operation process (KADD) on the 128-bit square state (4) The operation cost for the swap process (SWAP) of interchanging two half data segments of the rectangular state is 0, because it is not necessary to pass through a gate (5) The operation cost for the process (H-KADD) of performing an exclusive OR operation between a half data segment of the rectangular state and a round key $[k_i]$ is equivalent to the key application operation process (KADD) on the 128-bit square state The operation cost is estimated in this manner.

Therefore, in the exemplary embodiment, the operation cost necessary for one one-byte data block configuring the rectangular state to affect all one-byte data blocks configuring the rectangular state may be estimated as follows:

Operation cost=4SUB+4MAT+8KADD

When the operation cost is calculated based on the above-described number of gates for each operation, that is, SUB operation=approximately 3,200 to 4,800 gates
MAT operation=approximately 800 to 1,200 gates
KADD operation=approximately 320 gates the operation cost is as follows:

Operation cost=4SUB+4MAT+8KADD=19K gates to 27K gates

This operation cost is superior to the operation cost (26K gates to 38K gates) necessary for conversion processes in the algorithm [Rijndael] previously described as a processing example for the rectangular state, and more efficient diffusion on the rectangular state is achieved by executing the processes according to the exemplary embodiment. More specifically, an improvement in processing speed, downsizing of a device, or the like is achievable, and an improvement in diffusibility allows an improvement in the security level or concealment level of encrypted data.

Exemplary Embodiment 2

Figure 16:
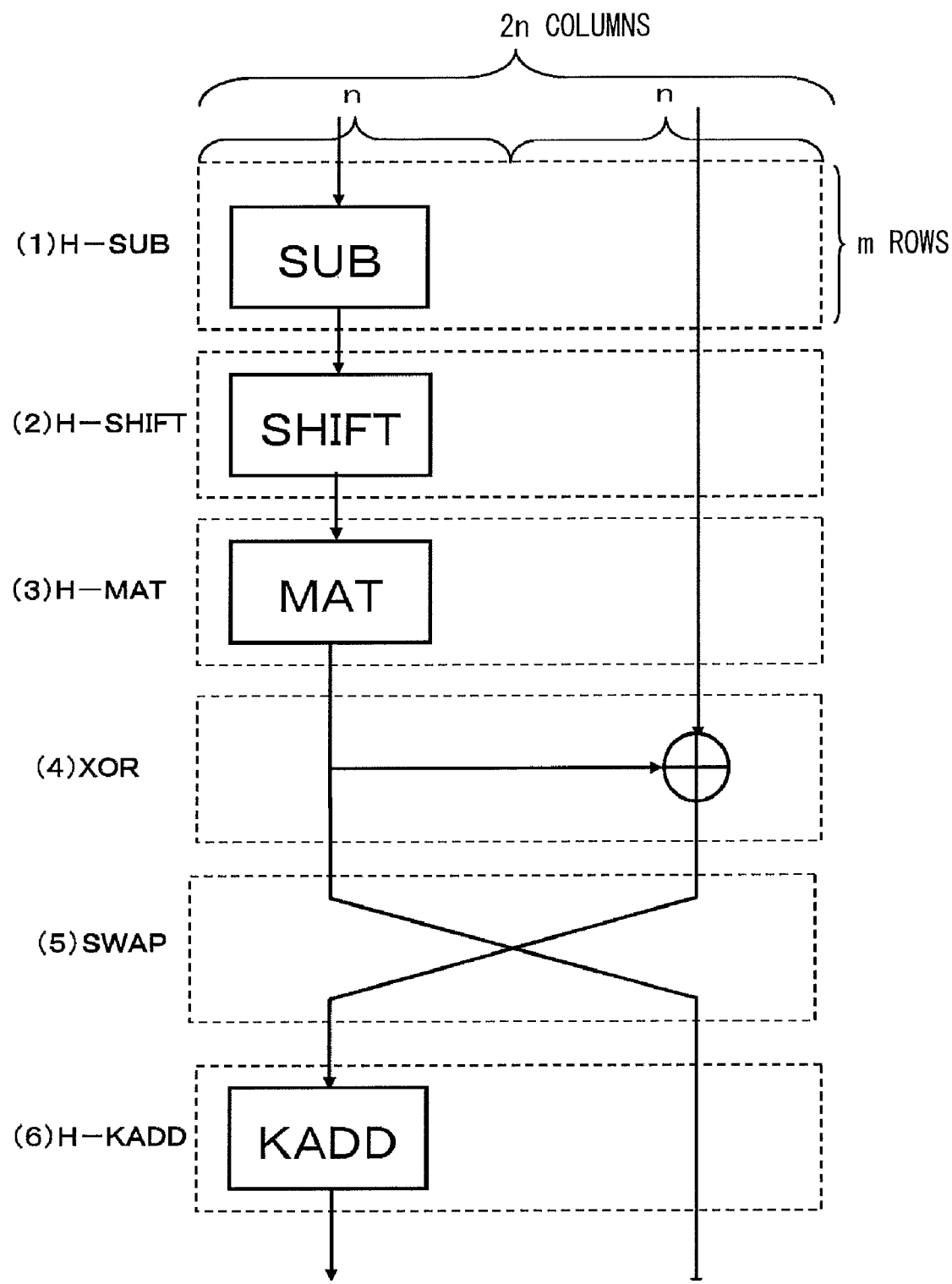
FIG. 16 is an illustration describing a configuration example of a round operation in a second exemplary embodiment of the invention.

Next, a configuration of a round operation in a second exemplary embodiment of the invention is illustrated in FIG. 16. A processing sequence of the round operation in Exemplary Embodiment 2 is as follows.

(1) Nonlinear conversion process (H-SUB) on a half data segment of a rectangular state (2) Shift process (H-SHIFT) on a half data segment of the rectangular state (3) Linear conversion process (H-MAT) on a half data segment of the rectangular state (4) Process (XOR) of performing an exclusive OR operation (XOR) between a half data segment and the other half data segment of the rectangular state (5) Swap process (SWAP) of interchanging two half data segments of the rectangular state (6) Process (H-KADD) of performing an exclusive OR operation between a half data segment of the rectangular state and a round key $[k_i]$ These processes (1) to (6) configure a round operation.

When round operation processing of Exemplary Embodiment 2 is summarized, a data conversion section of a data converter executes the following round operation. The nonlinear conversion process and the shift process are executed on one data segment A of two data segments which are resultants of dividing the rectangular state into two parts, and the linear conversion process is further executed so as to update the data segment A, and further an exclusive OR operation between the updated data segment A and the other data segment B is executed, and a result of the exclusive OR operation is employed as updated data of the data segment B, and after the swap process between the data segments A and B, an exclusive OR operation process is executed on the data segment A with key data. Such round processing is executed.

In addition, in the exemplary embodiment, a configuration in which a left-half data segment of the rectangular state is selected and main operation processes such as the nonlinear conversion process (H-SUB) are executed on the left-half data segment is described, but a configuration in which main operations are executed on a right-half data segment may be used. In other words, in processes which will be described below, even if the processes are performed on the right-half data segment instead of the left-half data segment, the same effects are obtained.

Each process will be described in detail below.

(1) Nonlinear conversion process (H-SUB) on a half data segment of the rectangular state (2) Shift process (H-SHIFT) on a half data segment of the rectangular state These processes are the same as those described in Exemplary Embodiment 1.

In (1) the nonlinear conversion process (H-SUB) on a half data segment of the rectangular state, as illustrated in FIG. 8(1), a relationship between a one-byte output $b_i$ after the conversion process and a one-byte input $a_i$ is:

$b_i = S(a_i)$, if $i=1$ to 4, 9 to 12, 17 to 20, 25 to 28

$b_i = a_i$, else

As described above, the right-half data segment is not changed.

In (2) the shift process (H-SHIFT) on a half data segment of the rectangular state, as described referring to FIG. 13(A), one-byte data blocks in each row are shifted by a shift amount (0 to (n−1)) varying from one row to another. For example, as in the case of the shift process on a square state previously described referring to FIG. 2, one-byte data blocks in a first row are not rotationally shifted, and one-byte data blocks in a second row, one-byte data blocks in a third row and one-byte data blocks in a fourth row are rotationally shifted toward the right by one one-byte data block, two one-byte data blocks, and three one-byte data blocks, respectively.

(3) Linear Conversion Process (H-MAT) on a Half Data Segment of the Rectangular State The process is the same as the process previously described referring to FIG. 8(2), and is an operation of updating a value by an operation on a 4×4 matrix [M] on each one-byte data block of a left-half data segment of the rectangular state assuming that four one-byte data blocks in each column are considered as a vector.

A relationship between a one-byte output $b_i$ after the conversion process and a one-byte input $a_i$ is:

$${}^t(b_i, b_{i+8}, b_{i+16}, b_{i+24}) = M{}^t(a_i, a_{i+8}, a_{i+16}, a_{i+24})$$

$i = 2, 3, 4,$ $${}^t(b_i, b_{i+8}, b_{i+16}b_{i+24}) = {}^t(a_i, a_{i+8}, a_{i+16}, a_{i+24})$$

$i = 5, 6, 7, 8.$

As described above, linear conversion using the matrix [M] is executed on each one-byte data block of the left-half data segment of the rectangular state, and the right-half data segment is not changed.

In addition, ${}^t(\ )$ indicates a transposed matrix formed by interchanging rows and columns in a matrix.

Figure 17:
FIG. 17 is an illustration describing an example of data processing executed in the round operation in the second exemplary embodiment of the invention.

(4) Process (XOR) of performing an exclusive OR operation (XOR) between a half data segment and the other half data segment of the rectangular state An exclusive OR operation (XOR) process will be described referring to FIG. 17. An exclusive OR operation (XOR) between data in one column in a left-half data segment of the rectangular state and data in a corresponding column in a right-half data segment of the rectangular state is performed, and a result of the exclusive OR operation (XOR) is employed as updated data of the right-half data segment. The left-half data segment is not updated.

A relationship between a one-byte output $b_i$ after the conversion process and a one-byte input $a_i$ is:

(3-1) Left-Half Data Segment $${}^t(b_i, b_{i+8}, b_{i+16}, b_{i+24}) = {}^t(a_i, a_{i+8}, a_{i+16}, a_{i+24})$$

$i = 1, 2, 3, 4$ (3-2) Right-Half Data Segment $${}^t(b_{i+4}, b_{i+12}, b_{i+20}, b_{i+28}) = {}^t(a_i, a_{i+8}, a_{i+16}, a_{i+24})(XOR){}^t(a_{i+4}, a_{i+12}, a_{i+20}, a_{i+28})$$

$i = 1, 2, 3, 4$

In addition, ${}^t(\ )$ indicates a transposed matrix formed by interchanging rows and columns in a matrix.

That is, an exclusive OR operation (XOR) between data in the first column from the left of the left-half data segment and data in the first column from the left of the right-half data segment (in the fifth column from the left in the rectangular state) is executed, and a result of the exclusive OR operation (XOR) is employed as updated data of the data in the first column from the left of the right-half data segment (in the fifth column from the left in the rectangular state). Hereinafter, in the same manner, an exclusive OR operation (XOR) between data in the second column from the left of the left-half data segment and data in the second column from the left of the right-half data segment (in the sixth column from the left in the rectangular state) is executed, and a result of the exclusive OR operation (XOR) is employed as updated data of the data in the second column from the left of the right-half data segment (in the sixth column from the left in the rectangular state). The same process is hereinafter performed.

(5) Swap Process (SWAP) of Interchanging Two Half Data Segments of the Rectangular State The swap process (SWAP) is the same process as the process previously described in Exemplary Embodiment 1, and is a process of interchanging two half data segments of the rectangular state as illustrated in FIG. 13(C).

(6) Process (H-KADD) of Performing an Exclusive OR Operation Between a Half Data Segment of the Rectangular State and a Round Key [$k_i$]

The process is the same process as the process previously described referring to FIG. 8(3), and in the process, an exclusive OR operation is performed between each one-byte data block of the right-half data segment of the rectangular state and a round key [$k_i$] outputted from a key schedule section.

A relationship between a one-byte output $b_i$ after the conversion process and a one-byte input $a_i$ is:

$$b_i = a_i (XOR) k_i, \text{ if } i=1 \text{ to } 4, 9 \text{ to } 12, 17 \text{ to } 20, 25 \text{ to } 28$$

$$b_i = a_i, \text{ else}$$

As described above, the right-half data segment is not changed.

In addition in the above-described expression, (XOR) indicates an exclusive OR operation.

As illustrated in FIG. 16, the round operation in the second exemplary embodiment of the invention is configured of the following processes (1) to (6):

(1) Nonlinear conversion process (H-SUB) on a half data segment of the rectangular state (2) Shift process (H-SHIFT) on a half data segment of the rectangular state (3) Linear conversion process (H-MAT) on a half data segment of the rectangular state (4) Process (XOR) of performing an exclusive OR operation (XOR) between a half data segment and the other half data segment of the rectangular state (5) Swap process (SWAP) of interchanging two half data segments of the rectangular state (6) Process (H-KADD) of performing an exclusive OR operation between a half data segment of the rectangular state and a round key [$k_i$]

In other words, these processes in order of [H-SUB]→[H-SHIFT]→[H-MAT]→[XOR]→[SWAP]→[H-KADD] are executed as processes configuring one round operation.

Encryption of input data, hash processing or diffusion processing is performed by repeatedly executing the round operation. In, the data diffusion example in Exemplary Embodiment 2 will be described referring to FIG. 18.

Figure 18:
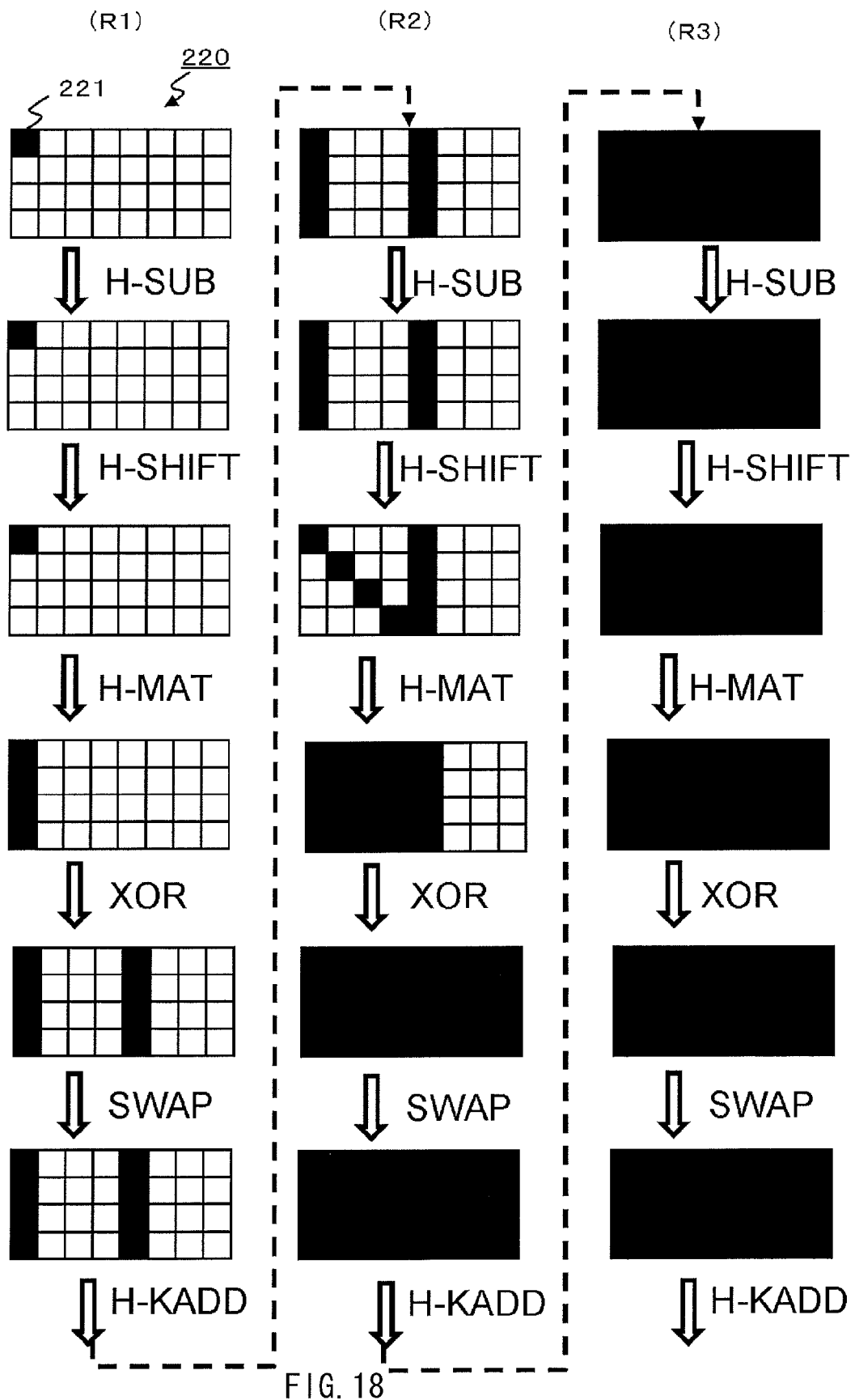
FIG. 18 is an illustration describing a data diffusion example by round operation processing in the second exemplary embodiment of the invention.

In FIG. 18, refer to a one-byte data block 221 (marked with black) at the top left of a rectangular state 220 in an initial state of input data. In each process configuring the round operation, a one-byte data block changed by constituent bits of the one-byte data 221 is indicated with black.

It is understood from the drawing that after execution of two rounds of the round operation, an influence of the one-byte data block 221 affects all one-byte data blocks of the rectangular state. In addition, the drawing illustrates diffusion of the influence of the one-byte data blocks 221 at the top left of the rectangular state 220, but any one-byte data block included in the left-half data segment has the same property of diffusing its influence.

Figure 19:
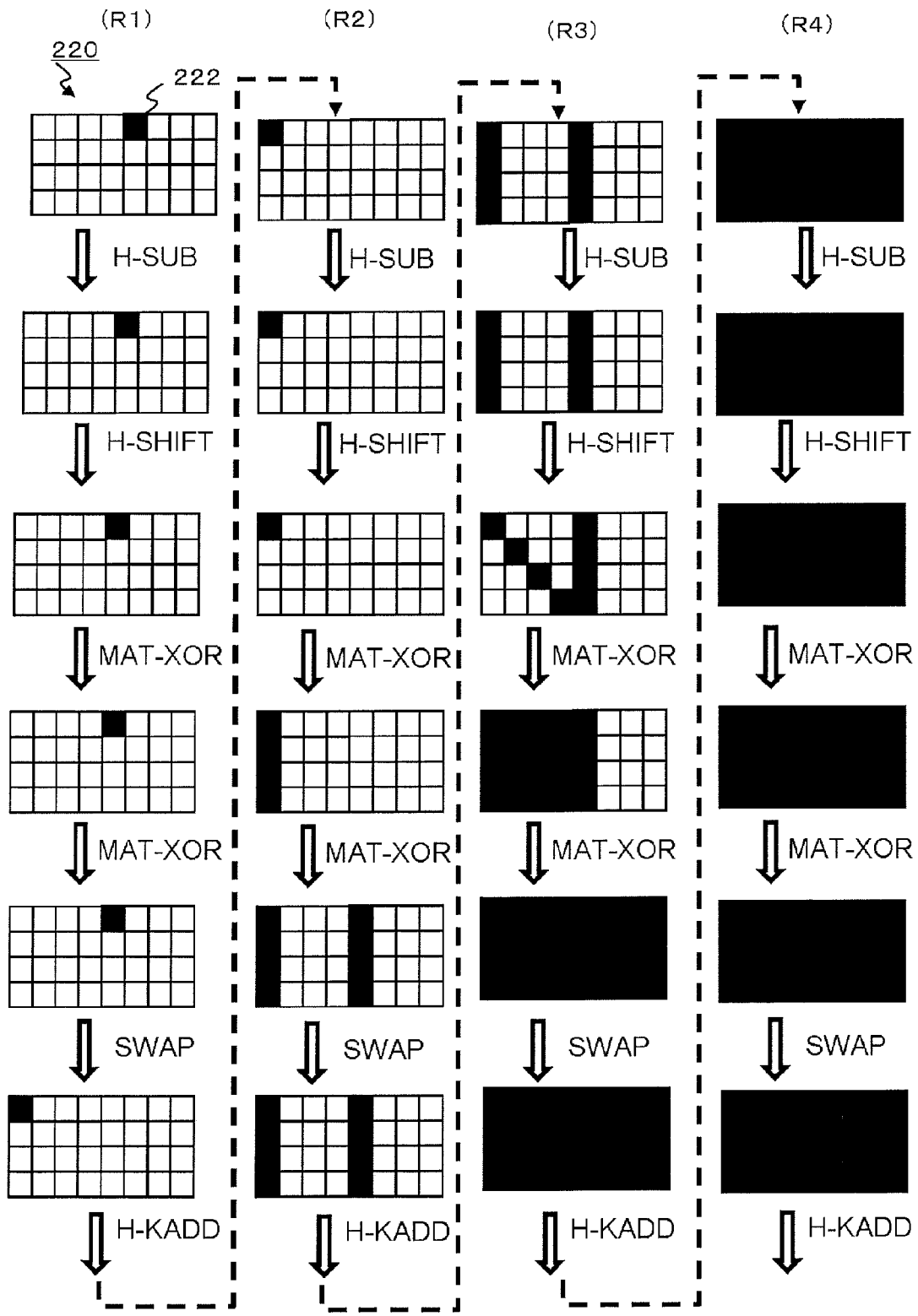
FIG. 19 is an illustration describing a data diffusion example by round operation processing in the second exemplary embodiment of the invention.

Next, referring to FIG. 19, an influence of a one-byte data 222 at the top left of a right-half data segment of the rectangular state 220, that is, the fifth one-byte data block from the left in the uppermost row in the process of Exemplary Embodiment 2 will be described below.

In the algorithm, a swap [SWAP] operation is inevitably executed once in processing in a first round, so data in the right-half data segment is moved to the left-half data segment. Once the data is moved to the left-half data segment, the same processes as the processes on the one-byte data block 221 at the top left of the rectangular state described referring to FIG. 18 is performed. Therefore, all data are then affected after 2 rounds. Therefore, an influence of the one-byte data block 222 affects all one-byte data blocks of the rectangular state in 3 rounds in total. Any one-byte data block included in the right-half data segment has the same property. Thus, Exemplary Embodiment 2 achieves more efficient scrambling capability than Exemplary Embodiment 1.

Thus, in the exemplary embodiment, the following processes (1) to (6), that is, these processes in order of [H-SUB]→[H-SHIFT]→[H-MAT]→[XOR]→[SWAP]→[H-KADD] are executed as processes configuring one round operation to achieve efficient scrambling capability:

(1) Nonlinear conversion process (H-SUB) on a half data segment of the rectangular state (2) Shift process (H-SHIFT) on a half data segment of the rectangular state (3) Linear conversion process (H-MAT) on a half data segment of the rectangular state (4) Process (XOR) of performing an exclusive OR operation (XOR) between a half data segment and the other half data segment of the rectangular state (5) Swap process (SWAP) of interchanging two half data segments of the rectangular state (6) Process (H-KADD) of performing an exclusive OR operation between a half data segment of the rectangular state and a round key [$k_i$]

Operation cost in the exemplary embodiment will be considered below. Operation cost necessary for one one-byte data block configuring the rectangular state to affect all one-byte data blocks configuring the rectangular state is estimated. As described referring to FIGS. 18 and 19, 3 rounds at maximum are necessary for one one-byte data block configuring the rectangular state to affect all one-byte data blocks configuring the rectangular state.

Therefore, until one one-byte data block configuring the rectangular state affects all one-byte data blocks configuring the rectangular state, three times at maximum of the nonlinear conversion process (H-SUB), the shift process (H-SHIFT), the linear conversion process (H-MAT), the exclusive OR operation process (XOR), the swap process (SWAP) and the key application operation process (H-KADD) are necessary.

The operation cost for processes on a 256-bit rectangular state may be calculated as follows:

(1) The operation cost for the nonlinear conversion process (H-SUB) on a half data segment of the rectangular state is equivalent to that for the nonlinear conversion process (SUB) on the above-described 128-bit square state (2) The operation cost for the shift process (H-SHIFT) on a half data segment of the rectangular state is 0, because it is not necessary to pass through a gate (3) The operation cost for the linear conversion process (H-MAT) on a half data segment of the rectangular state is equivalent to that for the linear conversion process (MAT) on a 128-bit square state (4) The operation cost for the process (XOR) of performing an exclusive OR operation (XOR) between a half data segment and the other half data segment of the rectangular state is equivalent to that for the key application operation process (KADD) on a 128-bit square state (5) The operation cost for the swap process (SWAP) of interchanging two half data segments of the rectangular state is 0, because it is not necessary to pass through a gate (6) The operation cost for the process (H-KADD) of performing an exclusive OR operation between a half data segment of the rectangular state and a round key [$k_i$] is equivalent to the key application operation process (KADD) on the 128-bit square state The operation cost is estimated in this manner.

Therefore, in the exemplary embodiment, the operation cost necessary for one one-byte data block configuring the rectangular state to affect all one-byte data blocks configuring the rectangular state may be estimated as follows:

Operation cost=3SUB+3MAT+6KADD

When the operation cost is calculated based on the above-described number of gates for each operation, that is, SUB operation=approximately 3,200 to 4,800 gates
MAT operation=approximately 800 to 1,200 gates
KADD operation=approximately 320 gates
the operation cost is as follows:
Operation cost=3SUB+3MAT+3KADD=I 4K gates to 20K gates This operation cost is superior to the operation cost (26K gates to 38K gates) necessary for conversion processes in the algorithm [Rijndael] previously described as a processing example for the rectangular state, and more efficient diffusion on the rectangular state is achieved by executing the processes according to the exemplary embodiment. More specifically, an improvement in processing speed, downsizing of a device, or the like is achievable, and an improvement in diffusibility allows an improvement in the security level or concealment level of encrypted data.

Exemplary Embodiment 3

Figure 20:
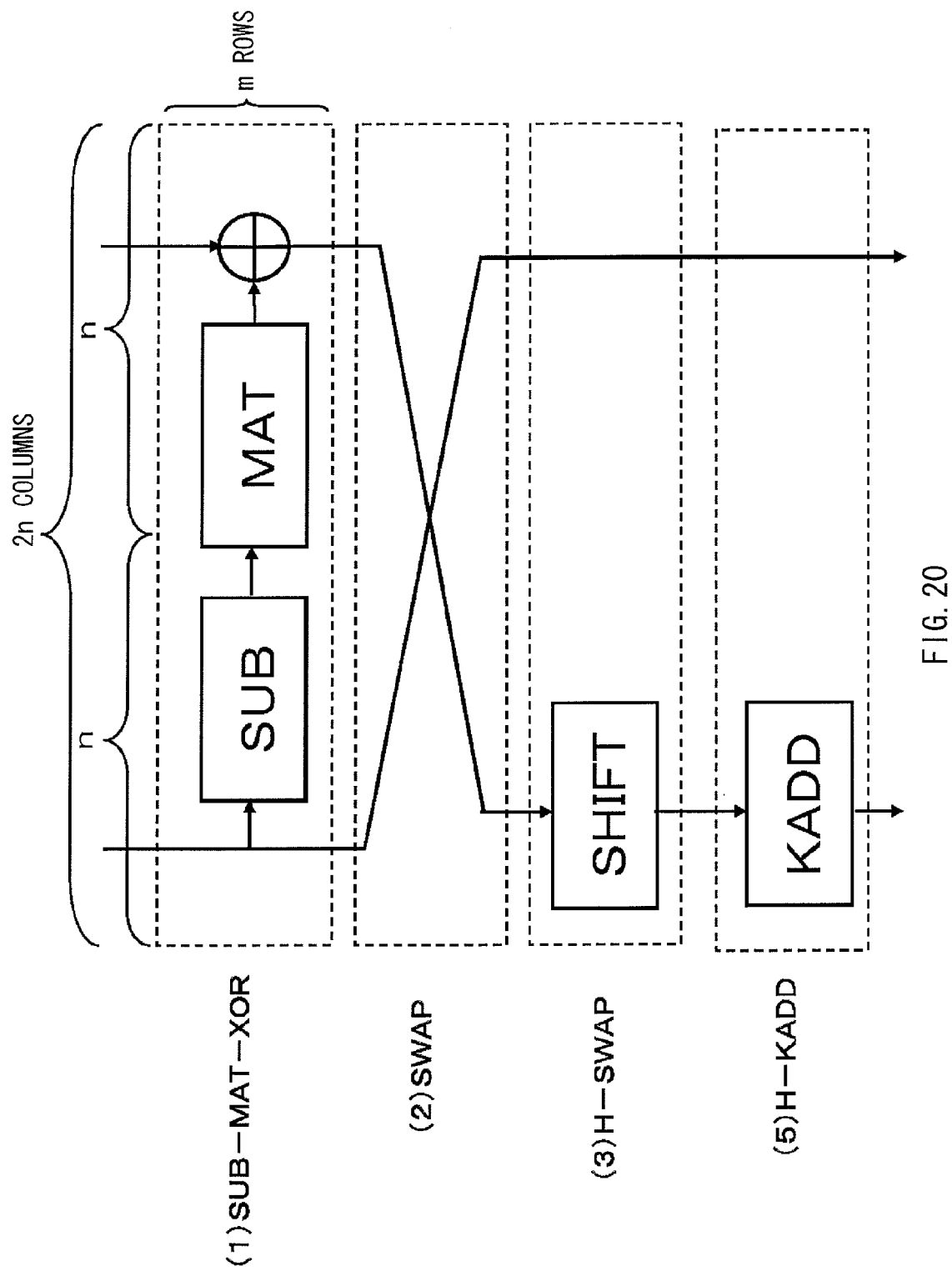
FIG. 20 is an illustration describing a configuration example of a round operation in a third exemplary embodiment of the invention.

Next, a configuration of a round operation in a third exemplary embodiment of the invention is illustrated in FIG. 20. A processing sequence of the round operation in Exemplary Embodiment 3 is as follows.

(1) Nonlinear conversion & linear conversion & exclusive OR operation process (SUB-MAT-XOR) of executing linear conversion by performing a 4×4 matrix operation using a linear conversion matrix [M] assuming that a result of performing nonlinear conversion (SUB) on data in each column of a half data segment of the rectangular state is considered as a vector, and performing an exclusive OR operation (XOR) on a result of the 4×4 matrix operation with data in a corresponding column of a right-half data segment, and employing a result of the exclusive OR operation (XOR) as updated data of the right-half data segment (2) Swap process (SWAP) of interchanging two half data segments of the rectangular state (3) Shift process (H-SHIFT) on a half data segment of the rectangular state (4) Process (H-KADD) of performing an exclusive OR operation between a half data segment of the rectangular state and a round key [$k_i$]

These processes (1) to (4) configure a round operation.

When round operation processing of Exemplary Embodiment 3 is summarized, a data conversion section of a data converter executes the following round operation. The nonlinear conversion process and the linear conversion process are executed on one data segment A of two data segments which are resultants of dividing the rectangular state into two parts, and an exclusive OR operation is executed between the data segment A and the other data segment B, and a result of the exclusive OR operation is employed as updated data of the data segment B, and further, after the swap process between the data segments A and B, a shift process and an exclusive OR operation process between the data segment A and key data is executed. Such round processing is executed.

In addition, in the exemplary embodiment, a configuration in which left-half data segment of the rectangular state is selected and main operation processes such as the nonlinear conversion & linear conversion & exclusive OR operation process (SUB-MAT-XOR) are executed on the left-half data segment is described, but a configuration in which main operations are executed on a right-half data segment may be used. In other words, in processes which will be described below, even if the processes are performed on the right-half data segment instead of the left-half data segment, the same effects are obtained.

Among the above-described processes, the following processes are the same as those previously described in Exemplary Embodiments 1 and 2, and will not be further described.

(2) Swap process (SWAP) of interchanging two half data segments of the rectangular state (3) Shift process (H-SHIFT) on a half data segment of the rectangular state (4) Process (H-KADD) of performing an exclusive OR operation between a half data segment of the rectangular state and a round key [$k_i$]

Figure 21:
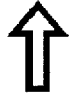
FIG. 21 is an illustration describing an example of data processing executed in the round operation in the third exemplary embodiment of the invention.

Referring to FIG. 21, (1) the nonlinear conversion & linear conversion & exclusive OR operation process (SUB-MAT-XOR) will be described below.

Linear conversion is executed by performing a 4×4 matrix operation using a linear conversion matrix [M] assuming that a result of performing nonlinear conversion (SUB) on data in each column of a half data segment of the rectangular state is considered as a vector, and an exclusive OR operation (XOR) is performed between a result of the 4×4 matrix operation and data in a corresponding column of a right-half data segment, and a result of the exclusive OR operation (XOR) is employed as updated data of the right-half data segment. The left-half data segment is not updated.

A relationship between a one-byte output $b_i$ after the conversion process and a one-byte input $a_i$ is:

(1-1) Left-Half Data Segment $${}^t(b_i, b_{i+8}, b_{i+16}, b_{i+24}) = {}^t(a_i, a_{i+8}, a_{i+16}, a_{i+24})$$

i=1, 2, 3, 4

(1-2) Right-Half Data Segment $${}^t(b_{i+4}, b_{i+12}, b_{i+20}, b_{i+28}) = [M^t(S(a_i), S(a_{i+8}), S(a_{i+16}), S(a_{i+24}))](XOR)^t(a_{i+4}, a_{i+12}, a_{i+20}, a_{i+28})$$

i=1, 2, 3, 4

In addition, $^t(\ )$ indicates a transposed matrix formed by interchanging rows and columns in a matrix.

That is, after nonlinear conversion (SUB) is performed on data in the first column from the left of the left-half data segment, a 4×4 matrix operation using a preset linear conversion matrix [M] is performed, and a result of executing an exclusive OR operation (XOR) between a result of the 4×4 matrix operation and data in the first column from the left of the right-half data segment (in the fifth column from the left in the rectangular state) is employed as updated data of the data in the first column from the left in the right-half data segment (in the fifth column from the left in the rectangular state). Hereinafter, in the same manner, after data in the second column from the left of the left-half data segment is subjected to nonlinear conversion (SUB), a 4×4 matrix operation using the preset linear conversion matrix [M] is performed, and an exclusive OR operation (XOR) between a result of the 4×4 matrix operation and data in the second column from the left of the right-half data segment (in the sixth column from the left in the rectangular state) is executed, and a result of the exclusive OR operation is employed as updated data of the data in the second column from the left of the right-half data segment (in the sixth column in the rectangular state). The same process is hereinafter performed.

As illustrated in FIG. 20, the round operation in the third exemplary embodiment of the invention is configured of the following processes (1) to (4):

(1) Nonlinear conversion & linear conversion & exclusive OR operation process (SUB-MAT-XOR) of executing linear conversion by performing a 4×4 matrix operation using a linear conversion matrix [M] assuming that a result of performing nonlinear conversion (SUB) on data in each column of a half data segment of the rectangular state is considered as a vector, and performing an exclusive OR operation (XOR) between a result of the 4×4 matrix operation and data in a corresponding column of a right-half data segment, and employing a result of the exclusive OR operation (XOR) as updated data of the right-half data segment (2) Swap process (SWAP) of interchanging two half data segments of the rectangular state (3) Shift process (H-SHIFT) on a half data segment of the rectangular state (4) Process (H-KADD) of performing an exclusive OR operation between a half data segment of the rectangular state and a round key $[k_i]$ In other words, these processes in order of [SUB-MAT-XOR]→[SWAP]→[H-SHIFT]→[H-KADD] are executed as processes configuring one round operation.

Encryption of input data, hash processing or diffusion processing is performed by repeatedly executing the round operation. In the data diffusion example in Exemplary Embodiment 3 will be described referring to FIG. 22.

Figure 22:
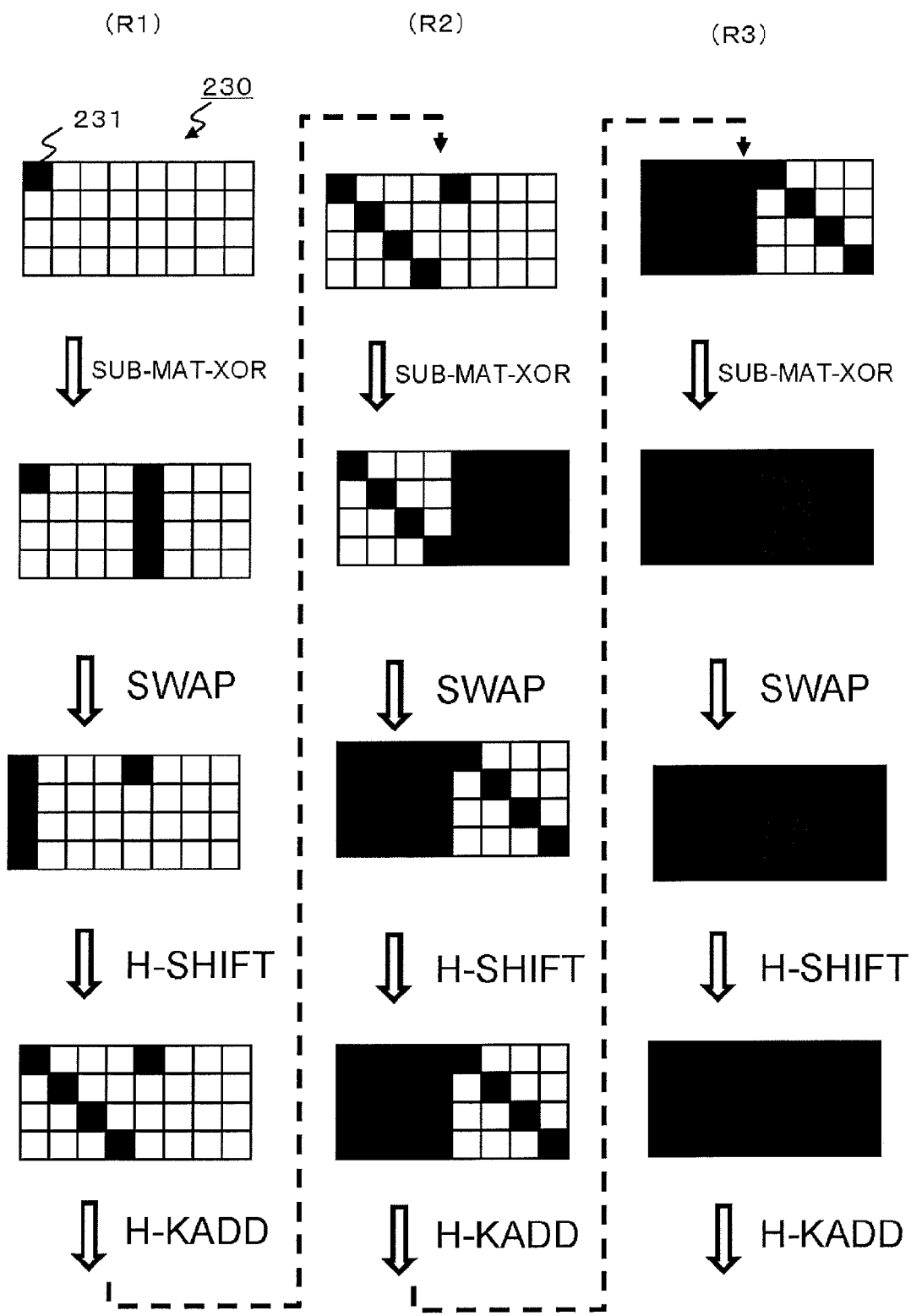
FIG. 22 is an illustration describing a data diffusion example by round operation processing in the third exemplary embodiment of the invention.

In FIG. 22, refer to a one-byte data block 231 (marked with black) at the top left of a rectangular state 230 in an initial state of input data. In each process configuring the round operation, a one-byte data block changed by constituent bits of the one-byte data 231 is indicated with black.

It is understood from the drawing that after completion of two rounds of the round operation, an influence of the one-byte data block 231 affects total 20 one-byte data blocks including all one-byte data blocks of a left-half data segment and 4 one-byte data blocks of a right-half data segment, and on completion of three rounds, the influence affects all one-byte data blocks of the rectangular state 230. In addition, the drawing illustrates diffusion of the influence of the one-byte data block 231 at the top left of the rectangular state 230, but any one-byte data block included in the left-half data segment has the same property of diffusing its influence.

Figure 23:
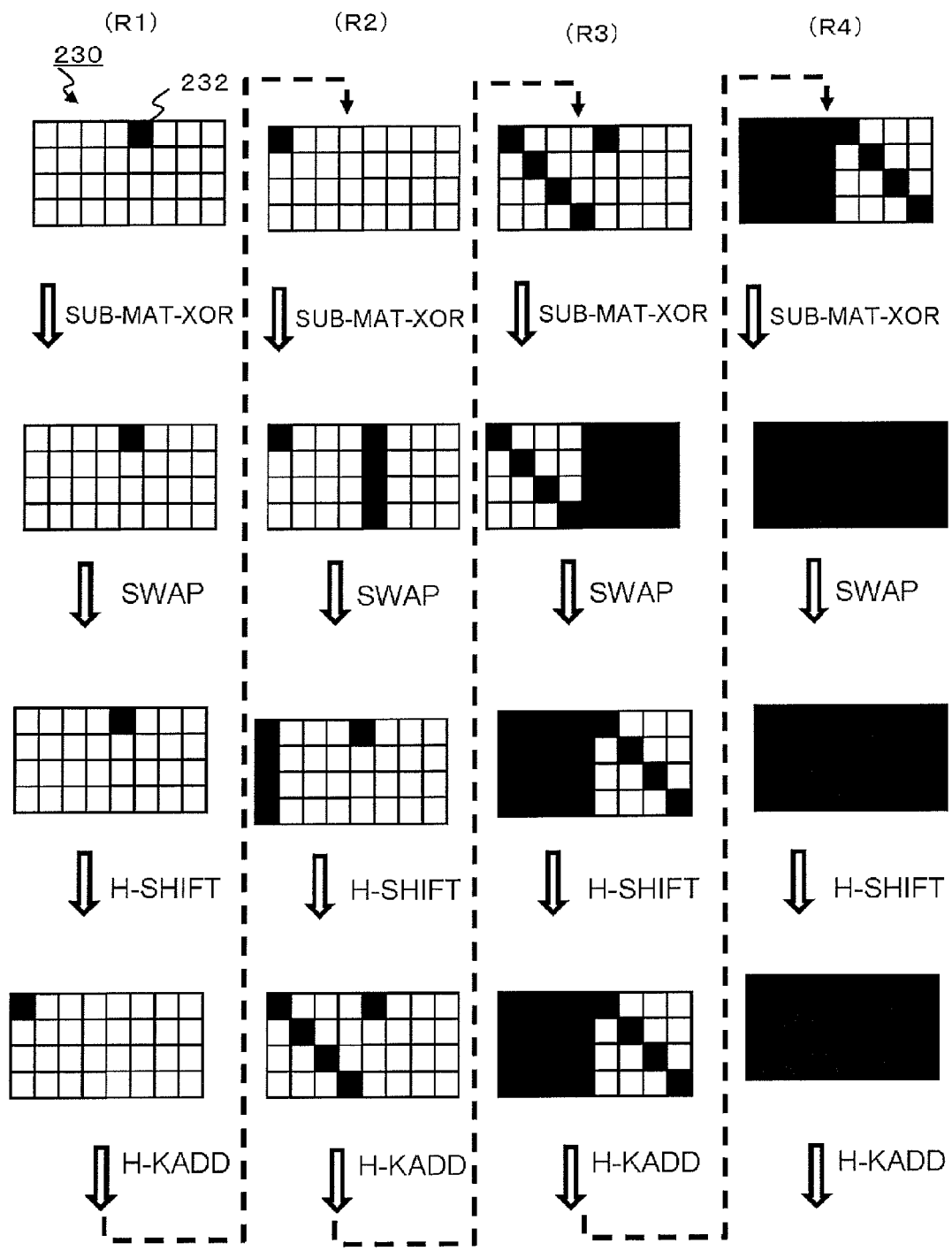
FIG. 23 is an illustration describing a data diffusion example by round operation processing in the third exemplary embodiment of the invention.

Next, referring to FIG. 23, an influence of a one-byte data 232 at the top left of a right-half data segment of the rectangular state 230, that is, the fifth one-byte data block from the left in the uppermost row in the process of Exemplary Embodiment 3 will be described below.

In the algorithm, as in the case of the above-described Exemplary Embodiments 1 and 2, a swap [SWAP] operation is inevitably executed once in processing in a first round, so data on the right-half data segment is moved to the left-half data segment. Once the data is moved to the left-half data segment, the same processes as the processes on the one-byte data block 231 at the top-left of the rectangular state described referring to FIG. 22 is performed. Therefore, all data are then affected after 3 rounds. Therefore, an influence of the one-byte data block 232 affects all one-byte data blocks of the rectangular state in 4 rounds in total. Any one-byte data block included in the right-half data segment had the same property of diffusing its influence.

Moreover, in a mode in Exemplary Embodiment 3, a process of overwriting input information with output information in an individual operation process such as a nonlinear conversion process (SUB) or a linear conversion process (MAT) using the matrix [M] is not performed. In other words, in (1) the nonlinear conversion & linear conversion & exclusive OR operation process (SUB-MAT-XOR) of the round operation process illustrated in FIG. 20, a nonlinear conversion process and a shift process and a linear conversion process are executed on the data segment A, but the data segment A is not updated by data of the result.

Therefore, for example, the round operation illustrated in FIG. 20 is repeatedly executed to generate an encryption result, and in an algorithm decrypting the encryption result, data is allowed to be restored without using an inverse operation of nonlinear conversion or matrix operation. Therefore, when an inverse function of the whole data replacement process is implemented, it is not necessary to implement an inverse function of the nonlinear conversion process (SUB) or the linear conversion process (MAT) using the matrix [M], thereby Exemplary Embodiment 3 has an effect of causing downsizing of a device or a reduction in cost in the implementation. Thus, Exemplary Embodiment 3 has scrambling capability equivalent to that in the above-described Exemplary Embodiment 1 and has superior implementation characteristics.

In the exemplary example, the following processes (1) to (4), that is, these processes in order of [SUB-MAT-XOR]→[SWAP]→[H-SHIFT]→[H-KADD] are executed as processes configuring one round operation to achieve efficient scrambling capability:

(1) Nonlinear conversion & linear conversion & exclusive OR operation process (SUB-MAT-XOR) of executing linear conversion by performing a 4×4 matrix operation using a linear conversion matrix [M] assuming that a result of performing nonlinear conversion (SUB) on data in each column of a half data segment of the rectangular state is considered as a vector, and performing an exclusive OR operation (XOR) between a result of the 4×4 matrix operation and data in a corresponding column of a right-half data segment, and employing a result of the exclusive OR operation (XOR) as updated data of the right-half data segment (2) Swap process (SWAP) of interchanging two half data segments of the rectangular state (3) Shift process (H-SHIFT) on a half data segment of the rectangular state (4) Process (H-KADD) of performing an exclusive OR operation between a half data segment of the rectangular state and a round key $[k_i]$ Operation cost in the exemplary embodiment will be considered below. Operation cost necessary for, one one-byte data block configuring the rectangular state to affect all one-byte data blocks configuring the rectangular state is estimated. As described referring to FIGS. 22 and 23, 4 rounds at maximum are necessary for one one-byte data block configuring the rectangular state to affect all one-byte data blocks configuring the rectangular state.

Therefore, until one one-byte data block configuring the rectangular state affects all one-byte data blocks configuring the rectangular state, four times at maximum of the nonlinear conversion & linear conversion & exclusive OR operation process (SUB-MAT-XOR), the swap process (SWAP), the shift process (H-SHIFT), and the key application operation process (H-KADD) are necessary.

The operation cost for processes on a 256-bit rectangular state may be calculated as follows.

(1) The operation cost for the nonlinear conversion & linear conversion & exclusive OR operation process (SUB-MAT-XOR) is equivalent to that for performing all of the nonlinear conversion process (SUB), the linear conversion process (MAT) and the key application operation process (KADD) on a 128-bit square state (2) The operation cost for the swap process (SWAP) of interchanging two half data segments of the rectangular state is 0, because it is not necessary to pass through a gate (3) The operation cost for the shift process (H-SHIFT) on a half data segment of the rectangular state is 0, because it is not necessary to pass through a gate (4) The operation cost for the process (H-KADD) of performing an exclusive OR operation between a half data segment of the rectangular state and a round key $[k_i]$ is equivalent to the key application operation process (KADD) on the 128-bit square state The operation cost is estimated in this manner.

Therefore, in the exemplary embodiment, the operation cost necessary for one one-byte data block configuring the rectangular state to affect all one-byte data blocks configuring the rectangular state is estimated as:

Operation cost=4SUB+4MAT+8KADD

When the operation cost is calculated based on the above-described number of gates for each operation, that is, SUB operation=approximately 3,200 to 4,800 gates
MAT operation=approximately 800 to 1,200 gates
KADD operation=approximately 320 gates
the operation cost is as follows:
Operation cost=4SUB+4MAT+8KADD=19K gates to 27K gates This operation cost is superior to the operation cost (26K gates to 38K gates) necessary for conversion processes in the algorithm [Rijndael] previously described as a processing example for the rectangular state, and more efficient diffusion on the rectangular state is achieved by executing the processes according to the exemplary embodiment. More specifically, an improvement in processing speed, downsizing of a device, or the like is achievable, and an improvement in diffusibility allows an improvement in the security level or concealment level of encrypted data.

Exemplary Embodiment 4

Figure 24:
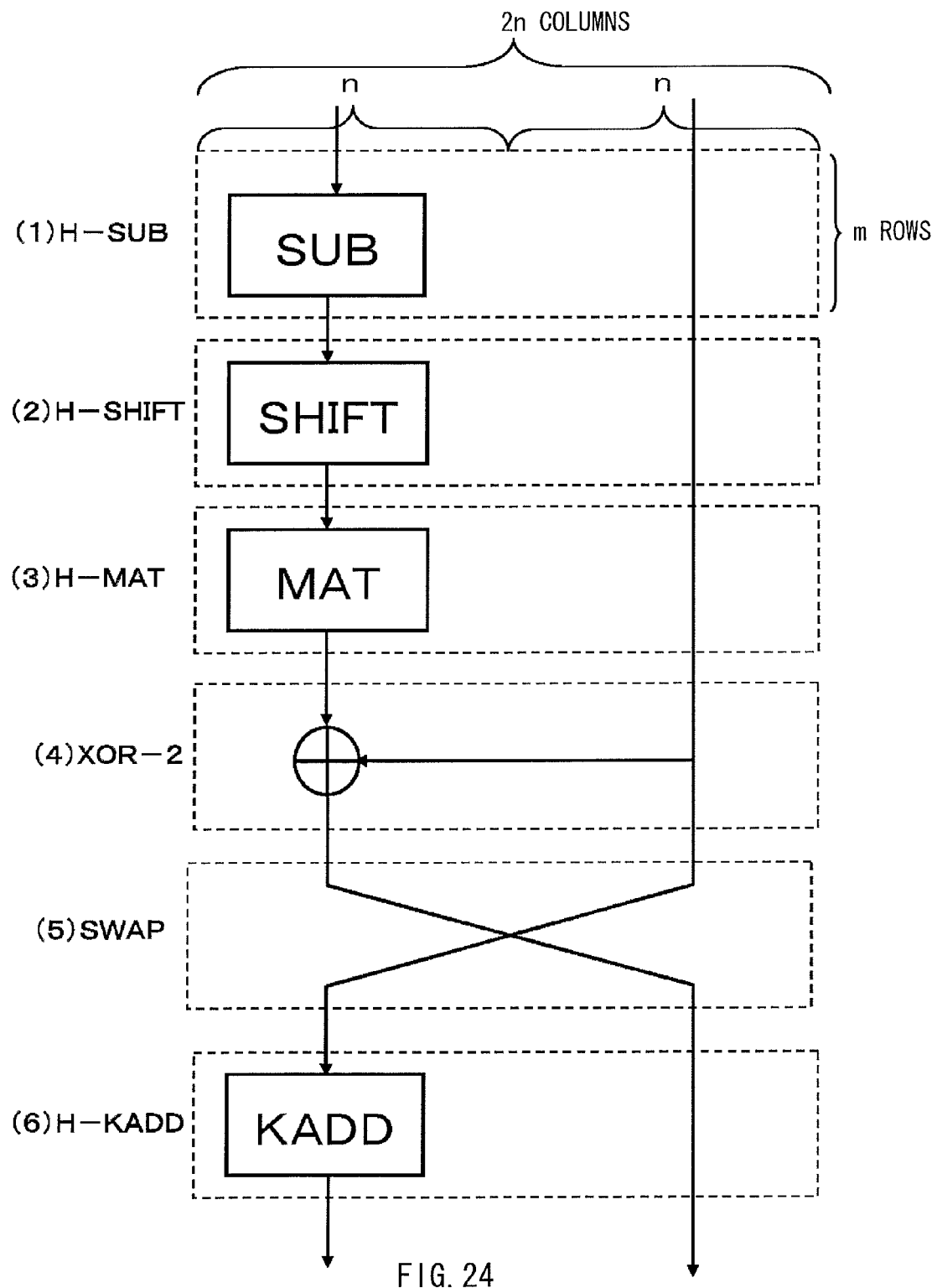
FIG. 24 is an illustration describing a configuration example of a round operation in a fourth exemplary embodiment of the invention.

Next, a configuration of a round operation in a fourth exemplary embodiment of the invention is illustrated in FIG. 24. A processing sequence of the round operation in Exemplary Embodiment 4 is as follows.

(1) Nonlinear conversion process (H-SUB) on a half data segment of the rectangular state (2) Shift process (H-SHIFT) on a half data segment of the rectangular state (3) Linear conversion process (H-MAT) on a half data segment of the rectangular state (4) Process (XOR2) of performing an exclusive OR operation (XOR) between a half data segment and the other half data segment of the rectangular state (5) Swap process (SWAP) of interchanging two half data segments of the rectangular state (6) Process (H-KADD) of performing an exclusive OR operation between a half data segment of the rectangular state and a round key $[k_i]$ These processes (1) to (6) configure a round operation.

When round operation processing of Exemplary Embodiment 4 is summarized, a data conversion section of a data converter executes the following round operation. The nonlinear conversion process, the shift process and the linear conversion process are executed on one data segment A of two data segments which are resultants of dividing the rectangular state into two parts, and an exclusive OR operation with the other data segment B is executed, and a result of the exclusive OR operation is employed as updated data of the data segment A, and after the swap process between the data segments A and B, an exclusive OR operation process is executed between the data segment A and key data. Such round processing is executed.

In addition, in the exemplary embodiment, a configuration in which a left-half data segment of the rectangular state is selected and main operation processes such as the nonlinear conversion process (H-SUB) are executed on the left-half data segment is described, but a configuration in which main operations are executed on a right-half data segment may be used. In other words, in processes which will be described below, even if the processes are performed on the right-half data segment instead of the left-half data segment, the same effects are obtained.

In an algorithm of Exemplary Embodiment 4, (1) the nonlinear conversion process (H-SUB), (2) the shift process (H-SHIFT), (3) the linear conversion process (H-MAT), (5) the swap process (SWAP) and (6) the key application process (H-KADD) are the same as those among the processes (1) to (6) in Exemplary Embodiment 2 previously described referring to FIG. 16, and only the process (4) is different.

In (4) the exclusive OR operation (XOR) in Exemplary Embodiment 2, the right-half data segment of the rectangular state is updated, and the left-half data segment is not updated, but in Exemplary Embodiment 4, a process in which the right-half data segment of the rectangular state is not updated, and the left-half data segment is updated is executed.

Figure 25:
FIG. 25 is an illustration describing an example of data processing executed in the round operation in the fourth exemplary embodiment of the invention.

The process (XOR2) of performing an exclusive OR operation (XOR) between a half data segment and the other half data segment of the rectangular state in the exemplary embodiment will be described referring to FIG. 25.

An exclusive OR operation (XOR) between data in one column in a left-half data segment of the rectangular state and data in a corresponding column in a right-half data segment of the rectangular state is performed, and a result of the exclusive OR operation (XOR) is employed as updated data of the left-half data segment. The right-half data segment is not updated.

A relationship between a one-byte output $b_i$ after the conversion process and a one-byte input $a_i$ is:

(3-1) Left-Half Data Segment $${}^t(b_i, b_{i+8}, b_{i+16}, b_{i+24}) = {}^t(a_i, a_{i+8}, a_{i+16}, a_{i+24})(XOR){}^t(a_{i+4}, a_{i+12}, a_{i+20}, a_{i+28})$$

i=1, 2, 3, 4

(3-2) Right-Half Data Segment $${}^t(b_{i+4}, b_{i+12}, b_{i+20}, b_{i+28}) = {}^t(a_i, a_{i+12}, a_{i+20}, a_{i+28})$$

i=1, 2, 3, 4

In addition, $^t(\ )$ indicates a transposed matrix formed by interchanging rows and columns in a matrix.

That is, an exclusive OR operation (XOR) between data in the first column from the left of the left-half data segment and data in the first column from the left of the right-half data segment (in the fifth column from the left in the rectangular state) is executed, and a result of the exclusive OR operation (XOR) is employed as updated data of the data in the first column from the left of the left-half data segment. Hereinafter, in the same manner, an exclusive OR operation (XOR) between data in the second column from the left of the left-half data segment and data in the second column from the left of the right-half data segment (in sixth column from the left in the rectangular state) is executed, and a result of the exclusive OR operation (XOR) is employed as updated data of the data in the second column from the left of the left-half data segment. The same process is hereinafter performed.

As illustrated in FIG. 24, the round operation in the fourth exemplary embodiment of the invention is configured of the following processes (1) to (6):

(1) Nonlinear conversion process (H-SUB) on a half data segment of the rectangular state (2) Shift process (H-SHIFT) on a half data segment of the rectangular state (3) Linear conversion process (H-MAT) on a half data segment of the rectangular state (4) Process (XOR2) of performing an exclusive OR operation (XOR) between a half data segment and the other half data segment of the rectangular state (5) Swap process (SWAP) of interchanging two half data segments of the rectangular state (6) Process (H-KADD) of performing an exclusive OR operation between a half data segment of the rectangular state and a round key $[k_i]$ In other words, these processes in order of [H-SUB]→[H-SHIFT]→[H-MAT]→[XOR2]→[SWAP]→[H-KADD] are executed as processes configuring one round operation.

Encryption of input data, hash processing or diffusion processing is performed by repeatedly executing the round operation. In the data diffusion example in Exemplary Embodiment 4 will be described referring to FIG. 26.

Figure 26:
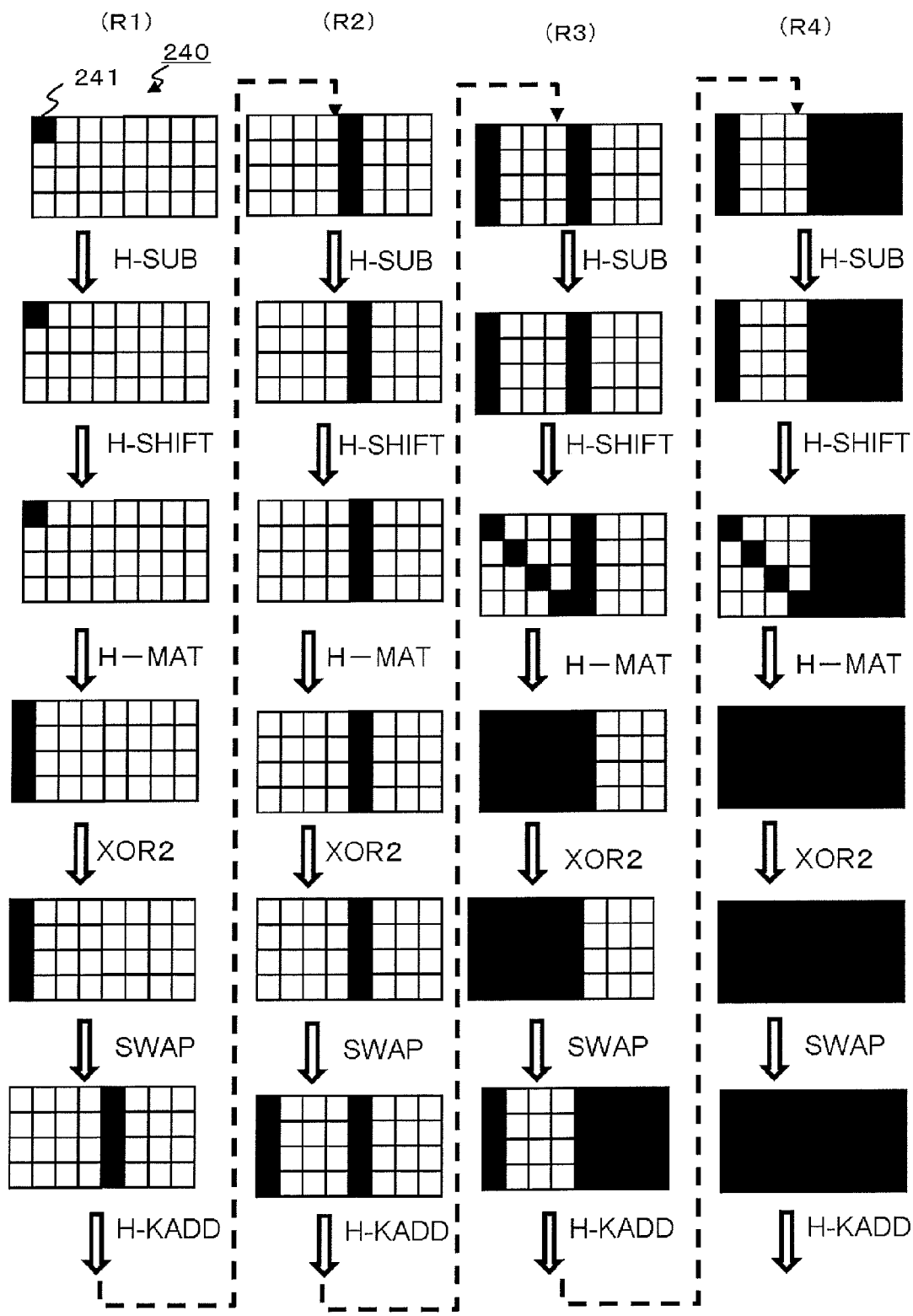
FIG. 26 is an illustration describing a data diffusion example by round operation processing in the fourth exemplary embodiment of the invention.

In FIG. 26, refer to a one-byte data block 241 (marked with black) at the top left of a rectangular state 240 in an initial state of input data. In each process configuring the round operation, a one-byte data block changed by constituent bits of the one-byte data 241 is indicated with black.

It is understood from the drawing that on completion of four rounds of the round operation, an influence of the one-byte data block 241 affects all one-byte data blocks of the rectangular state. In addition, the drawing illustrates diffusion of the influence of the one-byte data 24 at the top left of the rectangular state 240, but any one-byte data block included in the left-half data segment has the same property of diffusing its influence.

Moreover, regarding the influence of data included in a right-half data segment, as in the case of Exemplary Embodiments 1 to 3 previously described, a swap [SWAP] operation is inevitably executed once in processing in one round, so interchanging between the left-half data segment and the right-half data segment is executed, and once data on the right-half data segment is moved the left-half data segment, later processes are executed in the sequence illustrated in FIG. 26, and as a result, on completion of 4+1=5 rounds, all one-byte data blocks of the rectangular state are affected. Any one-byte data block included in the right-half data segment has the same property.

As characteristics of Exemplary Embodiment 4, a half data segment inputted in a given round is not updated in a previous round, so when data is stored appropriately, processes in the next round is allowed to start without waiting for completion of processes in the previous round. High-speed processing is allowed by the process. More specifically, Exemplary Embodiment 4 has a configuration in which processes are allowed to be executed in parallel immediately before the exclusive OR operation [XOR2].

Thus, in the exemplary embodiment, the following processes (1) to (6), that is, these processes in order of [H-SUB]→[H-SHIFT]→[H-MAT]→[XOR2]→[SWAP]→[H-KADD] are executed as processes configuring one round operation to achieve efficient scrambling capability:

(1) Nonlinear conversion process (H-SUB) on a half data segment of the rectangular state (2) Shift process (H-SHIFT) on a half data segment of the rectangular state (3) Linear conversion process (H-MAT) on a half data segment of the rectangular state (4) Process (XOR2) of performing an exclusive OR operation (XOR) between a half data segment and the other half data segment of the rectangular state (5) Swap process (SWAP) of interchanging two half data segments of the rectangular state (6) Process (H-KADD) of performing an exclusive OR operation between a half data segment of the rectangular state and a round key $[k_i]$ Operation cost in the exemplary embodiment will be considered below. Operation cost necessary for one one-byte data block configuring the rectangular state to affect all one-byte data blocks configuring the rectangular state is estimated. As described referring to FIG. 26, 5 rounds at maximum are necessary for one one-byte data block configuring the rectangular state to affect all one-byte data blocks configuring the rectangular state.

Therefore, until one one-byte data block configuring the rectangular state affects all one-byte blocks configuring the rectangular state, five times at maximum of the nonlinear conversion process (H-SUB), the shift process (H-SHIFT), the linear conversion process (H-MAT), the exclusive OR operation process (XOR2), the swap process (SWAP) and the key application operation process (H-KADD) are necessary.

The operation cost for processes on a 256-bit rectangular state may be calculated as follows:

(1) The operation cost for the nonlinear conversion process (H-SUB) on a half data segment of the rectangular state is equivalent to that for the nonlinear conversion process (SUB) on the above-described 128-bit square state (2) the operation cost for the shift process (H-SHIFT) on a half data segment of the rectangular state is 0, because it is not necessary to pass through a gate (3) The operation cost for the linear conversion process (H-MAT) on a half data segment of the rectangular state is equivalent to that for the linear conversion process (MAT) on the 128-bit square state (4) The operation cost for the process (XOR) of performing an exclusive OR operation (XOR) between a half data segment and the other half data segment of the rectangular state is equivalent to that for the key application operation process (KADD) on the 128-bit square state (5) The operation cost for the swap process (SWAP) of interchanging two half data segments of the rectangular state is 0, because it is not necessary to pass through a gate (6) The operation cost for the process (H-KADD) of performing an exclusive OR operation between a half data segment of the rectangular state and a round key [$k_i$] is equivalent to the key application operation process (KADD) on the 128-bit square state The operation cost is estimated in this manner.

Therefore, in the exemplary embodiment, the operation cost necessary for one one-byte data block configuring the rectangular state to affect all one-byte blocks configuring the rectangular state may be estimated as follows:

Operation cost=5SUB+5MAT+10KADD

When the operation cost is calculated based on the above-described number of gates for each operation, that is, SUB operation=approximately 3,200 to 4,800 gates
MAT operation=approximately 800 to 1,200 gates
KADD operation=approximately 320 gates
the cost is as follows:
Operation cost=5SUB+5MAT+10KADD=23K gates to 33K gates This operation cost is superior to the operation cost (26K gates to 38K gates) necessary for conversion processes in the algorithm [Rijndael] previously described as a processing example for the rectangular state, and more efficient diffusion on the rectangular state is achieved by executing the processes according to the exemplary embodiment. More specifically, an improvement in processing speed, downsizing of a device, or the like is achievable, and an improvement in diffusibility allows an improvement in the security level or concealment level of encrypted data.

[About Generalized Configuration of Shift Process (SHIFT)]

In the above-described Exemplary Embodiments 1 to 4, a configuration example where [H-SHIFT] in which a shift process is performed on only the left-half data segment of the rectangular state is executed is described. As already described above, in the shift process (SHFIT), one-byte data blocks in respective rows are rotationally shifted by respective different values, but a property necessary for the shift process (H-SHIFT) executed in Exemplary Embodiments 1 to 4 of the invention is as follows.

*Respective one-byte data blocks belonging to one column are shifted so as to unfailingly belong to respective different columns after a shift operation.

When the above-described property is satisfied, the shift operation is not necessarily a shift operation based on rotation.

Moreover, even if the shift process (H-SHIFT) described in each exemplary embodiment has a configuration in which a shift operation is executed on both of two half data segments of the rectangular state, effects described in each of the above-described exemplary embodiments are obtained. As described above, it is allowed to be assumed that the operation cost for the shift process is 0, so even if objects to be subjected to the process are increased, the operation cost is not increased.

Figure 27:
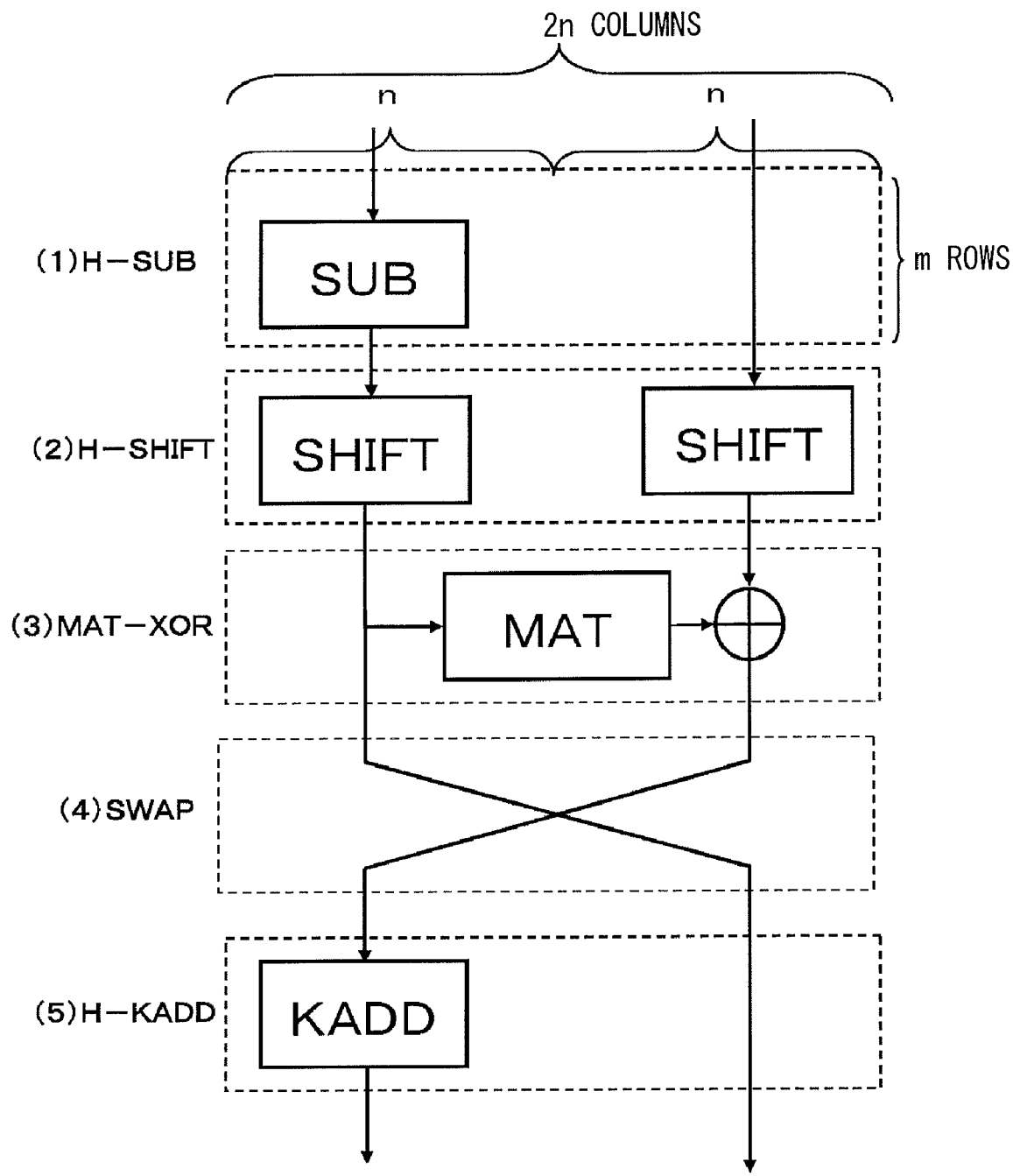
FIG. 27 is an illustration describing an algorithm of a process of applying a shift process (H-SHIFT) in Exemplary Embodiment 1 to both of right-half and left-half data segments of a rectangular state.

FIG. 27 illustrates an algorithm of a process in which the shift process (H-SHFIT) in the above-described Exemplary Embodiment 1 is performed on both of the right-half data segment and the left-half data segment of the rectangular state. In the case where one half data segment and the other half data segment of the rectangular state are [SL] and [SR], respectively, an algorithm of a round operation includes the following processes:

(1) Nonlinear conversion process (H-SUB) on the half data segment [SL] of the rectangular state (2) Shift process (H-SHIFT) on the half data segments [SL] and [SR] of the rectangular state (3) Process (MAT-XOR) of performing a linear conversion process on the half data segment [SL] of the rectangular state and then performing an exclusive OR operation (XOR) with the other half data segment [SR]

(4) Swap process (SWAP) of interchanging two half data segments [SL] and [SR] of the rectangular state (5) Process (H-KADD) of performing an exclusive OR operation (XOR) between the half data segment [SL] of the rectangular state and a round key [$k_i$]

Even in such a configuration, the same effect as the above-described diffusion effect in Exemplary Embodiment 1 is obtained. The same applies to Exemplary Embodiments 2, 3 and 4, and the shift process may be performed on the other half data segment instead of the half data segment on a side described in each exemplary embodiment. In addition, modes of the shift process on the left-half data segment and the right-half data segment may be the same as or different from each other.

[About Generalized Configuration of Exemplary Embodiments 1 to 4]

In the above-described Exemplary Embodiments 1, 2, 3 and 4, a processing example on the rectangular state with 4 rows×8 columns which is configured of total 32 one-byte data blocks and contains data of 32 bytes (256 bits) is described.

The invention is not limited to the exemplary embodiments, and is applicable to rectangular states with various configurations. More specifically, the invention is applicable to a rectangular state having an even number (2n) of columns which are allowed to be divided into a left part and a right part and an arbitrary number (m) of rows (2n≠m).

Figure 28:
FIG. 28 is an illustration describing a data conversion process on a general form in which data containing 2 nm one-byte data blocks in total is a rectangular state with 2n columns and in rows containing 2 nm one-byte data blocks $a_1$ to $a_{2mn}$.

For example, as illustrated in FIG. 28, conversion by various conversion processes such as nonlinear conversion (H-SUB) described in the above-described Exemplary Embodiments 1 to 4 is performed on data containing a number 2mn of one-byte data blocks in total in a rectangular state with 2n columns and m rows containing a number 2mn of one-byte data blocks $a_1$ to $a_{2mn}$. In the case where one-byte data blocks included in the rectangular state as conversion results are $b_1$ to $b_{2nm}$, each process defined in each exemplary embodiment is allowed to be represented as a general form by the following expression as illustrated in FIG. 29.

(1) Nonlinear Conversion Process (H-SUB)

$$b_i = S(a_i) \text{ if } 1 \leq i \bmod 2n \leq n$$

$$b_i = a_i \text{ else}$$

where S( ) indicates a nonlinear conversion process.

(2) Linear Conversion and Exclusive OR Operation (MAT-XOR)

for i=1 ... n $${}^t(b_i, b_{i+2n}, \ldots, b_{i+2(m-1)n}) = {}^t(a_i, a_{i+2n}, \ldots, a_{i+2(m-1)n})$$

$${}^t(b_{i+n}, b_{i+3n}, \ldots, b_{i+(2m-1)n}) = [M^t(a_i, a_{i+2n}, \ldots, a_{i+2(m-1)n})](XOR)^t(a_{i+n}, a_{i+3n}, \ldots, a_{i+(2m-1)n})$$

where ${}^t( )$ indicates a transposed matrix,
[M] is a linear conversion matrix,
(XOR) is an exclusive OR operation.

(3) Linear Conversion Process (H-MAT)

$${}^t(b_i, b_{i+2n}, \ldots, b_{i+2(m-1)n}) = M^t(a_i, a_{i+2n}, \ldots, a_{i+2(m-1)n}) \text{ if } i=1 \ldots n$$

$${}^t(b_i, b_{i+2n}, \ldots, b_{i+2(m-1)n}) = {}^t(a_i, a_{i+2n}, \ldots, a_{i+2(m-1)n}) \text{ else}$$

where ${}^t( )$ indicates a transposed matrix,
[M] is a linear conversion matrix.

(4) Key Application Operation (H-KADD)

$$b_i = a_i(XOR)k_i \text{ if } 1 \leq i \bmod 2n \leq n$$

$$b_i = a_i \text{ else}$$

where (XOR) is an exclusive OR operation,
$k_i$ is key data.

(5) Exclusive OR Operation Process (XOR)

for i=1 ... n $$^t(b_i, b_{i+2n}, \ldots, b_{i+2(m-1)n}) = {}^t(a_i, a_{i+2n}, \ldots, a_{i+2(m-1)n})$$

$$^t(b_{i+n}, b_{i+3n}, \ldots, b_{i+(2m-1)n}) = {}^t(a_i, a_{i+2n}, \ldots, a_{i+2(m-1)n})(XOR)^t(a_{i+n}, a_{i+3n}, \ldots, a_{i+(2m-1)n})$$

where $^t(\ )$ indicates a transposed matrix,
(XOR) is an exclusive OR operation.

(6) Nonlinear Conversion & Linear Conversion & Exclusive OR Operation Process (SUB-MAT-XOR)

for i=1 ... n $$^t(b_i, b_{i+2n}, \ldots, b_{i+2(m-1)n}) = {}^t(a_i, a_{i+2n}, \ldots, a_{i+2(m-1)n})$$

$$^t(b_{i+n}, b_{i+3n}, \ldots, b_{i+(2m-1)n}) = [M^t(S(a_i), S(a_{i+2n}), \ldots, S(a_{i+2(m-1)n})](XOR)^t(a_{i+n}, a_{i+3n}, \ldots, a_{i+(2m-1)n})$$

where $^t(\ )$ indicates a transposed matrix,
[M] is a linear conversion matrix,
(XOR) is an exclusive OR operation.

Thus, each process described in the above-described exemplary embodiments is allowed to be defined as a general form as described above by a relational expression of inputs $[a_1$ to $a_{2mn}]$ and outputs $[b_1$ to $b_{2mn}]$ in an operation on the rectangular state with 2n columns and m rows containing 2mn one-byte data blocks $a_1$ to $a_{2mn}$.

In addition, regarding the shift process (H-SHIFT), in the above-described exemplary embodiments, an example in which a half data segment of the rectangular state is a square state is described, but in the case of a rectangular state with an arbitrary shape, the half data segment is not limited to a square state. Therefore, the definition of a general form of the shift process (H-SHIFT) also including such a case will be described below.

In a rectangular state with m rows and 2n columns, as process rules necessary for the shift process (H-SHIFT) on a half data segment (with m rows and n columns) to be subjected to the shift process (H-SHIFT) include the following rules.

*In such a case that a relationship of m≦n is satisfied: In a rectangular state with m rows and 2n columns, respective byte data blocks belonging to one column in a half data segment (with m rows and n columns) to be subjected to the shift process (H-SHIFT) are shifted so as to unfailingly belong to respective different columns after the shift process.

*In such a case that a relationship of m>n is satisfied, a number of data blocks lying from (m/n)−1 to (m/n)+1 both inclusive from byte data blocks belonging to one column in a half data segment (with m rows and n columns) to be subjected to the shift process (H-SHIFT) are shifted so as to belong to an arbitrary column after the shift process.

In other words, on execution of the shift process, the shift process is executed so that: in such a case that a relationship of m≦n satisfied for the half data segment with m rows and n columns to be subjected to the shift process included in a rectangular matrix with m rows and 2 n columns of data, respective byte data blocks belonging to one column before the shift process are shifted so as to belong to respective different columns, and in such a case that a relationship of m>n is satisfied, a number of byte data blocks lying from (m/n)−1 to (m/n)+1 both inclusive from byte data blocks belonging to one column before the shift process are shifted so as to belong to an arbitrary column after the shift process.

In the rectangular state with m rows and 2n columns, the shift process (H-SHIFT) on a half data segment (with m rows and n columns) to be subjected to the shift process (H-SHIFT) is performed according to the above-described rules. When the process according to the rules is performed, it is secured that data in a certain column are efficiently diffused to a plurality of columns.

Generalization of Exemplary Embodiments 1 to 4

In the above-described Exemplary Embodiments 1 to 4, an example in which a half data segment of the rectangular state is a square state is described, but as described above, the invention is applicable to not only a rectangular state with such a specific shape but also a rectangular state with any shape as long as the rectangular state includes an even number of columns which are allowed to be divided into two. A data diffusion example in which each of Exemplary Embodiments 1 to 4 is applied in the case where a half data segment of the rectangular state is not a square state will be described below.

Generalized Example of Exemplary Embodiment 1

Figure 30:
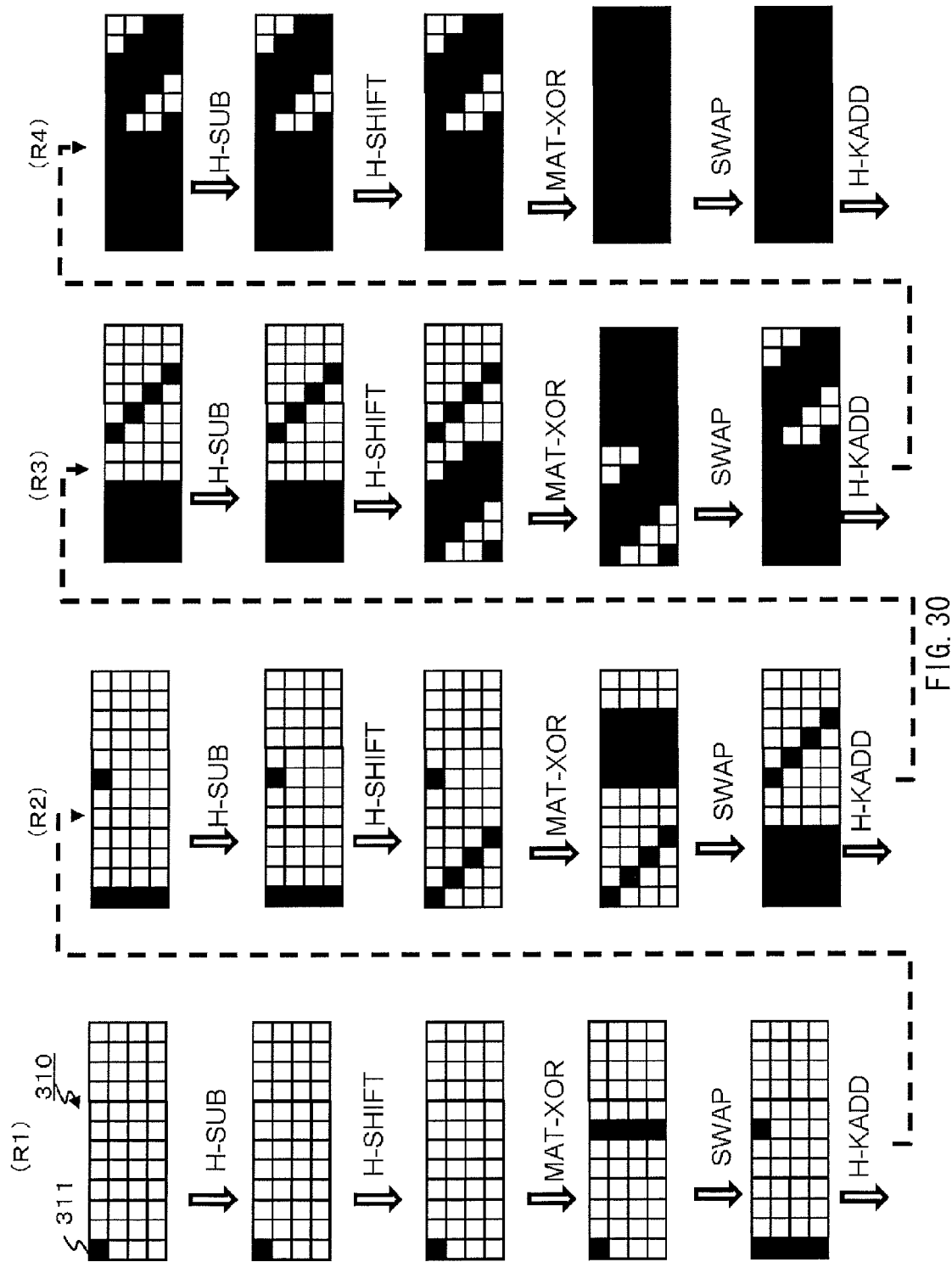
FIG. 30 is an illustration describing a data diffusion example by Exemplary Embodiment 1 on a generalized rectangular state in which a half data segment of the rectangular state is not a square state.

FIG. 30 illustrates a data diffusion example in the case where the round operation previously described in Exemplary Embodiment 1 is executed on a generalized rectangular state 310 of which a half data segment is not a square state. Refer to a one-byte data block 311 (marked with black) at the top left of the rectangular state 310 of 48 bytes with 4 rows and 12 columns. In each process configuring the round operation, a one-byte data block changed by constituent bits of the one-byte data 311 is indicated with black.

A round operation algorithm of Exemplary Embodiment 1 is a process executing the following processes (1) to (5), that is, these processes in order of [H-SUB]→[H-SHIFT]→[MAT-XOR]→[SWAP]→[H-KADD] as processes configuring one round operation:

(1) Nonlinear conversion process (H-SUB) on a half data segment of the rectangular state
(2) Shift process (H-SHIFT) on a half data segment of the rectangular state
(3) Process (MAT-XOR) of performing a linear conversion process on a half data segment of the rectangular state and then performing an exclusive OR operation (XOR) between the half data segment and the other half data segment
(4) Swap process (SWAP) of interchanging two half data segments of the rectangular state
(5) Process (H-KADD) of performing an exclusive OR operation (XOR) between a half data segment of the rectangular state and a round key $[k_i]$ It is understood from the drawing that on completion of four rounds of the round operation, an influence of the one-byte data block 311 affects all 48 one-byte data blocks in the rectangular state 310. In addition, the thawing illustrates diffusion of the influence of the one-byte data block 311 at the top left of the rectangular state 310, but any one-byte data block included in the left-half data segment has the same property of diffusing its influence.

Moreover, regarding the influence of data included in a right-half data segment, as in the case of the above-described exemplary embodiment, a swap [SWAP] operation is inevitably executed once in processing in one round, so interchanging between the left-half data segment and the right-half data segment is executed, and once data on the right-half data segment is moved to the left-half data segment, later processes are executed in the sequence illustrated in FIG. 30, and as a result, on completion of 4+1=5 rounds, all one-byte data blocks of the rectangular state are affected. Any one-byte data block included in the right-half data segment has the same property.

As a result, one one-byte data block configuring the rectangular state is allowed to affect all one-byte data blocks configuring the rectangular state in 5 rounds at maximum. The operation cost necessary for one one-byte data block configuring the rectangular state to affect all one-byte data blocks configuring the rectangular state may be estimated as follows:

Operation cost=7.5SU B+7.5MAT+15KADD

When the operation cost is calculated based on the above-described number of gates, the operation cost is as follows:

Operation cost=7.5SUB+7.5MAT+15KADD

=35K gates to 50K gates

In a mode in which the algorithm [Rijndael] previously described as a processing example for the rectangular state is expanded to a 4×12 state, it takes 4 rounds, and the operation cost necessary for a conversion process is superior to 12SUB+12MAT+12KADD (52K gates to 76K gates), and more efficient diffusion on the rectangular state is achieved by executing processes according to the exemplary embodiment, and an improvement in processing speed, downsizing of a device, or the like is achievable, and an improvement in diffusibility allows an improvement in the security level or concealment level of encrypted data.

Generalized Example of Exemplary Embodiment 2

Figure 31:
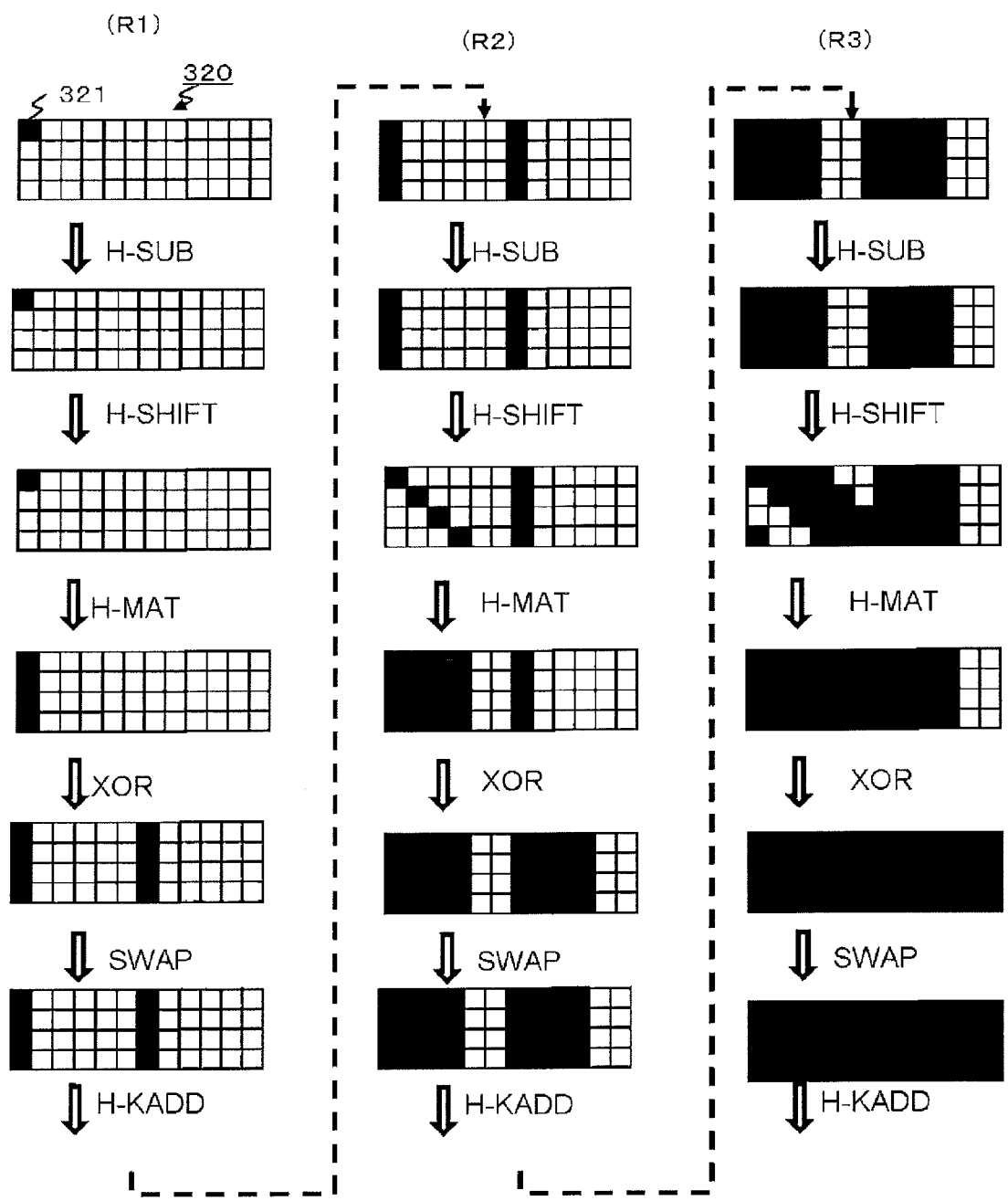
FIG. 31 is an illustration describing a data diffusion example by Exemplary Embodiment 2 on a generalized rectangular state in which a half data segment of the rectangular state is not a square state.

FIG. 31 illustrates a data diffusion example in the case where the round operation previously described in Exemplary Embodiment 2 is executed on a generalized rectangular state 320 of which a half data segment is not a square state. Refer to a one-byte data block 321 (marked with black) at the top left of the rectangular state 320 of 48 bytes with 4 rows and 12 columns. In each process configuring the round operation, a one-byte data block changed by constituent bits of the one-byte data 311 is indicated with black.

A round operation algorithm of Exemplary Embodiment 2 is a process executing the following processes (1) to (6), that is, these processes in order of [H-SUB]→[H-SHIFT]→[H-MAT]→[XOR]→[SWAP]→[H-KADD] as processes configuring one round operation:

(1) Nonlinear conversion process (H-SUB) on a half data segment of the rectangular state (2) Shift process (H-SHIFT) on a half data segment of the rectangular state (3) Linear conversion process (H-MAT) on a half data segment of the rectangular state (4) Process (XOR) of performing an exclusive OR operation (XOR) between a half data segment and the other half data segment of the rectangular state (5) Swap process (SWAP) of interchanging two half data segment of the rectangular state (6) Process (H-KADD) of performing an exclusive OR operation (XOR) between a half data segment of the rectangular state and a round key $[k_i]$ It is understood from FIG. 31 that on completion of three rounds of the round operation, an influence of the one-byte data block 321 affects all 48 one-byte data blocks in the rectangular state 320. In addition, the drawing illustrates diffusion of the influence of the one-byte data block 321 at the top left of the rectangular state 320, but any one-byte data block included in the left-half data segment has the same property of diffusing its influence.

Moreover, regarding the influence of data included in a right-half data segment, as in the case of the above-described exemplary embodiment, a swap [SWAP] operation is inevitably executed once in processing in one round, so interchanging between the left-half data segment and the right-half data segment is executed, and once data on the right-half data segment is moved to the Jell-half data segment, later processes are executed in the sequence illustrated in FIG. 31, and as a result, on completion of 3+1=4 rounds, all one-byte data blocks of the rectangular state are affected. Any one-byte data block included in the right-half data segment has the same property.

As a result, one one-byte data block configuring the rectangular state is allowed to affect all one-byte data blocks configuring the rectangular state in 4 rounds at maximum. The operation cost necessary for one one-byte data block configuring the rectangular state to affect all one-byte data blocks configuring the rectangular state may be estimated as follows:

Operation cost=6SUB+6MAT+12KADD

When the operation cost is calculated based on the above-described number of gates, the operation cost is as follows:

Operation cost=6SUB+6MAT+12KADD

=28K gates to 40K gates

This operation cost is superior to the operation cost (52K gates to 76K gates) necessary in a mode in which the algorithm [Rijndael] previously described as a processing example for the rectangular state is expanded to a 4×12 state, and more efficient diffusion on the rectangular state is achieved by executing processes according to the exemplary embodiment, and an improvement in processing speed, downsizing of a device, or the like is achievable, and an improvement in diffusibility allows an improvement in the security level or concealment level of encrypted data.

Generalized Example of Exemplary Embodiment 3

Figure 32:
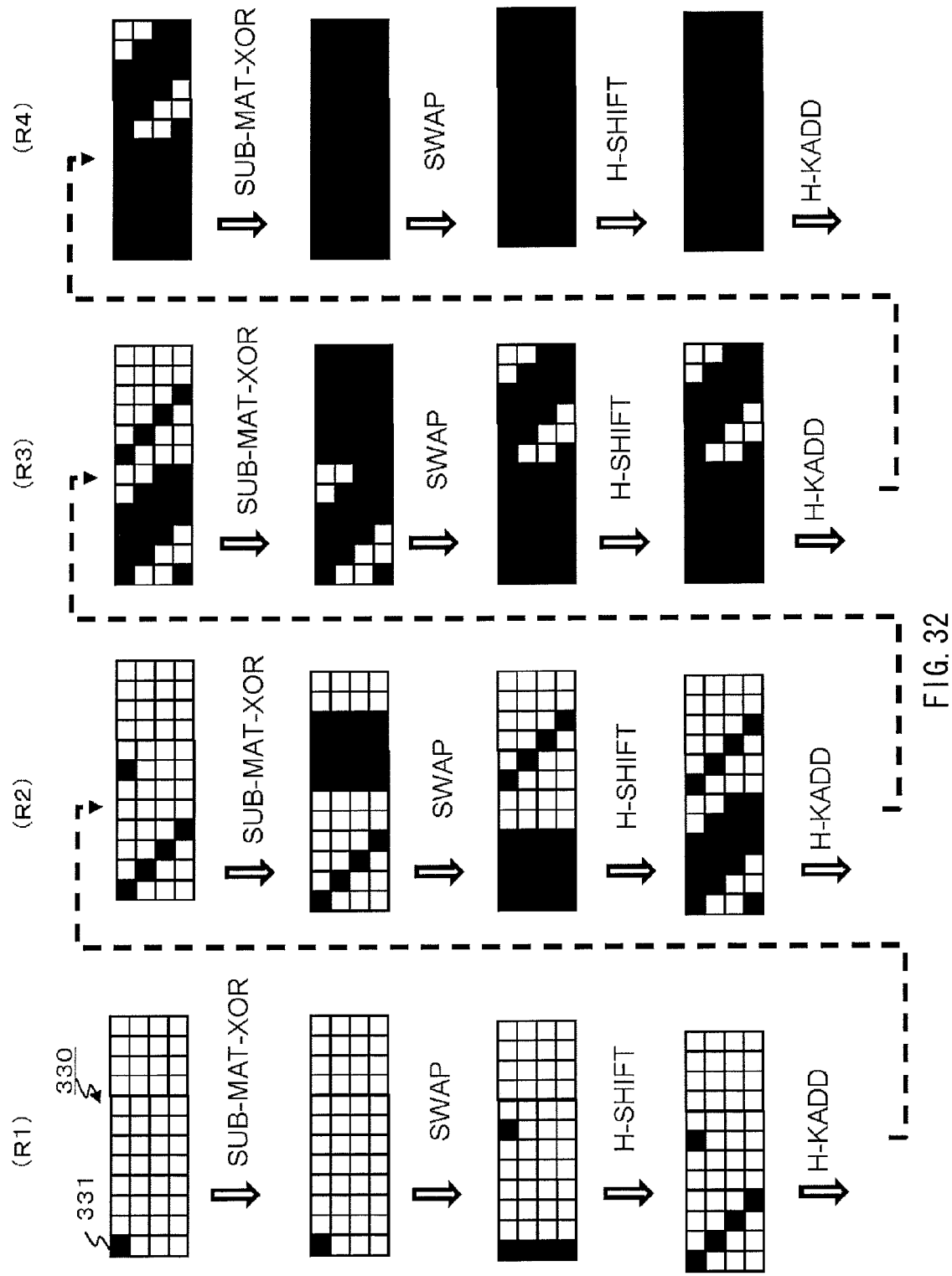
FIG. 32 is an illustration describing a data diffusion example by Exemplary Embodiment 3 on a generalized rectangular state in which a half data segment of the rectangular state is not a square state.

FIG. 32 illustrates a data diffusion example in the case where the round operation previously described in Exemplary Embodiment 3 is executed on a generalized rectangular state 330 of which a half data segment is not a square state. Refer to a one-byte data block 331 (marked with black) at the top left of the rectangular state 330 of 48 bytes with 4 rows and 12 columns. In each process configuring the round operation, a one-byte data block changed by constituent bits of the one-byte data block 331 is indicated with black.

A round operation algorithm of Exemplary Embodiment 3 is a process executing the following processes (1) to (4), that is, these processes in order of [SUB-MAT-XOR]→[SWAP]→[H-SHIFT]→[H-KADD] as processes configuring one round operation:

(1) Nonlinear conversion & linear conversion & exclusive OR operation process (SUB-MAT-XOR) of executing linear conversion by performing a 4×4 matrix operation using a linear conversion matrix [M] assuming that a result of performing nonlinear conversion (SUB) on data in each column of a half data segment of the rectangular state is considered as a vector, and performing an exclusive OR operation (XOR) between a result of the 4×4 matrix operation and data in a corresponding column of a right-half data segment, and employing a result of the exclusive OR operation (XOR) as updated data of the right-half data segment (2) Swap process (SWAP) of interchanging two half data segment of the rectangular state (3) Shift process (H-SHIFT) on a half data segment of the rectangular state (4) Process (H-KADD) of performing an exclusive OR operation between a half data segment of the rectangular state and a round key $[k_i]$ It is understood from FIG. 32 that on completion of four rounds of the round operation, an influence of the one-byte data block 331 affects all 48 one-byte data blocks in the rectangular state 330. In addition, the drawing illustrates diffusion of the influence of the one-byte data block 331 at the top left of the rectangular state 330, but any one-byte data block included in the left-half data segment has the same property of diffusing its influence.

Moreover, regarding the influence of data included in a right-half data segment, as in the case of the above-described exemplary embodiment, a swap [SWAP] operation is inevitably executed once in processing in one round, so interchanging between the left-half data segment and the right-half data segment is executed, and once data on the right-half data segment is moved to the left-half data segment, later processes are executed in the sequence illustrated in FIG. 32, and as a result, on completion of 4+1=5 rounds, all one-byte data blocks of the rectangular state are affected. Any one-byte data block included in the right-half data segment has the same property.

As a result, one one-byte data block configuring the rectangular state is allowed to affect all one-byte data blocks configuring the rectangular state in 5 rounds at maximum. The operation cost necessary for one one-byte data block configuring the rectangular state to affect all one-byte data blocks configuring the rectangular state may be estimated as follows:

Operation cost=7.5SUB+7.5MAT+15KADD

When the operation cost is calculated based on the above-described number of gates, the operation cost is as follows:

Operation cost=7.5SUB+7.5MAT+15KADD

=25K gates to 50K gates

This operation cost necessary is superior to the operation cost (52K gates to 76K gates) necessary in a mode in which the algorithm [Rijndael] previously described as a processing example for the rectangular state is expanded to a 4×12 state, and more efficient diffusion on the rectangular state is achieved by executing processes according to the exemplary embodiment, and an improvement in processing speed, downsizing of a device, or the like is achievable, and an improvement in diffusibility allows an improvement in the security level or concealment level of encrypted data.

Generalized Example of Exemplary Embodiment 4

Figure 33:
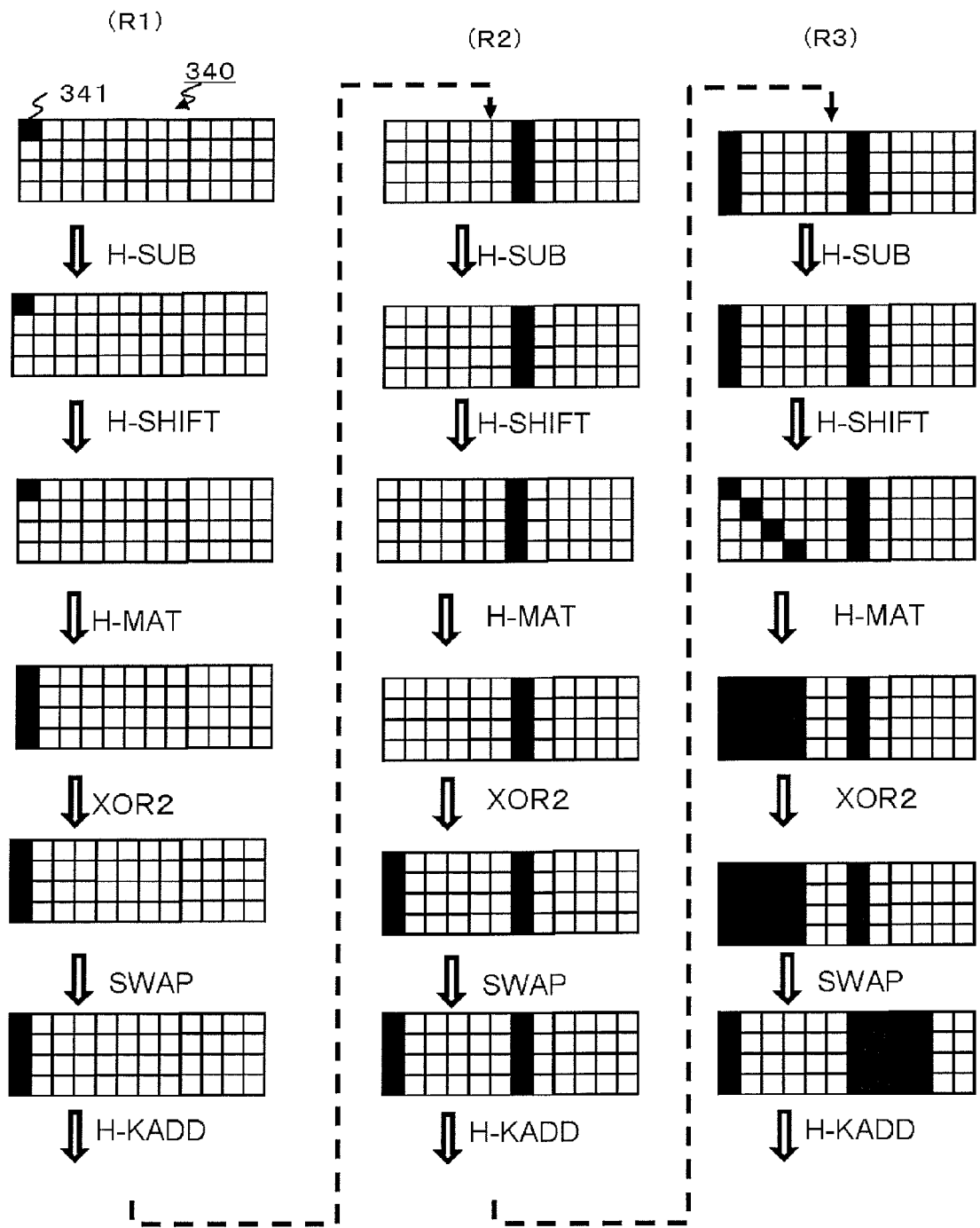
FIG. 33 is an illustration describing a data diffusion example by Exemplary Embodiment 4 on a generalized rectangular state in which a half data segment of the rectangular state is not a square state.
Figure 34:
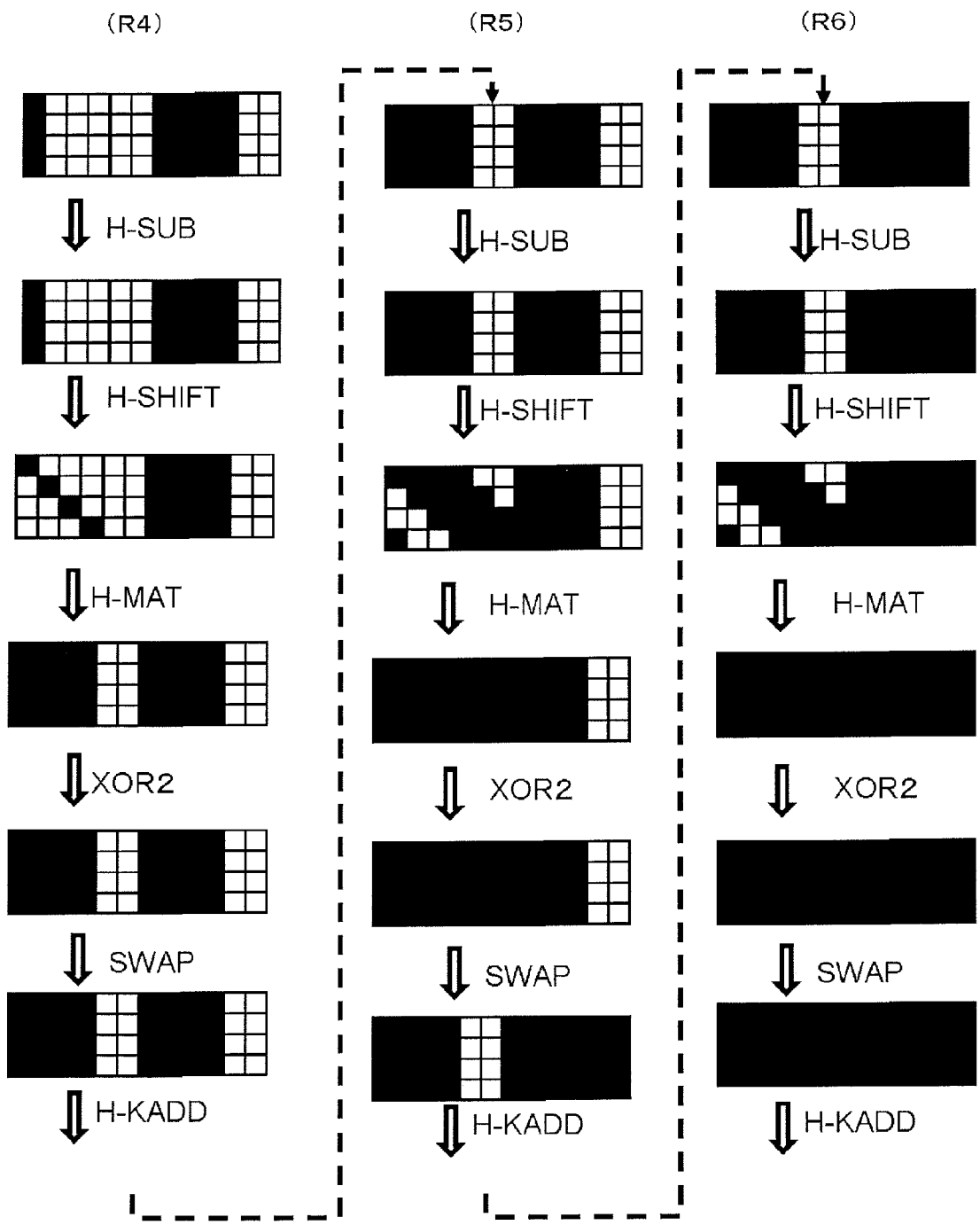
FIG. 34 is an illustration describing a data diffusion example by Exemplary Embodiment 4 on a generalized rectangular state in which a half data segment of the rectangular state is not a square state.

FIGS. 33 and 34 illustrate a data diffusion example in the case where the round operation previously described in Exemplary Embodiment 4 is executed on a generalized rectangular state 340 of which a half data segment is not a square state. Refer to a one-byte data block 341 (marked with black) at the top left of the rectangular state 340 of 48 bytes with 4 rows and 12 columns. In each process configuring the round operation, a one-byte data block changed by constituent bits of the one-byte data block 341 is indicated with black.

A round operation algorithm of Exemplary Embodiment 4 is a process executing the following processes (1) to (6), that is, these processes in order of [H-SUB]→[H-SHIFT]→[H-MAT]→[XOR2]→[SWAP]→[H-KADD] as processes configuring one round operation:

(1) Nonlinear conversion process (H-SUB) on a half data segment of the rectangular state (2) Shift process (H-SHIFT) on a half data segment of the rectangular state (3) Linear conversion process (H-MAT) on a half data segment of the rectangular state (4) Process (XOR2) of performing an exclusive OR operation (XOR) between a half data segment and the other half data segment of the rectangular state (5) Swap process (SWAP) of interchanging two half data segments of the rectangular state (6) Process (H-KADD) of performing an exclusive OR operation between a half data segment of the rectangular state and a round key $[k_i]$ It is understood from FIGS. 33 and 34 that on completion of six rounds of the round operation, an influence of the one-byte data block 341 affects all 48 one-byte data blocks in the rectangular state 340. In addition, the drawings illustrate diffusion of the influence of the one-byte data block 341 at the top left of the rectangular state 340, but anyone-byte data block included in the left-half data segment has the same property of diffusing its influence.

Moreover, regarding the influence of data included in a right-half data segment, as in the case of the above-described exemplary embodiment, a swap [SWAP] operation is inevitably executed once in processing in one round, so interchanging between the left-half data segment and the right-half data segment is executed, and once data on the right-half data segment is moved to the left-half data segment, later processes are executed in the sequence illustrated in FIGS. 33 and 34, and as a result, on completion of 6+1=7 rounds, all one-byte data blocks of the rectangular state are affected. Any one-byte data block included in the right-half data segment has the same property.

As a result, one one-byte data block configuring the rectangular state is allowed to affect all one-byte data blocks configuring the rectangular state in 7 rounds at maximum. The operation cost necessary for one one-byte data block configuring the rectangular state to affect all one-byte data blocks configuring the rectangular state may be estimated as follows:

Operation cost=10.5SUB+10.5MAT+21K ADD

When the operation cost is calculated based on the above-described number of gates, the operation cost is as follows:

Operation cost=10.5SUB+10.5MAT+21KADD

=50K gates to 70K gates

This operation cost is superior to the operation cost (52K gates to 76K gates) necessary in a mode in which the algorithm [Rijndael] previously described as a processing example for the rectangular state is expanded to a 4×12 state, and more efficient diffusion on the rectangular state is achieved by executing processes according to the exemplary embodiment, and an improvement in processing speed, downsizing of a device, or the like is achievable, and an improvement in diffusibility allows an improvement in the security level or concealment level of encrypted data.

[About Changing the Order of Processes in Round Operation]

In the above-described exemplary embodiments, the processing sequence in the round operation is described as one sequence. That is, round operations in Exemplary Embodiments 1, 2, 3 and 4 are executed in the following sequences:

Exemplary Embodiment 1

[H-SUB]→[H-SHIFT]→[MAT-XOR]→[SWAP]→[H-KADD]

Exemplary Embodiment 2

[H-SUB]→[H-SHIFT]→[H-MAT]→[XOR]→[SWAP]→[H-KADD]

Exemplary Embodiment 3

[SUB-MAT-XOR]→[SWAP]→[H-SHIFT]→[H-KADD]

Exemplary Embodiment 4

[H-SUB]→[H-SHIFT]→[H-MAT]→[XOR2]→[SWAP]→[H-KADD]

However, the sequence in the round operation is not limited thereto, and the order of processes executed in the round operation may be changed. For example, it is easy that any other process is employed as a first process in the round and an end of the round is changed, thereby the round is considered to have a different round configuration.

For example, in Exemplary Embodiment 1 or Exemplary Embodiment 2, even if the positions of the nonlinear conversion [H-SUB] and the shift process [H-SHIFT] in the sequence are interchanged, there is no influence on diffusibility, and in any of the exemplary embodiments, even if the key application operation [H-KADD] is inserted into any position, there is no influence in diffusibility. Therefore, the order of the processes may be changed as long as diffusibility described in this mode is not changed, and such a configuration is included in the scope of the invention.

[Application of DSM]

In the above-described exemplary embodiments, as a matrix used in the linear conversion process [H-MAT], a common fixed matrix [M] is allowed to be used in each round, but a configuration in which different matrices may be used from one round to another as the matrix [M]. In a configuration in which a so-called DSM (Diffusion Switching Mechanism) is applied, the security level is allowed to be further improved.

An example in the case where the DSM is applied in Exemplary Embodiment 2 will be described below. As described above referring to FIG. 16, the round operation in Exemplary Embodiment 2 is a process of repeatedly executing the round operation configured of the following plurality of processes:

[H-SUB]→[H-SHIFT]→[H-MAT]→[XOR]→[SWAP]→[H-KADD]

By the linear conversion process [H-MAT] in a given round, a result of performing a matrix operation by the linear conversion matrix [M] on each column included in the left-half data segment of the rectangular state is stored in the column. The left-half data segment updated by the linear conversion process [H-MAT] is moved to the right-half data segment by the swap [SWAP] process.

The DSM has a configuration in which in the linear conversion process [H-MAT] in the next round, a result of performing a matrix operation by the linear conversion matrix [M] on each column included in the left-half data segment at this time is stored and the left-half data segment is exclusive OR-operated with the right-half data segment by an exclusive OR operation process [XOR] immediately after the linear conversion process [H-MAT].

It is clear from data in each column included in the right-half data segment immediately after completion of the exclusive OR operation process [XOR] that results of two matrix operations are added into each column. When a vector of one column configuring the rectangular state is represented by $^t(X, Y, Z, W)$, the following general expression is allowed to be established.

$$\begin{pmatrix} W \\ X \\ Y \\ Z \end{pmatrix} = M \begin{pmatrix} a \\ b \\ c \\ d \end{pmatrix} \oplus M \begin{pmatrix} e \\ f \\ g \\ h \end{pmatrix} = M \begin{pmatrix} a \oplus e \\ b \oplus f \\ c \oplus g \\ d \oplus h \end{pmatrix} \quad \text{[Mathematical Expression 2]}$$

In this case, (a, b, c, d) is an element of a column vector inputted into a matrix in the linear conversion process [H-MAT] in the previous round, and (e, f, g, h) is an element of a column vector inputted into a matrix in the linear conversion process [H-MAT] in the next round.

At this time, attention is given to a relationship between the number of nonzero elements included in (a, b, c, d, e, f, g, h) and the number of nonzero elements in (W, X, Y, Z) which is result data. For example, in the case of a=e≠0, b=c=d=f=g=h=0, it is clear that W=X=Y=Z=0 is established. Even though two elements a and e are not 0, no nonzero element is included in an operation result, thereby a state in which the sum total of nonzero elements included in an input/output is 2 occurs.

In a replace function, it is desired that a given data affects data as many as possible and the sum total of the nonzero elements included in the input/output is prevented from being at as low a level as possible. This is measures against differential attack or linear attack.

As measures against such vulnerability, it is effective to apply a so-called DSM (Diffusion Switching Mechanism) in which as the linear conversion matrix [M] used in all rounds, instead of one fixed matrix, a plurality of different matrices, for example, two matrices [M1] and [M2] are used. In addition, a cryptographic algorithm using the DSM is described in, for example, Japanese Unexamined Patent Application Publication No. 2007-199156 by the applicant of this patent application, or the like.

Two matrices M1 and M2 are prepared, and two matrices are arranged so as to consistently satisfy the following relational expression.

$$\begin{pmatrix} W \\ X \\ Y \\ Z \end{pmatrix} = M_1 \begin{pmatrix} a \\ b \\ c \\ d \end{pmatrix} \oplus M_2 \begin{pmatrix} e \\ f \\ g \\ h \end{pmatrix} \quad \text{[Mathematical Expression 3]}$$

Alternatively, $$\begin{pmatrix} W \\ X \\ Y \\ Z \end{pmatrix} = M_2 \begin{pmatrix} a \\ b \\ c \\ d \end{pmatrix} \oplus M_1 \begin{pmatrix} e \\ f \\ g \\ h \end{pmatrix} \quad \text{[Mathematical Expression 4]}$$

Two matrices [M1] and [M2] are arranged so as to consistently satisfy one of the above-described relationships.

The branch number of a matrix M1|M2 obtained by arranging the matrices [M1] and [M2] is set to 3 or over, or the branch number of matrix $^tM1^{-1}|^tM2^{-1}$ obtained by arranging matrices which is obtained by transposing inverse matrices thereof is set to 3 or over. A configuration satisfying both relationships may be used. This prevents the above-described state while the number of nonzero elements remains small, and an effect of improving resistance to differential attack or linear attack is obtained. Moreover, the same relational expression is derived in Exemplary Embodiment 4, so the same effects are expected when the above-described DSM configuration is applied.

3. Configuration Example of Data Converter

Figure 35:
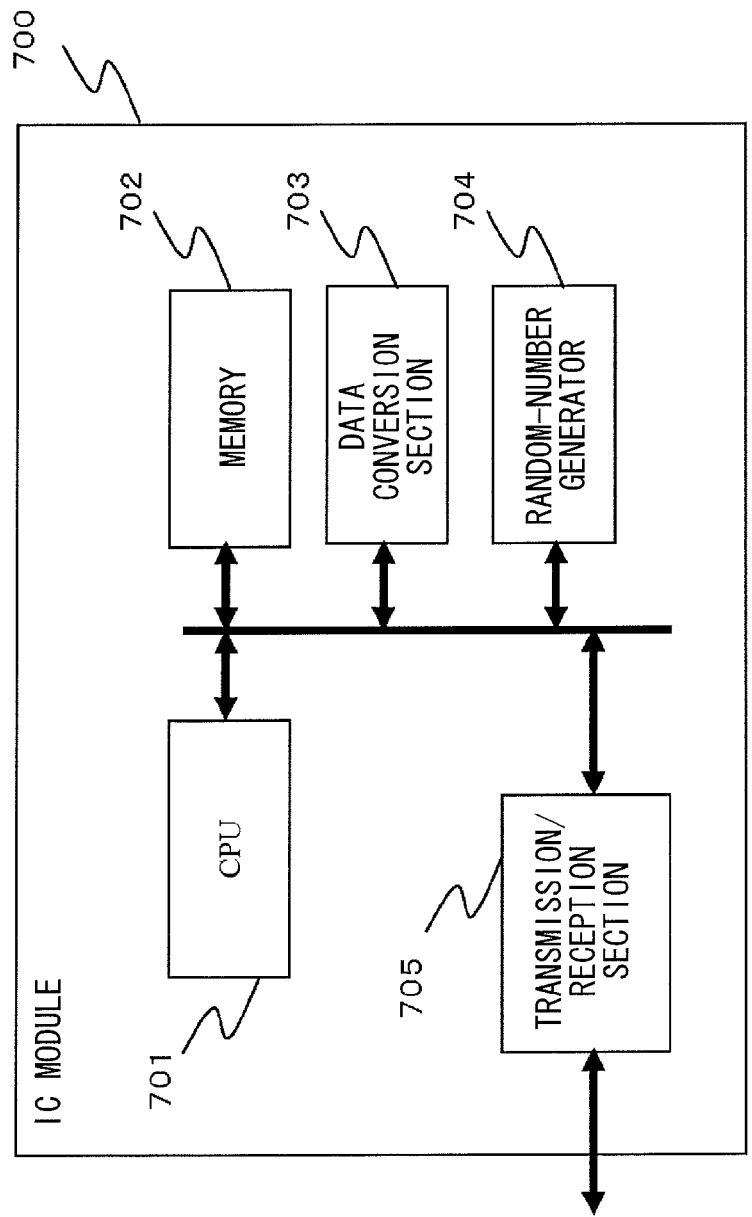
FIG. 35 is an illustration of a configuration example of an IC module as a data converter executing processes according to the invention.

Finally, a configuration example of an IC module 700 as a device executing the processes according to the above-described exemplary embodiments is illustrated in FIG. 35. The above-described processes are allowed to be executed in, for example, PCs, IC cards, reader/writers, and any other various information processing devices. Moreover, each process is allowed to be executed by using a hard circuit or a program configuring a logical circuit, or both of them. An example executing the processes is for example, the IC module 700 illustrated in FIG. 35, and such an IC module 700 is allowed to be mounted in various devices.

A CPU (Central Processing Unit) 701 illustrated in FIG. 35 is a processer executing start or stop of cryptographic processing, control of data transmission/reception, data transfer control between components, or any other various programs. A memory 702 is configured of a ROM (Read-Only-Memory) storing a program executed by the CPU 701 or fixed data such as an operation parameter, a RAM (Random Access Memory) used as a storage area or a work region of a program executed in a process of the CPU 701 and a parameter changed as necessary in program processing, or the like. Moreover, the memory 702 is allowed to be used as a storage region for key data necessary for cryptographic processing, a conversion table (a substitution table) used in cryptographic processing, data used in a conversion matrix, or the like. In addition, a data storage region is preferably configured as a memory having a tamper resist configuration.

A data conversion section 703 includes a processing section executing, for example, the above-described various cryptographic processing, that is, the following processes:

(1) Nonlinear conversion process (H-SUB)
(2) Linear conversion and exclusive OR operation (MAT-XOR)
(3) Linear conversion process (H-MAT)
(4) Key application operation (H-KADD)
(5) Exclusive OR operation process (XOR)(XOR2)
(6) Nonlinear conversion & linear conversion & exclusive OR operation process (SUB-MAT-XOR)

In addition, these processes are implemented by hardware, software or a combined configuration thereof.

In addition, in this case, an example in which a cryptographic processing means is an individual module is described, but such an independent cryptographic processing module may not be arranged, and, for example, a cryptographic processing program may be stored in an ROM, and the CPU 701 may read out a program stored in the ROM to execute the program.

A random-number generator 704 executes a random number generating process necessary for key generation or the like which is necessary for cryptographic processing.

A transmission/reception section 705 is a data communication processing section executing data communication with outside, for example, an IC module such as a reader/writer, and executes output of a cipher text generated in the IC module or data input from a device such as an external reader/writer, or the like.

In the foregoing, the present invention has been described in detail with respect to specific exemplary embodiments. However, it is obvious that persons skilled in the art may make modifications or alterations to the exemplary embodiments without departing from the scope of the present invention. That is, the present invention has been disclosed in the form of illustrative examples and is not to be construed in a limited sense. The claims should be referenced to determine the scope of the present invention.

Moreover, the processes described in the description may be executed by hardware or software, or a combined configuration thereof. In the case where the processes are executed by software, a program on which a processing sequence is recorded is allowed to be installed into a memory in a computer incorporated in dedicated hardware and executed, or the program is allowed to be installed onto a general-purpose computer capable of executing various processes and executed. For example, the program may be recorded in advance on a recording medium. In addition of installing the program in a computer from the recording medium, a program may be received through a network such as the Internet, and may be installed in a recording medium such as a built-in hard disk.

In addition, various processes described in the description not only may be executed in a time series according to the description but also may be executed in parallel or individually according to the processing performance of a device executing the processes or when necessary. Further, in this description, "system" refers to a logical set configuration of a plurality of devices regardless of whether the individual constituent devices are contained in one enclosure.

INDUSTRIAL APPLICABILITY

As described above, according to the configuration of an exemplary embodiment of the invention, for example, in a configuration in which various processes on two data segments which are resultants of dividing a rectangular matrix of data configured of arranged one-byte data blocks into two parts to perform data conversion, a linear conversion process on one of the data segments, an exclusive OR operation process between the two data segments, a shift process on one of the data segments and a swap process between the two data segments are executed, thereby efficient data scrambling with less operation cost is achievable. Moreover, cryptographic processing with a high security level is achieved by including nonlinear conversion or key application operation on data segments.

The invention claimed is:

1. A data converter comprising:
a processor;
a data conversion section performing a data conversion process which repeats a round operation, the data conversion section being configured to execute, in the round operation:
a linear conversion process on one of two data segments which are resultants of dividing a rectangular matrix of data into two parts, the rectangular matrix of data being configured by arranging data blocks of equal size,
a process of an exclusive OR operation between the two data segments,
a shift process on one of the data segments, and
a swap process between the two data segments,
wherein on execution of the shift process, the data conversion section executes the shift process so that:
in such a case that a relationship of $m \leq n$ is satisfied for a data segment with m rows and n columns to be subjected to the shift process included in a rectangular matrix with m rows and 2n columns of data, respective data blocks belonging to one column before the shift process are shifted so as to belong to respective different columns after the shift process, and in such a case that a relationship of m>n is satisfied, data blocks belonging to one column before the shift process, a number of the data blocks lying from (m/n)−1 to (m/n)+1 both inclusive, are shifted so as to belong to an arbitrary column after the shift process.

2. The data converter according to claim 1, wherein
the data blocks of equal size are one-byte data blocks, and
the data conversion section is configured to perform, in the round operation, a process on the two data segments which are resultants of dividing the rectangular matrix of data into two parts, the rectangular matrix of data being configured by arranging the one-byte data blocks.

3. The data converter according to claim 1, wherein
the data conversion section is configured to further execute, in the round operation:
a nonlinear conversion process on one of the data segments, and
a key application operation process on one of the data segments.

4. The data converter according to claim 3, wherein
the key application operation is an exclusive OR operation between data which configures one of the data segments and encryption key data.

5. The data converter according to claim 1, wherein
the data conversion section employs a result of the exclusive OR operation as updated data of one of the data segments.

6. The data converter according to claim 1, wherein
the data conversion section executes the shift process on both of the two data segments.

7. The data converter according to claim 1, wherein
in the round operation, the data conversion section executes a nonlinear conversion and a shift process on one data segment A of the data segments to update the data segment A, and further executes a linear conversion process on the updated data segment A and executes the exclusive OR operation between a result of the linear conversion process and other data segment B, thereby to employ a result of the exclusive OR operation as updated data of the data segment B, and further executes the swap process between the data segment A and the data segment B, and then executes an exclusive OR operation between the data segment A and key data.

8. The data converter according to claim 1, wherein
in the round operation, the data conversion section executes a nonlinear conversion process, a shift process and a linear conversion process on one data segment A of the data segments to update the data segment A, and further executes the exclusive OR operation between the updated data segment A and other data segment B, thereby to employ a result of the exclusive OR operation as updated data of the data segment B, and further executes the swap process between the data segment A and the data segment B, and then executes an exclusive OR operation between the data segment A and key data.

9. The data converter according to claim 1, wherein
in the round operation, the data conversion section executes a nonlinear conversion process and a linear conversion process on one data segment A of the data segments and executes an exclusive OR operation between a result thereof and other data segment B, thereby to employ a result of the exclusive OR operation as updated data of the data segment B, and further executes the swap process between the data segment A and the data segment B, and executes a shift process on the data segment A, and then executes an exclusive OR operation between the data segment A and key data.

10. The data converter according to claim 1, wherein
in the round operation, the data conversion section executes a nonlinear conversion process, a shift process and a linear conversion process on one data segment A of the data segments, and further executes the exclusive OR operation between a result thereof and other data segment B, thereby to employ a result of the exclusive OR operation as updated data of the data segment A, and further executes the swap process between the data segment A and the data segment B, and then executes an exclusive OR operation between the data segment A and key data.

11. The data converter according to claim 1, wherein
the data conversion section is configured to select and use one of a plurality of different matrices for every round, in the linear conversion process in the round operation.

12. The data converter according to claim 11, wherein
the data conversion section is configured to select and use one of a plurality of different matrices by means of a process using a DSM (Diffusion Switching Mechanism).

13. A method for data conversion, the method performed by a data converter comprising a processor and a memory encoded with program instructions that, when executed by the processor, cause the data converter to perform the method, the method comprising:
a data conversion step of performing, in a data conversion section, data conversion by repeating a round operation, the data conversion step executing, in the round operation:
a linear conversion process on one of two data segments which are resultants of dividing a rectangular matrix of data into two parts, the rectangular matrix of data being configured by arranging data blocks of equal size,
a process of an exclusive OR operation between the two data segments,
a shift process on one of the data segments, and
a swap process between the two data segments,
wherein on execution of the shift process, the data conversion step executes the shift process so that:
in such a case that a relationship of m≦n is satisfied for a data segment with m rows and n columns to be subjected to the shift process included in a rectangular matrix with m rows and 2n columns of data, respective data blocks belonging to one column before the shift process are shifted so as to belong to respective different columns after the shift process, and
in such a case that a relationship of m>n is satisfied, data blocks belonging to one column before the shift process, a number of the data blocks lying from (m/n)−1 to (m/n)+1 both inclusive, are shifted so as to belong to an arbitrary column after the shift process.

14. The data conversion method according to claim 13, wherein
the data blocks of equal size are one-byte data blocks, and
the data conversion section is configured to perform, in the round operation, a process on the two data segments which are resultants of dividing the rectangular matrix of data into two parts, the rectangular matrix of data being configured by arranging the one-byte data blocks.

15. The data conversion method according to claim 13, wherein
the data conversion step is configured to further execute, in the round operation:

a nonlinear conversion process on one of the data segments, and a key application operation process on one of the data segments.

16. The data conversion method according to claim 15, wherein the key application operation is an exclusive OR operation between data which configures one of the data segments and encryption key data.

17. The data conversion method according to claim 13, wherein the data conversion step employs a result of the exclusive OR operation as updated data of one of the data segments.

18. The data conversion method according to claim 13, wherein the data conversion step executes the shift process on both of the two data segments.

19. The data conversion method according to claim 13, wherein in the round operation, the data conversion step executes a nonlinear conversion and a shift process on one data segment A of the data segments to update the data segment A, and further executes a linear conversion process on the updated data segment A and executes the exclusive OR operation between a result of the linear conversion process and other data segment B, thereby to employ a result of the exclusive OR operation as updated data of the data segment B, and further executes the swap process between the data segment A and the data segment B, and then executes an exclusive OR operation between the data segment A and key data.

20. The data conversion method according to claim 13, wherein in the round operation, the data conversion step executes a nonlinear conversion process, a shift process and a linear conversion process on one data segment A of the data segments to update the data segment, and further executes the exclusive OR operation between the updated data segment A and other data segment B, thereby to employ a result of the exclusive OR operation as updated data of the data segment B, and further executes the swap process between the data segment A and the data segment B, and then executes an exclusive OR operation between the data segment A and key data.

21. The data conversion method according to claim 13, wherein in the round operation, the data conversion step executes a nonlinear conversion process and a linear conversion process on one data segment A of the data segments and executes an exclusive OR operation between a result thereof and other data segment B, thereby to employ a result of the exclusive OR operation as updated data of the data segment B, and further executes the swap process between the data segment A and the data segment B, and executes a shift process on the data segment A, and then executes an exclusive OR operation between the data segment A and key data.

22. The data conversion method according to claim 13, wherein in the round operation, the data conversion step executes a nonlinear conversion process, a shift process and a linear conversion process on one data segment A of the data segments, and further executes the exclusive OR operation between a result thereof and other data segment B, thereby to employ a result of the exclusive OR operation as updated data of the data segment A, and further executes the swap process between the data segment A and the data segment B, and then executes an exclusive OR operation between the data segment A and key data.

23. The data conversion method according to claim 13, wherein in the data conversion step is configured to select and use one of a plurality of different matrices for every round, in the linear conversion process in the round operation.

24. The data conversion method according to claim 23, wherein the data conversion step is configured to select and use one of a plurality of different matrices by means of a process using a DSM (Diffusion Switching Mechanism).

25. A non-transitory computer readable medium comprising program code, the program code being operable, when executed by a data converter, to cause the data converter to perform a method, the method comprising:

a data conversion step of performing, in a data conversion section, data conversion by repeating a round operation, the data conversion step being a step executing, in the round operation:

a linear conversion process on one of two data segments which are resultants of dividing a rectangular matrix of data into two parts, the rectangular matrix of data being configured by arranging data blocks of equal size, an exclusive OR operation between the two data segments, a shift process on one of the data segments, and a swap process between the two data segments, wherein on execution of the shift process, the data conversion step executes the shift process so that:

in such a case that a relationship of m≦n is satisfied for a data segment with m rows and n columns to be subjected to the shift process included in a rectangular matrix with m rows and 2n columns of data, respective data blocks belonging to one column before the shift process are shifted so as to belong to respective different columns after the shift process, and in such a case that a relationship of m>n is satisfied, data blocks belonging to one column before the shift process, a number of the data blocks lying from (m/n)−1 to (m/n)+1 both inclusive, are shifted so as to belong to an arbitrary column after the shift process.

* * * * *

UNITED STATES PATENT AND TRADEMARK OFFICE
CERTIFICATE OF CORRECTION

PATENT NO. : 8,379,843 B2  
APPLICATION NO. : 12/812903  
DATED : February 19, 2013  
INVENTOR(S) : Taizo Shirai et al.

Page 1 of 1

It is certified that error appears in the above-identified patent and that said Letters Patent is hereby corrected as shown below:

On the Title Page, Item (75), line 1,
"Talzo Shirai" should read -- Taizo Shirai --.

Signed and Sealed this  
Twenty-third Day of April, 2013

Teresa Stanek Rea  
*Acting Director of the United States Patent and Trademark Office*